(12) United States Patent
Tittl et al.

(10) Patent No.: US 12,385,429 B2
(45) Date of Patent: Aug. 12, 2025

(54) POWERTRAIN FOR A UTILITY VEHICLE

(71) Applicant: Polaris Industries Inc., Medina, MN (US)

(72) Inventors: Steven M. Tittl, Lino Lakes, MN (US); Andrew C. Schleif, Stacy, MN (US); Stephen L. Nelson, Osceola, WI (US); Kevin J. Rodel, Isanti, MN (US); William L. Barbrey, Lino Lakes, MN (US); Paul W. Barton, Warwickshire (GB); Oliver Young, Birmingham (GB); Andrew P H Statham, Leicestershire (GB)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 18/207,565

(22) Filed: Jun. 8, 2023

(65) Prior Publication Data

US 2023/0399975 A1 Dec. 14, 2023

Related U.S. Application Data

(60) Provisional application No. 63/351,574, filed on Jun. 13, 2022.

(51) Int. Cl.
*F02B 37/02* (2006.01)
*B60K 13/02* (2006.01)
(Continued)

(52) U.S. Cl.
CPC .............. *F02B 37/02* (2013.01); *B60K 13/02* (2013.01); *B60K 13/04* (2013.01);
(Continued)

(58) Field of Classification Search
CPC .. F02B 37/02; F02B 29/0406; F02B 29/0425; B60K 13/02; B60K 13/04; B60K 5/00;
(Continued)

(56) References Cited

U.S. PATENT DOCUMENTS 1,031,497 A  7/1912 West
1,461,711 A  7/1923 Bull
(Continued)

FOREIGN PATENT DOCUMENTS

CA  1163510 A  3/1984
CA  2746655 A1  7/2010
(Continued)

OTHER PUBLICATIONS

International Preliminary Report on Patentability issued by the International Bureau of WIPO, dated Jul. 14, 2020, for International Patent Application No. PCT/US2019/012958; 19 pages.
(Continued)

*Primary Examiner* — Loren C Edwards
(74) *Attorney, Agent, or Firm* — Faegre Drinker Biddle & Reath LLP

(57) ABSTRACT

A utility vehicle including a plurality of ground-engaging members, a frame supported by the ground-engaging members, and a powertrain assembly supported by the frame and including an engine supported by the frame, the engine including an exhaust side and a turbocharger operably coupled to the engine, the turbocharger having a turbine housing supporting a turbine and a compressor housing supporting a compressor, the turbocharger being positioned on the exhaust side of the engine and rearward of the engine, a space between the turbocharger and the engine being less than 9 inches.

13 Claims, 33 Drawing Sheets

(51) Int. Cl.
*B60K 13/04* (2006.01)
*F02B 29/04* (2006.01)

(52) U.S. Cl.
CPC ...... *F02B 29/0425* (2013.01); *F02B 29/0481* (2013.01); *B60Y 2200/20* (2013.01)

(58) Field of Classification Search
CPC ......... B60K 2005/006; B60Y 2200/20; F02M 35/10157; F02M 35/162; F02M 35/164
See application file for complete search history.

(56) References Cited

U.S. PATENT DOCUMENTS

| | | | |
|---|---|---|---|
| 1,521,976 A | 1/1925 | Swain | |
| 1,989,585 A | 1/1935 | Bigelow | |
| D119,377 S | 3/1940 | Cadwallader | |
| 2,468,809 A | 5/1949 | Brock et al. | |
| 2,525,131 A | 10/1950 | Hallett | |
| 2,553,795 A | 5/1951 | Staude | |
| 2,576,017 A | 11/1951 | John et al. | |
| 2,623,612 A | 12/1952 | Scheiterlein | |
| 2,624,592 A | 1/1953 | MacPherson | |
| 2,660,449 A | 11/1953 | MacPherson | |
| 2,672,103 A | 3/1954 | Hohmes | |
| 2,757,017 A | 7/1956 | Matthias et al. | |
| 2,795,962 A | 6/1957 | Uher | |
| 2,833,366 A | 5/1958 | Olley | |
| 2,839,038 A | 6/1958 | Middlebrooks, Jr. | |
| 2,986,130 A | 5/1961 | McMillan | |
| 3,007,726 A | 11/1961 | Parkin | |
| 3,048,233 A | 8/1962 | Crain et al. | |
| 3,193,302 A | 7/1965 | Hill | |
| 3,292,944 A | 12/1966 | Dangauthier | |
| 3,366,411 A | 1/1968 | Vittone | |
| 3,400,607 A | 9/1968 | Smith | |
| 3,422,918 A | 1/1969 | Musser et al. | |
| 3,452,610 A | 7/1969 | Beasley et al. | |
| 3,508,764 A | 4/1970 | Dobson et al. | |
| 3,523,592 A | 8/1970 | Fenton | |
| 3,560,022 A | 2/1971 | Gold | |
| 3,597,987 A | 8/1971 | Kiekhaefer | |
| 3,600,768 A | 8/1971 | Romanzi et al. | |
| 3,603,422 A | 9/1971 | Cordiano | |
| 3,605,511 A | 9/1971 | Deschene | |
| 3,694,661 A | 9/1972 | Minowa | |
| 3,712,416 A | 1/1973 | Swanson et al. | |
| 3,727,478 A | 4/1973 | Deschene et al. | |
| 3,733,918 A | 5/1973 | Domaas | |
| 3,734,219 A | 5/1973 | Christensen et al. | |
| 3,759,111 A | 9/1973 | Hoff et al. | |
| 3,777,584 A | 12/1973 | Domaas | |
| RE27,858 E | 1/1974 | Laughlin | |
| 3,791,482 A | 2/1974 | Sykora | |
| 3,794,142 A | 2/1974 | Perreault | |
| 3,800,910 A | 4/1974 | Rose | |
| 3,841,841 A | 10/1974 | Torosian et al. | |
| 3,858,902 A | 1/1975 | Howells et al. | |
| 3,861,229 A | 1/1975 | Domaas | |
| 3,868,862 A | 3/1975 | Bessette | |
| 3,916,707 A | 11/1975 | Wells | |
| D237,873 S | 12/1975 | Johnson | |
| 3,939,720 A | 2/1976 | Aaen et al. | |
| 3,951,224 A | 4/1976 | Beaudoin et al. | |
| 3,958,461 A | 5/1976 | Aaen et al. | |
| 3,961,539 A | 6/1976 | Tremblay et al. | |
| 3,962,927 A | 6/1976 | Beaudoin et al. | |
| 3,966,014 A | 6/1976 | Gowing | |
| 3,968,702 A | 7/1976 | Beaudoin et al. | |
| 3,971,263 A | 7/1976 | Beaudoin et al. | |
| 4,010,725 A | 3/1977 | White | |
| 4,010,975 A | 3/1977 | Horton | |
| 4,022,272 A | 5/1977 | Miller | |
| 4,027,892 A | 6/1977 | Parks | |
| 4,046,403 A | 9/1977 | Yoshida | |
| 4,061,187 A | 12/1977 | Rajasekaran et al. | |
| 4,098,414 A | 7/1978 | Abiera | |
| 4,109,751 A | 8/1978 | Kabele | |
| 4,114,713 A | 9/1978 | Mery | |
| 4,136,756 A | 1/1979 | Kawamura | |
| 4,150,655 A | 4/1979 | Forlai et al. | |
| 4,155,333 A | 5/1979 | Maggiorana | |
| 4,159,835 A | 7/1979 | Leja et al. | |
| 4,217,970 A | 8/1980 | Chika | |
| 4,236,492 A | 12/1980 | Tholen | |
| 4,254,746 A | 3/1981 | Chiba et al. | |
| 4,284,158 A | 8/1981 | Schield | |
| 4,284,408 A | 8/1981 | Boer et al. | |
| 4,294,073 A | 10/1981 | Neff | |
| 4,313,728 A | 2/1982 | Prasad | |
| 4,321,896 A | 3/1982 | Kasting | |
| 4,337,406 A | 6/1982 | Binder | |
| 4,340,123 A | 7/1982 | Fujikawa | |
| 4,344,718 A | 8/1982 | Taylor | |
| 4,366,878 A | 1/1983 | Warf | |
| 4,404,936 A | 9/1983 | Tatebe et al. | |
| 4,425,976 A | 1/1984 | Kimura | |
| 4,427,087 A * | 1/1984 | Inoue | F02B 67/10 180/219 |
| 4,429,588 A | 2/1984 | Emundts et al. | |
| 4,434,755 A | 3/1984 | Kazuta et al. | |
| 4,434,934 A | 3/1984 | Moser et al. | |
| 4,458,491 A * | 7/1984 | Deutschmann | F02B 37/02 60/605.1 |
| 4,464,144 A | 8/1984 | Kobayashi | |
| 4,467,747 A | 8/1984 | Braatz et al. | |
| 4,470,389 A | 9/1984 | Mitadera et al. | |
| 4,474,162 A | 10/1984 | Mason | |
| 4,483,686 A | 11/1984 | Kobayashi et al. | |
| 4,505,169 A | 3/1985 | Ganoung | |
| 4,515,221 A * | 5/1985 | van der Lely | A01B 69/008 73/178 R |
| 4,527,517 A | 7/1985 | Mezger et al. | |
| 4,529,244 A | 7/1985 | Zaydel | |
| 4,561,323 A | 12/1985 | Stromberg | |
| 4,575,363 A | 3/1986 | Burgess et al. | |
| 4,577,716 A | 3/1986 | Norton | |
| 4,592,316 A | 6/1986 | Shiratsuchi et al. | |
| 4,598,687 A | 7/1986 | Hayashi | |
| 4,600,072 A | 7/1986 | Krude | |
| D286,760 S | 11/1986 | Ooba et al. | |
| 4,630,446 A * | 12/1986 | Iwai | F02B 33/44 60/314 |
| 4,638,172 A | 1/1987 | Williams | |
| 4,641,854 A | 2/1987 | Masuda et al. | |
| 4,650,210 A | 3/1987 | Hirose et al. | |
| 4,671,521 A | 6/1987 | Talbot et al. | |
| 4,681,178 A | 7/1987 | Brown | |
| 4,685,430 A | 8/1987 | Ap | |
| 4,686,433 A | 8/1987 | Shimizu | |
| 4,688,529 A | 8/1987 | Mitadera et al. | |
| 4,699,234 A | 10/1987 | Shinozaki et al. | |
| 4,705,128 A | 11/1987 | Krude | |
| 4,708,105 A | 11/1987 | Leydorf et al. | |
| 4,708,699 A | 11/1987 | Takano et al. | |
| 4,712,629 A | 12/1987 | Takahashi et al. | |
| 4,714,126 A | 12/1987 | Shinozaki et al. | |
| 4,722,548 A | 2/1988 | Hamilton et al. | |
| 4,732,244 A | 3/1988 | Verkuylen | |
| 4,733,639 A | 3/1988 | Kohyama et al. | |
| 4,756,280 A | 7/1988 | Tamba et al. | |
| D297,132 S | 8/1988 | Ryuzoji et al. | |
| 4,773,675 A | 9/1988 | Kosuge | |
| 4,779,895 A | 10/1988 | Rubel | |
| 4,779,905 A | 10/1988 | Ito et al. | |
| D298,811 S | 12/1988 | Morita | |
| 4,793,297 A | 12/1988 | Fujii et al. | |
| 4,798,399 A | 1/1989 | Cameron | |
| 4,817,985 A | 4/1989 | Enokimoto et al. | |
| 4,821,825 A | 4/1989 | Somerton-Rayner | |
| 4,826,205 A | 5/1989 | Kouda et al. | |
| 4,826,467 A | 5/1989 | Reese et al. | |
| 4,827,416 A | 5/1989 | Kawagoe et al. | |
| 4,828,017 A | 5/1989 | Watanabe et al. | |
| D301,849 S | 6/1989 | Oba et al. | |

(56) References Cited

U.S. PATENT DOCUMENTS

| | | |
|---|---|---|
| 4,848,294 A | 7/1989 | Yamamoto |
| 4,867,474 A | 9/1989 | Smith |
| 4,890,510 A | 1/1990 | Inui |
| 4,890,586 A | 1/1990 | Fujii et al. |
| D305,999 S | 2/1990 | Ueda et al. |
| 4,898,261 A | 2/1990 | Winberg et al. |
| 4,907,551 A | 3/1990 | Sakono et al. |
| 4,907,552 A | 3/1990 | Martin |
| 4,924,959 A | 5/1990 | Handa et al. |
| 4,927,170 A | 5/1990 | Wada |
| 4,934,737 A | 6/1990 | Nakatsuka |
| 4,941,784 A | 7/1990 | Flament |
| D312,441 S | 11/1990 | Guelfi et al. |
| 4,967,944 A | 11/1990 | Waters |
| 4,969,661 A | 11/1990 | Omura et al. |
| 4,973,082 A | 11/1990 | Kincheloe |
| D312,989 S | 12/1990 | Murata et al. |
| 4,974,697 A | 12/1990 | Krude |
| 5,010,970 A | 4/1991 | Yamamoto |
| 5,015,009 A | 5/1991 | Ohyama et al. |
| 5,016,728 A | 5/1991 | Zulawski |
| 5,016,903 A | 5/1991 | Kijima et al. |
| 5,018,490 A | 5/1991 | Martin |
| 5,020,616 A | 6/1991 | Yagi et al. |
| 5,021,721 A | 6/1991 | Oshita et al. |
| 5,024,460 A | 6/1991 | Hanson et al. |
| 5,027,761 A | 7/1991 | Fujii et al. |
| 5,027,915 A | 7/1991 | Suzuki et al. |
| 5,036,939 A | 8/1991 | Johnson et al. |
| 5,038,582 A | 8/1991 | Takamatsu |
| 5,044,614 A | 9/1991 | Rau |
| 5,048,860 A | 9/1991 | Kanai et al. |
| 5,062,654 A | 11/1991 | Kakimoto et al. |
| 5,062,657 A | 11/1991 | Majeed |
| 5,063,811 A | 11/1991 | Smith et al. |
| 5,074,374 A | 12/1991 | Ohtake et al. |
| 5,076,383 A | 12/1991 | Inoue et al. |
| 5,078,223 A | 1/1992 | Ishiwatari et al. |
| 5,078,225 A | 1/1992 | Ohmura et al. |
| 5,080,392 A | 1/1992 | Bazergui |
| 5,083,827 A | 1/1992 | Hollenbaugh, Sr. |
| 5,086,858 A | 2/1992 | Mizuta et al. |
| D327,237 S | 6/1992 | Miyamoto et al. |
| 5,129,700 A | 7/1992 | Trevisan et al. |
| 5,163,538 A | 11/1992 | Derr et al. |
| 5,167,433 A | 12/1992 | Ryan |
| 5,174,622 A | 12/1992 | Gutta |
| 5,181,696 A | 1/1993 | Abe |
| 5,189,615 A | 2/1993 | Rubel et al. |
| 5,191,859 A | 3/1993 | Fujiwara |
| 5,195,607 A | 3/1993 | Shimada et al. |
| 5,201,562 A | 4/1993 | Dorsey |
| 5,203,585 A | 4/1993 | Pierce |
| 5,205,371 A | 4/1993 | Karnopp |
| 5,209,703 A | 5/1993 | Mastine et al. |
| 5,212,431 A | 5/1993 | Origuchi et al. |
| 5,251,588 A | 10/1993 | Tsujii et al. |
| 5,251,713 A | 10/1993 | Enokimoto |
| 5,251,718 A | 10/1993 | Inagawa et al. |
| 5,253,730 A | 10/1993 | Hayashi et al. |
| 5,255,733 A | 10/1993 | King |
| 5,264,764 A | 11/1993 | Kuang |
| 5,279,265 A | 1/1994 | Matsuo et al. |
| 5,306,044 A | 4/1994 | Tucker |
| 5,326,330 A | 7/1994 | Bostelmann |
| 5,327,989 A | 7/1994 | Furuhashi et al. |
| 5,342,023 A | 8/1994 | Kuriki et al. |
| 5,358,450 A | 10/1994 | Robert |
| 5,359,247 A | 10/1994 | Baldwin et al. |
| D354,264 S | 1/1995 | McCoy |
| 5,382,833 A | 1/1995 | Wirges |
| 5,390,121 A | 2/1995 | Wolfe |
| 5,401,056 A | 3/1995 | Eastman |
| 5,407,130 A | 4/1995 | Uyeki et al. |
| 5,408,965 A | 4/1995 | Fulton et al. |
| 5,473,990 A | 12/1995 | Anderson et al. |
| 5,475,596 A | 12/1995 | Henry et al. |
| 5,483,448 A | 1/1996 | Liubakka et al. |
| 5,507,510 A | 4/1996 | Kami et al. |
| 5,528,148 A | 6/1996 | Rogers |
| 5,529,544 A | 6/1996 | Berto |
| D373,099 S | 8/1996 | Molzon et al. |
| 5,546,901 A | 8/1996 | Acker et al. |
| 5,549,153 A | 8/1996 | Baruschke et al. |
| 5,549,428 A | 8/1996 | Yeatts |
| 5,550,445 A | 8/1996 | Nii |
| 5,550,739 A | 8/1996 | Hoffmann et al. |
| 5,558,057 A | 9/1996 | Everts |
| D374,416 S | 10/1996 | Miyamoto et al. |
| 5,562,066 A | 10/1996 | Gere et al. |
| 5,562,555 A | 10/1996 | Peterson |
| 5,597,060 A | 1/1997 | Huddleston et al. |
| 5,614,809 A | 3/1997 | Kiuchi et al. |
| 5,621,304 A | 4/1997 | Kiuchi et al. |
| 5,647,534 A | 7/1997 | Kelz et al. |
| 5,647,810 A | 7/1997 | Huddleston |
| 5,653,304 A | 8/1997 | Renfroe |
| D383,095 S | 9/1997 | Miyamoto et al. |
| 5,676,292 A | 10/1997 | Miller |
| 5,678,847 A | 10/1997 | Izawa et al. |
| 5,692,983 A | 12/1997 | Bostelmann |
| 5,697,633 A | 12/1997 | Lee |
| D391,911 S | 3/1998 | Lagaay et al. |
| 5,738,062 A | 4/1998 | Everts et al. |
| 5,738,471 A | 4/1998 | Zentner et al. |
| 5,752,791 A | 5/1998 | Ehrlich |
| 5,776,568 A | 7/1998 | Andress et al. |
| 5,788,597 A | 8/1998 | Boll et al. |
| 5,795,255 A | 8/1998 | Hooper |
| 5,797,816 A | 8/1998 | Bostelmann |
| 5,816,650 A | 10/1998 | Lucas, Jr. |
| 5,819,702 A | 10/1998 | Mendler |
| 5,820,114 A | 10/1998 | Tsai |
| 5,820,150 A | 10/1998 | Archer et al. |
| 5,839,397 A | 11/1998 | Funabashi et al. |
| 5,842,534 A | 12/1998 | Frank |
| 5,855,386 A | 1/1999 | Atkins |
| 5,860,403 A | 1/1999 | Hirano et al. |
| 5,863,277 A | 1/1999 | Melbourne |
| D405,029 S | 2/1999 | Deutschman |
| 5,867,009 A | 2/1999 | Kiuchi et al. |
| 5,883,496 A | 3/1999 | Esaki et al. |
| 5,887,671 A | 3/1999 | Yuki et al. |
| 5,895,063 A | 4/1999 | Hasshi et al. |
| 5,921,343 A | 7/1999 | Yamakaji |
| 5,947,075 A | 9/1999 | Ryu et al. |
| 5,950,590 A | 9/1999 | Everts et al. |
| 5,950,750 A | 9/1999 | Dong et al. |
| 5,954,364 A | 9/1999 | Nechushtan |
| 5,957,252 A | 9/1999 | Berthold |
| D414,735 S | 10/1999 | Gerisch et al. |
| 5,960,764 A | 10/1999 | Araki |
| 5,961,106 A | 10/1999 | Shaffer |
| 5,961,135 A | 10/1999 | Smock |
| 5,971,290 A | 10/1999 | Echigoya et al. |
| 5,975,573 A | 11/1999 | Belleau |
| 5,976,044 A | 11/1999 | Kuyama |
| 5,992,926 A | 11/1999 | Christofaro et al. |
| 6,000,702 A | 12/1999 | Streiter |
| D421,934 S | 3/2000 | Hunter et al. |
| D421,935 S | 3/2000 | Fujieda |
| 6,032,752 A | 3/2000 | Karpik et al. |
| 6,041,744 A | 3/2000 | Oota et al. |
| 6,047,678 A | 4/2000 | Kurihara et al. |
| 6,056,077 A | 5/2000 | Kobayashi |
| 6,062,024 A | 5/2000 | Zander et al. |
| 6,067,078 A | 5/2000 | Hartman |
| 6,068,295 A | 5/2000 | Skabrond et al. |
| 6,070,681 A | 6/2000 | Catanzarite et al. |
| 6,070,689 A | 6/2000 | Tanaka et al. |
| 6,078,252 A | 6/2000 | Kulczycki et al. |
| D428,363 S | 7/2000 | Sugimoto et al. |
| 6,086,158 A | 7/2000 | Zeoli |
| 6,092,877 A | 7/2000 | Rasidescu et al. |

(56) References Cited

U.S. PATENT DOCUMENTS

| | | |
|---|---|---|
| D429,663 S | 8/2000 | Tamashima et al. |
| 6,095,275 A | 8/2000 | Shaw |
| 6,098,739 A | 8/2000 | Anderson et al. |
| 6,109,221 A | 8/2000 | Higgins et al. |
| 6,112,866 A | 9/2000 | Boichot et al. |
| 6,113,328 A | 9/2000 | Claucherty |
| 6,114,784 A | 9/2000 | Nakano |
| 6,119,636 A | 9/2000 | Fan |
| 6,120,399 A | 9/2000 | Okeson et al. |
| 6,142,123 A | 11/2000 | Galasso et al. |
| 6,149,540 A | 11/2000 | Johnson et al. |
| 6,152,098 A | 11/2000 | Becker et al. |
| 6,152,253 A | 11/2000 | Monaghan |
| D436,557 S | 1/2001 | Selby et al. |
| D436,559 S | 1/2001 | Fujieda |
| 6,176,796 B1 | 1/2001 | Lislegard |
| 6,184,603 B1 | 2/2001 | Hamai et al. |
| 6,186,547 B1 | 2/2001 | Skabrond et al. |
| 6,196,168 B1 | 3/2001 | Eckerskorn et al. |
| 6,196,634 B1 | 3/2001 | Jurinek |
| 6,198,183 B1 | 3/2001 | Baeumel et al. |
| 6,199,894 B1 | 3/2001 | Anderson |
| 6,202,993 B1 | 3/2001 | Wilms et al. |
| 6,203,043 B1 | 3/2001 | Lehman |
| 6,213,079 B1 | 4/2001 | Watanabe |
| 6,213,081 B1 | 4/2001 | Ryu et al. |
| 6,216,660 B1 | 4/2001 | Ryu et al. |
| 6,216,809 B1 | 4/2001 | Etou et al. |
| 6,217,758 B1 | 4/2001 | Lee |
| 6,224,046 B1 | 5/2001 | Miyamoto |
| 6,227,160 B1 | 5/2001 | Kurihara et al. |
| 6,247,442 B1 | 6/2001 | Bedard et al. |
| 6,249,728 B1 | 6/2001 | Streiter |
| 6,260,609 B1 | 7/2001 | Takahashi |
| 6,293,588 B1 | 9/2001 | Clune |
| 6,293,617 B1 | 9/2001 | Sukegawa |
| 6,301,993 B1 | 10/2001 | Orr et al. |
| 6,309,024 B1 | 10/2001 | Busch |
| 6,309,317 B1 | 10/2001 | Joss |
| 6,311,676 B1 | 11/2001 | Oberg et al. |
| 6,314,931 B1 | 11/2001 | Yasuda et al. |
| 6,328,004 B1 | 12/2001 | Rynhart |
| 6,328,364 B1 | 12/2001 | Darbishire |
| 6,333,620 B1 | 12/2001 | Schmitz et al. |
| 6,334,269 B1 | 1/2002 | Dilks |
| 6,338,688 B1 | 1/2002 | Minami et al. |
| 6,352,142 B1 | 3/2002 | Kim |
| 6,353,786 B1 | 3/2002 | Yamada et al. |
| 6,359,344 B1 | 3/2002 | Klein et al. |
| 6,362,602 B1 | 3/2002 | Kozarekar |
| 6,370,458 B1 | 4/2002 | Shal et al. |
| 6,378,478 B1 | 4/2002 | Lagies |
| 6,394,061 B2 | 5/2002 | Ryu et al. |
| 6,397,795 B2 | 6/2002 | Hare |
| 6,412,585 B1 | 7/2002 | DeAnda |
| D461,151 S | 8/2002 | Morris |
| 6,453,868 B1 | 9/2002 | McClure |
| 6,467,787 B1 | 10/2002 | Marsh |
| D467,200 S | 12/2002 | Luo et al. |
| 6,502,886 B1 | 1/2003 | Bleau et al. |
| 6,504,259 B1 | 1/2003 | Kuroda et al. |
| 6,507,778 B2 | 1/2003 | Koh |
| 6,510,829 B2 | 1/2003 | Ito et al. |
| 6,510,891 B2 | 1/2003 | Anderson et al. |
| 6,520,133 B1 | 2/2003 | Wenger et al. |
| 6,520,878 B1 | 2/2003 | Leclair et al. |
| 6,523,627 B2 | 2/2003 | Fukuda |
| 6,523,634 B1 | 2/2003 | Gagnon et al. |
| RE38,012 E | 3/2003 | Ochab et al. |
| D472,193 S | 3/2003 | Sinkwitz |
| 6,528,918 B2 | 3/2003 | Paulus-Neues et al. |
| 6,530,730 B2 | 3/2003 | Swensen |
| 6,543,523 B2 | 4/2003 | Hasumi |
| 6,547,224 B2 | 4/2003 | Jensen et al. |
| 6,553,761 B2 | 4/2003 | Beck |
| 6,557,515 B2 | 5/2003 | Furuya et al. |
| 6,561,315 B2 | 5/2003 | Furuya et al. |
| 6,581,716 B1 | 6/2003 | Matsuura |
| 6,582,002 B2 | 6/2003 | Hogan et al. |
| 6,582,004 B1 | 6/2003 | Hamm |
| D476,935 S | 7/2003 | Boyer |
| 6,588,536 B1 | 7/2003 | Chiu |
| 6,591,896 B1 | 7/2003 | Hansen |
| 6,604,034 B1 | 8/2003 | Speck et al. |
| 6,622,804 B2 | 9/2003 | Schmitz et al. |
| 6,622,806 B1 | 9/2003 | Matsuura |
| 6,622,968 B1 | 9/2003 | St. Clair et al. |
| 6,626,256 B2 | 9/2003 | Dennison et al. |
| 6,626,260 B2 | 9/2003 | Gagnon et al. |
| D480,991 S | 10/2003 | Rondeau et al. |
| 6,640,766 B2 | 11/2003 | Furuya et al. |
| 6,644,709 B2 | 11/2003 | Inagaki et al. |
| 6,648,569 B2 | 11/2003 | Douglass et al. |
| 6,651,768 B2 | 11/2003 | Fournier et al. |
| 6,655,717 B1 | 12/2003 | Wang |
| 6,659,566 B2 | 12/2003 | Bombardier |
| 6,661,108 B1 | 12/2003 | Yamada et al. |
| 6,675,562 B2 | 1/2004 | Lawrence |
| 6,682,118 B2 | 1/2004 | Ryan |
| 6,685,174 B2 | 2/2004 | Behmenburg et al. |
| 6,691,767 B2 | 2/2004 | Southwick et al. |
| 6,695,566 B2 | 2/2004 | Rodriguez Navio |
| 6,702,052 B1 | 3/2004 | Wakashiro et al. |
| 6,722,463 B1 | 4/2004 | Reese |
| 6,725,905 B2 | 4/2004 | Hirano et al. |
| 6,725,962 B1 | 4/2004 | Fukuda |
| D490,018 S | 5/2004 | Berg et al. |
| 6,732,830 B2 | 5/2004 | Gagnon et al. |
| 6,733,060 B1 | 5/2004 | Pavkov et al. |
| 6,745,862 B2 | 6/2004 | Morii et al. |
| 6,752,235 B1 | 6/2004 | Bell et al. |
| 6,752,401 B2 | 6/2004 | Burdock |
| D492,916 S | 7/2004 | Rondeau et al. |
| 6,761,748 B2 | 7/2004 | Schenk et al. |
| 6,767,022 B1 | 7/2004 | Chevalier |
| D493,749 S | 8/2004 | Duncan |
| D493,750 S | 8/2004 | Crepeau et al. |
| D494,890 S | 8/2004 | Katoh |
| 6,769,391 B1 | 8/2004 | Lee et al. |
| 6,772,824 B1 | 8/2004 | Tsuruta |
| 6,777,846 B2 | 8/2004 | Feldner et al. |
| D496,308 S | 9/2004 | Wu |
| 6,786,187 B2 | 9/2004 | Nagai et al. |
| 6,786,526 B1 | 9/2004 | Blalock |
| D497,324 S | 10/2004 | Chestnut et al. |
| D497,327 S | 10/2004 | Lai |
| 6,799,779 B2 | 10/2004 | Shibayama |
| 6,799,781 B2 | 10/2004 | Rasidescu et al. |
| 6,809,429 B1 | 10/2004 | Frank |
| D498,435 S | 11/2004 | Saito et al. |
| 6,810,667 B2 | 11/2004 | Jung et al. |
| 6,810,977 B2 | 11/2004 | Suzuki |
| 6,820,583 B2 | 11/2004 | Maier |
| 6,820,708 B2 | 11/2004 | Nakamura |
| 6,822,353 B2 | 11/2004 | Koga et al. |
| 6,825,573 B2 | 11/2004 | Suzuki et al. |
| 6,827,184 B1 | 12/2004 | Lin |
| 6,834,736 B2 | 12/2004 | Kramer et al. |
| D500,707 S | 1/2005 | Lu |
| D501,570 S | 2/2005 | Tandrup et al. |
| 6,851,679 B2 | 2/2005 | Downey et al. |
| 6,857,498 B2 | 2/2005 | Vitale et al. |
| 6,860,826 B1 | 3/2005 | Johnson |
| 6,868,932 B1 | 3/2005 | Davis et al. |
| D503,657 S | 4/2005 | Katoh |
| D503,658 S | 4/2005 | Lu |
| D503,905 S | 4/2005 | Saito et al. |
| 6,880,875 B2 | 4/2005 | McClure et al. |
| 6,883,851 B2 | 4/2005 | McClure et al. |
| D504,638 S | 5/2005 | Tanaka et al. |
| 6,892,842 B2 | 5/2005 | Bouffard et al. |
| 6,892,844 B2 | 5/2005 | Atsuumi |
| 6,895,318 B1 | 5/2005 | Barton et al. |
| 6,901,992 B2 | 6/2005 | Kent et al. |

(56) References Cited

U.S. PATENT DOCUMENTS

| | | |
|---|---|---|
| 6,907,916 B2 | 6/2005 | Koyama |
| 6,908,108 B1 | 6/2005 | Scarla |
| 6,909,200 B2 | 6/2005 | Bouchon |
| D507,766 S | 7/2005 | McMahan et al. |
| 6,915,770 B2 | 7/2005 | Lu |
| 6,916,142 B2 | 7/2005 | Hansen et al. |
| 6,921,077 B1 | 7/2005 | Pupo |
| D508,224 S | 8/2005 | Mays et al. |
| 6,923,507 B1 | 8/2005 | Billberg et al. |
| 6,935,297 B2 | 8/2005 | Honda et al. |
| 6,938,508 B1 | 9/2005 | Saagge |
| 6,942,050 B1 | 9/2005 | Honkala et al. |
| 6,945,541 B2 | 9/2005 | Brown |
| 6,951,240 B2 | 10/2005 | Kolb |
| RE38,895 E | 11/2005 | McLemore |
| D511,317 S | 11/2005 | Tanaka et al. |
| D511,717 S | 11/2005 | Lin |
| 6,966,395 B2 | 11/2005 | Schuehmacher et al. |
| 6,966,399 B2 | 11/2005 | Tanigaki et al. |
| 6,976,720 B1 | 12/2005 | Bequette |
| 6,978,857 B2 | 12/2005 | Korenjak |
| D513,718 S | 1/2006 | Itaya et al. |
| 6,988,759 B2 | 1/2006 | Fin et al. |
| 6,997,239 B2 | 2/2006 | Kato |
| 7,000,931 B1 | 2/2006 | Chevalier |
| 7,004,134 B2 | 2/2006 | Higuchi |
| 7,004,137 B2 | 2/2006 | Kunugi et al. |
| D516,467 S | 3/2006 | Wu |
| D517,951 S | 3/2006 | Luh |
| D517,952 S | 3/2006 | Luh |
| 7,011,174 B1 | 3/2006 | James |
| 7,014,241 B2 | 3/2006 | Toyota et al. |
| 7,017,542 B2 | 3/2006 | Wilton et al. |
| D518,759 S | 4/2006 | Kettler et al. |
| D519,439 S | 4/2006 | Dahl et al. |
| 7,032,895 B2 | 4/2006 | Folchert |
| 7,035,836 B2 | 4/2006 | Caponetto et al. |
| D520,912 S | 5/2006 | Knight et al. |
| D520,914 S | 5/2006 | Luh |
| D521,413 S | 5/2006 | Katoh |
| 7,040,260 B2 | 5/2006 | Yoshimatsu et al. |
| 7,040,437 B1 | 5/2006 | Fredrickson et al. |
| 7,044,203 B2 | 5/2006 | Yagi et al. |
| 7,051,824 B1 | 5/2006 | Jones et al. |
| D522,924 S | 6/2006 | Yokoyama et al. |
| D523,782 S | 6/2006 | Lin |
| 7,055,454 B1 | 6/2006 | Whiting et al. |
| 7,070,527 B1 | 7/2006 | Saagge |
| 7,073,482 B2 | 7/2006 | Kirchberger |
| 7,076,351 B2 | 7/2006 | Hamilton et al. |
| 7,077,233 B2 | 7/2006 | Hasegawa |
| 7,089,737 B2 | 8/2006 | Claus |
| 7,096,988 B2 | 8/2006 | Moriyama |
| 7,097,166 B2 | 8/2006 | Folchert |
| 7,100,562 B2 | 9/2006 | Terada et al. |
| 7,104,242 B2 | 9/2006 | Nishi et al. |
| D529,414 S | 10/2006 | Wu et al. |
| D531,088 S | 10/2006 | Lin |
| 7,114,585 B2 | 10/2006 | Man et al. |
| 7,117,927 B2 | 10/2006 | Kent et al. |
| 7,118,151 B2 | 10/2006 | Bejin et al. |
| 7,124,853 B1 | 10/2006 | Kole, Jr. |
| 7,125,134 B1 | 10/2006 | Hedlund et al. |
| D532,339 S | 11/2006 | Hishiki |
| 7,136,729 B2 | 11/2006 | Salman et al. |
| 7,137,764 B2 | 11/2006 | Johnson |
| 7,140,619 B2 | 11/2006 | Hrovat et al. |
| 7,143,861 B2 | 12/2006 | Chu |
| 7,147,075 B2 | 12/2006 | Tanaka et al. |
| 7,152,706 B2 | 12/2006 | Pichler et al. |
| D535,215 S | 1/2007 | Turner et al. |
| 7,156,439 B2 | 1/2007 | Bejin et al. |
| 7,159,557 B2 | 1/2007 | Yasuda et al. |
| 7,165,522 B2 | 1/2007 | Malek et al. |
| 7,168,516 B2 | 1/2007 | Nozaki et al. |
| 7,168,709 B2 | 1/2007 | Niwa et al. |
| 7,172,232 B2 | 2/2007 | Chiku et al. |
| 7,182,169 B2 | 2/2007 | Suzuki |
| 7,185,732 B2 | 3/2007 | Saito et al. |
| D539,705 S | 4/2007 | Ichikawa et al. |
| 7,204,219 B2 | 4/2007 | Sakurai |
| 7,208,847 B2 | 4/2007 | Taniguchi |
| D542,186 S | 5/2007 | Lai et al. |
| D542,188 S | 5/2007 | Miwa et al. |
| 7,213,669 B2 | 5/2007 | Fecteau et al. |
| 7,216,733 B2 | 5/2007 | Iwami et al. |
| 7,224,132 B2 | 5/2007 | Cho et al. |
| 7,234,707 B2 | 6/2007 | Green et al. |
| D546,246 S | 7/2007 | Crepeau et al. |
| 7,237,789 B1 | 7/2007 | Herman |
| 7,239,032 B1 | 7/2007 | Wilson et al. |
| 7,243,564 B2 | 7/2007 | Chonan et al. |
| 7,243,632 B2 | 7/2007 | Hu |
| D548,662 S | 8/2007 | Markefka |
| D549,133 S | 8/2007 | LePage |
| 7,258,355 B2 | 8/2007 | Amano |
| 7,270,335 B2 | 9/2007 | Hio et al. |
| 7,275,512 B2 | 10/2007 | Deiss et al. |
| 7,281,753 B2 | 10/2007 | Curtis et al. |
| 7,286,919 B2 | 10/2007 | Nordgren et al. |
| 7,287,508 B2 | 10/2007 | Kurihara |
| 7,287,619 B2 | 10/2007 | Tanaka et al. |
| D555,036 S | 11/2007 | Eck |
| D561,064 S | 2/2008 | Crepeau |
| D562,189 S | 2/2008 | Miwa et al. |
| 7,325,526 B2 | 2/2008 | Kawamoto |
| D563,274 S | 3/2008 | Ramos |
| 7,347,296 B2 | 3/2008 | Nakamura et al. |
| 7,357,207 B2 | 4/2008 | Vaeisaenen |
| 7,357,211 B2 | 4/2008 | Inui |
| 7,359,787 B2 | 4/2008 | Ono et al. |
| 7,363,961 B2 | 4/2008 | Mori et al. |
| 7,367,247 B2 | 5/2008 | Horiuchi et al. |
| 7,367,417 B2 | 5/2008 | Inui et al. |
| 7,370,724 B2 | 5/2008 | Saito et al. |
| 7,374,012 B2 | 5/2008 | Inui et al. |
| 7,377,351 B2 | 5/2008 | Smith et al. |
| 7,380,622 B2 | 6/2008 | Shimizu |
| 7,380,805 B1 | 6/2008 | Turner |
| 7,386,378 B2 | 6/2008 | Lauwerys et al. |
| 7,387,180 B2 | 6/2008 | Konno et al. |
| 7,395,804 B2 | 7/2008 | Takemoto et al. |
| 7,401,794 B2 | 7/2008 | Laurent et al. |
| 7,401,797 B2 | 7/2008 | Cho |
| 7,407,190 B2 | 8/2008 | Berg et al. |
| 7,412,310 B2 | 8/2008 | Brigham et al. |
| 7,416,234 B2 | 8/2008 | Bequette |
| 7,421,954 B2 | 9/2008 | Bose |
| 7,427,072 B2 | 9/2008 | Brown |
| 7,427,248 B2 | 9/2008 | Chonan |
| D578,433 S | 10/2008 | Kawaguchi et al. |
| D578,934 S | 10/2008 | Tanaka et al. |
| 7,431,024 B2 | 10/2008 | Buchwitz et al. |
| 7,438,147 B2 | 10/2008 | Kato et al. |
| 7,438,153 B2 | 10/2008 | Kalsnes et al. |
| 7,441,789 B2 | 10/2008 | Geiger et al. |
| 7,449,793 B2 | 11/2008 | Cho et al. |
| 7,451,808 B2 | 11/2008 | Busse et al. |
| 7,455,134 B2 | 11/2008 | Severinsky et al. |
| 7,458,593 B2 | 12/2008 | Saito et al. |
| D584,661 S | 1/2009 | Tanaka et al. |
| 7,481,287 B2 | 1/2009 | Madson et al. |
| 7,481,293 B2 | 1/2009 | Ogawa et al. |
| 7,483,775 B2 | 1/2009 | Karaba et al. |
| D585,792 S | 2/2009 | Chao et al. |
| D586,694 S | 2/2009 | Huang et al. |
| 7,490,694 B1 | 2/2009 | Berg et al. |
| 7,497,299 B2 | 3/2009 | Kobayashi |
| 7,497,471 B2 | 3/2009 | Kobayashi |
| 7,497,472 B2 | 3/2009 | Cymbal et al. |
| 7,503,610 B2 | 3/2009 | Karagitz et al. |
| 7,506,712 B2 | 3/2009 | Kato et al. |
| 7,506,714 B2 | 3/2009 | Davis et al. |
| 7,510,060 B2 | 3/2009 | Izawa et al. |

(56) References Cited

U.S. PATENT DOCUMENTS

| | | |
|---|---|---|
| 7,510,199 B2 | 3/2009 | Nash et al. |
| D592,556 S | 5/2009 | Mehra |
| D592,557 S | 5/2009 | Mehra |
| D592,998 S | 5/2009 | Woodard et al. |
| 7,530,420 B2 | 5/2009 | Davis et al. |
| 7,537,070 B2 | 5/2009 | Maslov et al. |
| D593,454 S | 6/2009 | Sanschagrin et al. |
| D595,188 S | 6/2009 | Tandrup |
| 7,540,511 B2 | 6/2009 | Saito et al. |
| 7,546,892 B2 | 6/2009 | Lan et al. |
| D595,613 S | 7/2009 | Lai et al. |
| D596,080 S | 7/2009 | Lai et al. |
| 7,559,308 B2 | 7/2009 | Matsuda et al. |
| 7,565,944 B2 | 7/2009 | Sakamoto et al. |
| 7,565,945 B2 | 7/2009 | Okada et al. |
| D597,890 S | 8/2009 | Lai et al. |
| 7,571,039 B2 | 8/2009 | Chen et al. |
| 7,575,088 B2 | 8/2009 | Mir et al. |
| 7,575,211 B2 | 8/2009 | Andritter |
| D599,250 S | 9/2009 | Hirano |
| D599,251 S | 9/2009 | Yin et al. |
| 7,588,010 B2 | 9/2009 | Mochizuki et al. |
| 7,591,472 B2 | 9/2009 | Kinjyo et al. |
| 7,597,385 B2 | 10/2009 | Shibata et al. |
| 7,600,603 B2 | 10/2009 | Okada et al. |
| 7,600,762 B2 | 10/2009 | Yasui et al. |
| 7,600,769 B2 | 10/2009 | Bessho et al. |
| 7,604,084 B2 | 10/2009 | Okada et al. |
| 7,607,368 B2 | 10/2009 | Takahashi et al. |
| 7,610,132 B2 | 10/2009 | Yanai et al. |
| D604,201 S | 11/2009 | Kawaguchi et al. |
| 7,611,154 B2 | 11/2009 | Delaney |
| 7,617,803 B2 | 11/2009 | Fujimoto et al. |
| 7,621,262 B2 | 11/2009 | Zubeck |
| 7,623,327 B2 | 11/2009 | Ogawa |
| D605,555 S | 12/2009 | Tanaka et al. |
| D606,900 S | 12/2009 | Flores |
| D606,905 S | 12/2009 | Yao |
| 7,625,048 B2 | 12/2009 | Rouhana et al. |
| 7,630,807 B2 | 12/2009 | Yoshimura et al. |
| D607,377 S | 1/2010 | Shimomura et al. |
| 7,641,208 B1 | 1/2010 | Barron et al. |
| 7,644,791 B2 | 1/2010 | Davis et al. |
| 7,644,934 B2 | 1/2010 | Mizuta |
| 7,645,452 B2 | 1/2010 | Thompson et al. |
| 7,650,959 B2 | 1/2010 | Kato et al. |
| D609,136 S | 2/2010 | Renchuan |
| D610,514 S | 2/2010 | Eck |
| 7,658,258 B2 | 2/2010 | Denney |
| 7,677,646 B2 | 3/2010 | Nakamura |
| 7,682,115 B1 | 3/2010 | Jay et al. |
| 7,684,911 B2 | 3/2010 | Seifert et al. |
| 7,694,769 B2 | 4/2010 | McGuire |
| 7,703,566 B2 | 4/2010 | Wilson et al. |
| 7,703,730 B2 | 4/2010 | Best et al. |
| 7,703,826 B1 | 4/2010 | German |
| 7,708,103 B2 | 5/2010 | Okuyama et al. |
| 7,708,106 B1 | 5/2010 | Bergman et al. |
| 7,712,562 B2 | 5/2010 | Nozaki |
| 7,717,495 B2 | 5/2010 | Leonard et al. |
| 7,728,212 B2 | 6/2010 | Fujishima et al. |
| 7,740,092 B2 | 6/2010 | Bender |
| 7,740,103 B2 | 6/2010 | Sasajima |
| 7,740,256 B2 | 6/2010 | Davis |
| 7,742,851 B2 | 6/2010 | Hisada et al. |
| D620,399 S | 7/2010 | Wu et al. |
| 7,751,959 B2 | 7/2010 | Boon et al. |
| 7,753,427 B2 | 7/2010 | Yamamura et al. |
| D621,423 S | 8/2010 | Nakanishi et al. |
| D622,631 S | 8/2010 | Lai et al. |
| 7,769,505 B2 | 8/2010 | Rask et al. |
| 7,778,741 B2 | 8/2010 | Rao et al. |
| 7,786,886 B2 | 8/2010 | Maruyama et al. |
| 7,788,212 B2 | 8/2010 | Beckmann et al. |
| 7,795,602 B2 | 9/2010 | Leonard et al. |
| 7,802,816 B2 | 9/2010 | McGuire |
| D625,662 S | 10/2010 | Li |
| 7,810,818 B2 | 10/2010 | Bushko |
| 7,819,220 B2 | 10/2010 | Sunsdahl et al. |
| 7,828,098 B2 | 11/2010 | Yamamoto et al. |
| 7,832,770 B2 | 11/2010 | Bradley et al. |
| D628,520 S | 12/2010 | Lin |
| 7,845,452 B2 | 12/2010 | Bennett et al. |
| 7,857,334 B2 | 12/2010 | Seki |
| D631,395 S | 1/2011 | Tandrup et al. |
| 7,862,061 B2 | 1/2011 | Jung |
| 7,874,391 B2 | 1/2011 | Dahl et al. |
| D631,792 S | 2/2011 | Sanschagrin |
| D633,006 S | 2/2011 | Sanschagrin et al. |
| 7,882,912 B2 | 2/2011 | Nozaki et al. |
| 7,884,574 B2 | 2/2011 | Fukumura et al. |
| 7,885,750 B2 | 2/2011 | Lu |
| 7,891,684 B1 | 2/2011 | Luttinen et al. |
| 7,899,594 B2 | 3/2011 | Messih et al. |
| 7,912,610 B2 | 3/2011 | Saito et al. |
| 7,913,505 B2 | 3/2011 | Nakamura |
| 7,913,782 B1 | 3/2011 | Foss et al. |
| D636,295 S | 4/2011 | Eck et al. |
| D636,704 S | 4/2011 | Yoo et al. |
| D636,787 S | 4/2011 | Luxon et al. |
| D636,788 S | 4/2011 | Luxon et al. |
| 7,926,822 B2 | 4/2011 | Ohletz et al. |
| 7,931,106 B1 | 4/2011 | Suzuki et al. |
| D637,623 S | 5/2011 | Luxon et al. |
| D638,446 S | 5/2011 | Luxon et al. |
| D638,755 S | 5/2011 | Bracy et al. |
| 7,942,427 B2 | 5/2011 | Lloyd |
| 7,942,447 B2 | 5/2011 | Davis et al. |
| 7,950,486 B2 | 5/2011 | Van et al. |
| D640,171 S | 6/2011 | Danisi |
| D640,598 S | 6/2011 | Zhang |
| D640,604 S | 6/2011 | Lai et al. |
| D640,605 S | 6/2011 | Lai et al. |
| 7,954,679 B2 | 6/2011 | Edwards |
| 7,954,853 B2 | 6/2011 | Davis et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,967,100 B2 | 6/2011 | Cover et al. |
| 7,970,512 B2 | 6/2011 | Lu et al. |
| D641,288 S | 7/2011 | Sun |
| 7,984,780 B2 | 7/2011 | Hirukawa |
| 7,984,915 B2 | 7/2011 | Post et al. |
| D642,493 S | 8/2011 | Goebert et al. |
| D643,781 S | 8/2011 | Nagao et al. |
| 8,002,061 B2 | 8/2011 | Yamamura et al. |
| 8,005,596 B2 | 8/2011 | Lu et al. |
| 8,011,342 B2 | 9/2011 | Bluhm |
| 8,011,420 B2 | 9/2011 | Mazzocco et al. |
| 8,027,775 B2 | 9/2011 | Takenaka et al. |
| 8,029,021 B2* | 10/2011 | Leonard ............... B62D 55/04 180/21 |
| 8,032,281 B2 | 10/2011 | Bujak et al. |
| 8,037,959 B2 | 10/2011 | Yamamura et al. |
| D648,745 S | 11/2011 | Luxon et al. |
| D649,162 S | 11/2011 | Luxon et al. |
| 8,047,324 B2 | 11/2011 | Yao et al. |
| 8,047,451 B2 | 11/2011 | McNaughton |
| 8,050,818 B2 | 11/2011 | Mizuta |
| 8,050,851 B2 | 11/2011 | Aoki et al. |
| 8,050,857 B2 | 11/2011 | Lu et al. |
| 8,051,842 B2 | 11/2011 | Hagelstein et al. |
| 8,052,202 B2 | 11/2011 | Nakamura |
| 8,056,392 B2 | 11/2011 | Ryan et al. |
| 8,056,912 B2 | 11/2011 | Kawabe et al. |
| 8,065,054 B2 | 11/2011 | Tarasinski et al. |
| D650,311 S | 12/2011 | Bracy |
| 8,074,753 B2 | 12/2011 | Tahara et al. |
| 8,075,002 B1 | 12/2011 | Pionke et al. |
| 8,079,602 B2 | 12/2011 | Kinsman et al. |
| 8,086,371 B2 | 12/2011 | Furuichi et al. |
| 8,087,676 B2 | 1/2012 | McIntyre |
| 8,095,268 B2 | 1/2012 | Parison et al. |
| 8,100,434 B2 | 1/2012 | Miura |

(56) References Cited

U.S. PATENT DOCUMENTS

| | | |
|---|---|---|
| 8,104,524 B2 | 1/2012 | Manesh et al. |
| 8,108,104 B2 | 1/2012 | Hrovat et al. |
| 8,116,938 B2 | 2/2012 | Itagaki et al. |
| 8,121,757 B2 | 2/2012 | Song et al. |
| 8,122,988 B2 | 2/2012 | Obayashi et al. |
| D657,720 S | 4/2012 | Eck et al. |
| D657,721 S | 4/2012 | Miyanishi |
| 8,152,880 B2 | 4/2012 | Matschl et al. |
| 8,157,039 B2 | 4/2012 | Melvin et al. |
| 8,162,086 B2 | 4/2012 | Robinson |
| D660,746 S | 5/2012 | Bracy |
| 8,167,325 B2 | 5/2012 | Lee et al. |
| 8,170,749 B2 | 5/2012 | Mizuta |
| 8,176,957 B2 | 5/2012 | Manesh et al. |
| 8,186,333 B2 | 5/2012 | Sakuyama |
| 8,191,930 B2 | 6/2012 | Davis et al. |
| 8,205,910 B2 | 6/2012 | Leonard et al. |
| 8,209,087 B2 | 6/2012 | Haegglund et al. |
| D662,855 S | 7/2012 | Wang |
| 8,214,106 B2 | 7/2012 | Ghoneim et al. |
| 8,215,427 B2 | 7/2012 | Rouaud et al. |
| 8,215,694 B2 | 7/2012 | Smith et al. |
| 8,219,262 B2 | 7/2012 | Stiller |
| 8,229,642 B2 | 7/2012 | Post et al. |
| 8,231,164 B2 | 7/2012 | Schubring et al. |
| D665,309 S | 8/2012 | Lepine et al. |
| D665,705 S | 8/2012 | Lepine et al. |
| 8,235,155 B2 | 8/2012 | Seegert et al. |
| 8,260,496 B2 | 9/2012 | Gagliano |
| 8,269,457 B2 | 9/2012 | Wenger et al. |
| 8,271,175 B2 | 9/2012 | Takenaka et al. |
| 8,272,685 B2 | 9/2012 | Lucas et al. |
| D668,184 S | 10/2012 | Tashiro |
| 8,281,891 B2 | 10/2012 | Sugiura |
| 8,296,010 B2 | 10/2012 | Hirao et al. |
| D670,198 S | 11/2012 | Li et al. |
| D671,037 S | 11/2012 | Wu et al. |
| 8,302,711 B2 | 11/2012 | Kinsman et al. |
| 8,308,170 B2 | 11/2012 | Van et al. |
| 8,315,764 B2 | 11/2012 | Chen et al. |
| 8,321,088 B2 | 11/2012 | Brown et al. |
| 8,322,497 B2 | 12/2012 | Marjoram et al. |
| 8,323,147 B2 | 12/2012 | Wenger et al. |
| 8,328,235 B2 | 12/2012 | Schneider et al. |
| D674,728 S | 1/2013 | Matsumura |
| 8,352,143 B2 | 1/2013 | Lu et al. |
| 8,353,265 B2 | 1/2013 | Pursifull |
| 8,355,840 B2 | 1/2013 | Ammon et al. |
| 8,356,472 B2 | 1/2013 | Hiranuma et al. |
| 8,374,748 B2 | 2/2013 | Jolly |
| 8,376,373 B2 | 2/2013 | Conradie |
| 8,376,441 B2 | 2/2013 | Nakamura et al. |
| 8,381,855 B2 | 2/2013 | Suzuki et al. |
| 8,382,125 B2 | 2/2013 | Sunsdahl et al. |
| 8,386,109 B2 | 2/2013 | Nicholls |
| 8,387,594 B2 | 3/2013 | Wenger et al. |
| 8,396,627 B2 | 3/2013 | Jung et al. |
| D679,627 S | 4/2013 | Li et al. |
| D680,468 S | 4/2013 | Li et al. |
| D680,469 S | 4/2013 | Li et al. |
| 8,417,417 B2 | 4/2013 | Chen et al. |
| 8,424,832 B2 | 4/2013 | Robbins et al. |
| D682,737 S | 5/2013 | Li et al. |
| D682,739 S | 5/2013 | Patterson et al. |
| 8,434,774 B2 | 5/2013 | Leclerc et al. |
| 8,439,019 B1 | 5/2013 | Carlson et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,464,824 B1 | 6/2013 | Reisenberger |
| 8,465,050 B1 | 6/2013 | Spindler et al. |
| 8,473,157 B2 | 6/2013 | Savaresi et al. |
| 8,479,854 B1 | 7/2013 | Gagnon |
| 8,485,303 B2 | 7/2013 | Yamamoto et al. |
| 8,496,079 B2 | 7/2013 | Wenger et al. |
| 8,517,136 B2 | 8/2013 | Hurd et al. |
| 8,517,395 B2 | 8/2013 | Knox et al. |
| D689,396 S | 9/2013 | Wang |
| 8,522,911 B2 | 9/2013 | Hurd et al. |
| 8,538,628 B2 | 9/2013 | Backman |
| D691,519 S | 10/2013 | Fisher |
| D691,924 S | 10/2013 | Smith |
| 8,548,678 B2 | 10/2013 | Ummethala et al. |
| 8,548,710 B1 | 10/2013 | Reisenberger |
| 8,550,221 B2 | 10/2013 | Paulides et al. |
| 8,555,851 B2 | 10/2013 | Wenger et al. |
| 8,556,015 B2 | 10/2013 | Itoo et al. |
| 8,561,403 B2 | 10/2013 | Vandyne et al. |
| 8,567,541 B2 | 10/2013 | Wenger et al. |
| 8,567,847 B1 | 10/2013 | King et al. |
| D693,370 S | 11/2013 | Randhawa |
| 8,573,348 B2 | 11/2013 | Cantemir et al. |
| 8,573,605 B2 | 11/2013 | Di Maria |
| 8,579,060 B2 | 11/2013 | George et al. |
| 8,590,651 B2 | 11/2013 | Shigematsu et al. |
| D694,668 S | 12/2013 | Li et al. |
| D694,671 S | 12/2013 | Lai et al. |
| 8,596,398 B2 | 12/2013 | Bennett |
| 8,596,405 B2 | 12/2013 | Sunsdahl et al. |
| 8,613,335 B2 | 12/2013 | Deckard et al. |
| 8,613,336 B2 | 12/2013 | Deckard et al. |
| 8,613,337 B2 | 12/2013 | Kinsman et al. |
| 8,626,388 B2 | 1/2014 | Oikawa |
| 8,626,389 B2 | 1/2014 | Sidlosky |
| D699,627 S | 2/2014 | Tang |
| 8,640,814 B2 | 2/2014 | Deckard et al. |
| 8,641,052 B2 | 2/2014 | Kondo et al. |
| 8,645,024 B2 | 2/2014 | Daniels |
| 8,646,555 B2 | 2/2014 | Reed |
| 8,651,557 B2 | 2/2014 | Suzuki |
| 8,657,050 B2 | 2/2014 | Yamaguchi |
| D700,869 S | 3/2014 | Sato et al. |
| D701,143 S | 3/2014 | Shan |
| D701,469 S | 3/2014 | Lai et al. |
| 8,668,623 B2 | 3/2014 | Vuksa et al. |
| 8,671,919 B2 | 3/2014 | Nakasugi et al. |
| 8,672,106 B2 | 3/2014 | Laird et al. |
| 8,672,337 B2 | 3/2014 | Van et al. |
| D703,102 S | 4/2014 | Eck et al. |
| 8,689,925 B2 | 4/2014 | Ajisaka |
| 8,700,260 B2 | 4/2014 | Jolly et al. |
| 8,708,359 B2 | 4/2014 | Murray |
| 8,712,599 B1 | 4/2014 | Westpfahl |
| 8,712,639 B2 | 4/2014 | Lu et al. |
| D705,127 S | 5/2014 | Patterson et al. |
| 8,718,872 B2 | 5/2014 | Hirao et al. |
| 8,725,351 B1 | 5/2014 | Selden et al. |
| 8,731,774 B2 | 5/2014 | Yang |
| 8,746,719 B2 | 6/2014 | Safranski et al. |
| 8,763,739 B2 | 7/2014 | Belzile et al. |
| 8,781,705 B1 | 7/2014 | Reisenberger |
| 8,783,396 B2 | 7/2014 | Bowman |
| 8,783,400 B2 | 7/2014 | Hirukawa |
| D711,778 S | 8/2014 | Chun et al. |
| D712,311 S | 9/2014 | Morgan et al. |
| 8,827,019 B2 | 9/2014 | Deckard et al. |
| 8,827,020 B2 | 9/2014 | Deckard et al. |
| 8,827,025 B2 | 9/2014 | Hapka |
| 8,827,028 B2 | 9/2014 | Sunsdahl et al. |
| 8,827,856 B1 | 9/2014 | Younggren et al. |
| 8,834,307 B2 | 9/2014 | Itoo et al. |
| 8,840,076 B2 | 9/2014 | Zuber et al. |
| 8,864,174 B2 | 10/2014 | Minami et al. |
| 8,869,525 B2 | 10/2014 | Lingenauber et al. |
| D717,695 S | 11/2014 | Matsumura |
| D719,061 S | 12/2014 | Tandrup et al. |
| D721,300 S | 1/2015 | Li et al. |
| D722,538 S | 2/2015 | Song et al. |
| 8,944,449 B2 | 2/2015 | Hurd et al. |
| 8,960,347 B2 | 2/2015 | Bennett |
| 8,960,348 B2 | 2/2015 | Shomura et al. |
| 8,973,693 B2 | 3/2015 | Kinsman et al. |
| D727,794 S | 4/2015 | Tandrup et al. |

(56) References Cited

U.S. PATENT DOCUMENTS

| | | |
|---|---|---|
| 8,997,908 B2 | 4/2015 | Kinsman et al. |
| 8,998,253 B2 | 4/2015 | Novotny et al. |
| 9,010,768 B2 | 4/2015 | Kinsman et al. |
| 9,016,760 B2 | 4/2015 | Kuroda et al. |
| D730,239 S | 5/2015 | Gonzalez |
| 9,027,937 B2 | 5/2015 | Ryan et al. |
| 9,061,711 B2 | 6/2015 | Kuroda et al. |
| D734,689 S | 7/2015 | Hashimoto |
| D735,077 S | 7/2015 | Sato et al. |
| 9,091,468 B2 | 7/2015 | Colpan et al. |
| D735,615 S | 8/2015 | Itaya et al. |
| 9,102,205 B2 | 8/2015 | Kvien et al. |
| D737,724 S | 9/2015 | Schroeder et al. |
| D739,304 S | 9/2015 | Brown |
| 9,133,730 B2 | 9/2015 | Joergl et al. |
| 9,146,061 B2 | 9/2015 | Farlow et al. |
| 9,162,561 B2 | 10/2015 | Marois et al. |
| 9,186,952 B2 | 11/2015 | Yleva |
| 9,187,083 B2 | 11/2015 | Wenger et al. |
| 9,194,278 B2 | 11/2015 | Fronk et al. |
| 9,194,282 B2 | 11/2015 | Serres et al. |
| 9,211,924 B2 | 12/2015 | Safranski et al. |
| 9,217,501 B2 | 12/2015 | Deckard et al. |
| 9,221,508 B1 | 12/2015 | De Haan |
| 9,228,644 B2 | 1/2016 | Tsukamoto et al. |
| 9,266,417 B2 | 2/2016 | Nadeau et al. |
| D751,467 S | 3/2016 | Lai et al. |
| D756,845 S | 5/2016 | Flores |
| 9,327,587 B2 | 5/2016 | Spindler et al. |
| 9,328,652 B2 | 5/2016 | Bruss et al. |
| D758,281 S | 6/2016 | Galloway |
| 9,365,251 B2 | 6/2016 | Safranski et al. |
| D761,698 S | 7/2016 | Umemoto |
| 9,381,803 B2 | 7/2016 | Galsworthy et al. |
| 9,382,832 B2 | 7/2016 | Bowers |
| 9,393,894 B2 | 7/2016 | Steinmetz et al. |
| D762,522 S | 8/2016 | Kinoshita |
| D763,732 S | 8/2016 | Okuyama et al. |
| D764,973 S | 8/2016 | Mikhailov et al. |
| 9,421,860 B2 | 8/2016 | Schuhmacher et al. |
| 9,428,031 B2 | 8/2016 | Kuwabara et al. |
| 9,434,244 B2 | 9/2016 | Sunsdahl et al. |
| 9,440,671 B2 | 9/2016 | Schlangen et al. |
| 9,469,329 B1 | 10/2016 | Leanza |
| D772,755 S | 11/2016 | Tandrup et al. |
| 9,499,044 B2 | 11/2016 | Osaki |
| 9,500,264 B2 | 11/2016 | Aitcin et al. |
| D774,955 S | 12/2016 | Lai et al. |
| D774,957 S | 12/2016 | Umemoto |
| 9,512,809 B2 | 12/2016 | Tsumiyama et al. |
| 9,540,052 B2 | 1/2017 | Burt, II et al. |
| 9,566,858 B2 | 2/2017 | Hicke et al. |
| 9,573,561 B2 | 2/2017 | Muto et al. |
| 9,592,713 B2 | 3/2017 | Kinsman et al. |
| D784,199 S | 4/2017 | Dunshee et al. |
| 9,623,912 B2 | 4/2017 | Schlangen |
| D785,502 S | 5/2017 | Dunshee et al. |
| D787,985 S | 5/2017 | Wilcox et al. |
| 9,638,070 B2 | 5/2017 | Kaeser |
| 9,644,717 B2 | 5/2017 | Aitcin |
| 9,649,928 B2 | 5/2017 | Danielson et al. |
| 9,650,078 B2 | 5/2017 | Kinsman et al. |
| 9,713,976 B2 | 7/2017 | Miller et al. |
| 9,718,351 B2 | 8/2017 | Ripley et al. |
| 9,719,463 B2 | 8/2017 | Oltmans et al. |
| 9,725,023 B2 | 8/2017 | Miller et al. |
| 9,752,489 B2 | 9/2017 | Chu |
| 9,776,481 B2 | 10/2017 | Deckard et al. |
| 9,789,909 B2 | 10/2017 | Erspamer et al. |
| 9,802,605 B2 | 10/2017 | Wenger et al. |
| 9,809,102 B2 | 11/2017 | Sunsdahl et al. |
| D804,993 S | 12/2017 | Eck et al. |
| D805,009 S | 12/2017 | Eck et al. |
| D805,015 S | 12/2017 | Eck et al. |
| 9,856,817 B2 | 1/2018 | Nicosia et al. |
| 9,884,647 B2 | 2/2018 | Peterson et al. |
| 9,895,946 B2 | 2/2018 | Schlangen et al. |
| 9,908,577 B2 | 3/2018 | Novak et al. |
| 9,944,177 B2 | 4/2018 | Fischer et al. |
| 10,011,189 B2 | 7/2018 | Sunsdahl et al. |
| 10,017,090 B2 | 7/2018 | Franker et al. |
| 10,036,311 B2 | 7/2018 | Kaeser et al. |
| 10,066,729 B2 | 9/2018 | Aitcin et al. |
| D832,149 S | 10/2018 | Wilcox et al. |
| 10,099,547 B2 | 10/2018 | Bessho et al. |
| 10,112,555 B2 | 10/2018 | Aguilera et al. |
| 10,124,709 B2 | 11/2018 | Bohnsack et al. |
| D835,545 S | 12/2018 | Hanten et al. |
| 10,154,377 B2 | 12/2018 | Post et al. |
| 10,160,497 B2 | 12/2018 | Wimpfheimer et al. |
| 10,183,605 B2 | 1/2019 | Weber et al. |
| 10,189,524 B2 | 1/2019 | Schafer et al. |
| 10,202,149 B1 | 2/2019 | Johnson et al. |
| 10,207,555 B2 | 2/2019 | Mailhot et al. |
| 10,221,727 B1 | 3/2019 | Walter et al. |
| 10,239,571 B2 | 3/2019 | Kennedy et al. |
| 10,246,153 B2 | 4/2019 | Deckard et al. |
| 10,259,507 B1 | 4/2019 | Johnson et al. |
| 10,294,877 B2 | 5/2019 | Arima et al. |
| 10,300,786 B2 | 5/2019 | Nugteren et al. |
| 10,323,568 B2 | 6/2019 | Kaeser et al. |
| D852,674 S | 7/2019 | Wilcox et al. |
| 10,359,011 B2 | 7/2019 | Dewit et al. |
| 10,369,861 B2 | 8/2019 | Deckard et al. |
| 10,371,249 B1 | 8/2019 | Bluhm et al. |
| 10,399,401 B2 | 9/2019 | Schlangen et al. |
| 10,428,705 B2 | 10/2019 | Bluhm et al. |
| 10,479,422 B2 | 11/2019 | Hollman et al. |
| 10,486,748 B2 | 11/2019 | Deckard et al. |
| 10,550,754 B2 | 2/2020 | Nugteren et al. |
| 10,589,621 B1 | 3/2020 | McKoskey et al. |
| 10,639,985 B2 | 5/2020 | Battaglini et al. |
| 10,655,536 B1 | 5/2020 | Mueller et al. |
| 10,697,532 B2 | 6/2020 | Schleif et al. |
| 10,718,238 B2 | 7/2020 | Wenger et al. |
| 10,723,190 B2 | 7/2020 | Hu et al. |
| D896,125 S | 9/2020 | Hashimoto et al. |
| D896,702 S | 9/2020 | Dunshee et al. |
| D896,703 S | 9/2020 | Dunshee et al. |
| 10,766,533 B2 | 9/2020 | Houkom et al. |
| 10,767,745 B2 | 9/2020 | Zauner et al. |
| 10,800,250 B2 | 10/2020 | Nugteren et al. |
| D904,227 S | 12/2020 | Bracy |
| 10,864,828 B2 | 12/2020 | Sunsdahl et al. |
| 10,876,462 B1 | 12/2020 | Draisey et al. |
| 10,926,618 B2 | 2/2021 | Deckard et al. |
| 10,926,664 B2 | 2/2021 | Sunsdahl et al. |
| 10,926,799 B2 | 2/2021 | Houkom et al. |
| D913,847 S | 3/2021 | Hashimoto et al. |
| 10,933,932 B2 | 3/2021 | Spindler et al. |
| 10,946,736 B2 | 3/2021 | Fischer et al. |
| 10,960,941 B2 | 3/2021 | Endrizzi et al. |
| 10,967,694 B2 | 4/2021 | Brady et al. |
| 11,104,194 B2 | 8/2021 | Schlangen et al. |
| 11,173,808 B2 | 11/2021 | Swain et al. |
| 11,220,147 B2 | 1/2022 | Hu et al. |
| 11,235,814 B2 | 2/2022 | Schlangen et al. |
| 11,285,807 B2 | 3/2022 | Galsworthy et al. |
| 11,293,540 B2 | 4/2022 | Leclair et al. |
| 11,306,809 B2 | 4/2022 | Aitcin |
| 11,391,361 B2 | 7/2022 | Leclair et al. |
| 11,607,920 B2 | 3/2023 | Schlangen et al. |
| 11,624,427 B2 | 4/2023 | Itoo et al. |
| 11,628,722 B2 | 4/2023 | Rasa et al. |
| 11,680,635 B2 | 6/2023 | Olason |
| 11,691,674 B2 | 7/2023 | Schleif et al. |
| 11,752,860 B2 | 9/2023 | Fields et al. |
| 11,780,326 B2 | 10/2023 | Schlangen et al. |
| 11,787,251 B2 | 10/2023 | Schlangen et al. |
| 11,884,148 B2 | 1/2024 | Nelson et al. |
| 11,926,190 B2 | 3/2024 | Schlangen et al. |
| 2001/0005803 A1 | 6/2001 | Cochofel et al. |
| 2001/0007396 A1 | 7/2001 | Mizuta |
| 2001/0013433 A1 | 8/2001 | Szymkowiak |

(56) References Cited

U.S. PATENT DOCUMENTS

| | | |
|---|---|---|
| 2001/0020554 A1 | 9/2001 | Yanase et al. |
| 2001/0021887 A1 | 9/2001 | Obradovich et al. |
| 2001/0031185 A1 | 10/2001 | Swensen |
| 2001/0035642 A1 | 11/2001 | Gotz et al. |
| 2001/0041126 A1 | 11/2001 | Morin et al. |
| 2001/0043808 A1 | 11/2001 | Matsunaga et al. |
| 2002/0000210 A1 | 1/2002 | Shinpo et al. |
| 2002/0023792 A1 | 2/2002 | Bouffard et al. |
| 2002/0032088 A1 | 3/2002 | Korenjak et al. |
| 2002/0033295 A1 | 3/2002 | Korenjak et al. |
| 2002/0042313 A1 | 4/2002 | Aitcin |
| 2002/0056969 A1 | 5/2002 | Sawai et al. |
| 2002/0063440 A1 | 5/2002 | Spurr et al. |
| 2002/0074760 A1 | 6/2002 | Eshelman |
| 2002/0082752 A1 | 6/2002 | Obradovich |
| 2002/0088661 A1 | 7/2002 | Gagnon et al. |
| 2002/0092484 A1 | 7/2002 | Fegg et al. |
| 2002/0119846 A1 | 8/2002 | Kitai et al. |
| 2002/0121795 A1 | 9/2002 | Murray |
| 2002/0123400 A1 | 9/2002 | Younggren et al. |
| 2002/0135175 A1 | 9/2002 | Schroth |
| 2002/0147072 A1 | 10/2002 | Goodell et al. |
| 2002/0178968 A1 | 12/2002 | Christensen |
| 2002/0179354 A1 | 12/2002 | White |
| 2003/0001409 A1 | 1/2003 | Semple et al. |
| 2003/0015531 A1 | 1/2003 | Choi |
| 2003/0029413 A1 | 2/2003 | Sachdev et al. |
| 2003/0034187 A1 | 2/2003 | Hisada et al. |
| 2003/0057724 A1 | 3/2003 | Inagaki et al. |
| 2003/0066696 A1 | 4/2003 | Nakamura |
| 2003/0070849 A1 | 4/2003 | Whittaker |
| 2003/0104900 A1 | 6/2003 | Takahashi et al. |
| 2003/0125857 A1 | 7/2003 | Madau et al. |
| 2003/0132075 A1 | 7/2003 | Drivers |
| 2003/0137121 A1 | 7/2003 | Lenz et al. |
| 2003/0153426 A1 | 8/2003 | Brown |
| 2003/0168267 A1 | 9/2003 | Borroni-Bird et al. |
| 2003/0173754 A1 | 9/2003 | Bryant |
| 2003/0200016 A1 | 10/2003 | Spillane et al. |
| 2003/0205867 A1 | 11/2003 | Coelingh et al. |
| 2003/0213628 A1 | 11/2003 | Rioux et al. |
| 2004/0010383 A1 | 1/2004 | Lu et al. |
| 2004/0018903 A1 | 1/2004 | Takagi |
| 2004/0031451 A1 | 2/2004 | Atschreiter et al. |
| 2004/0041358 A1 | 3/2004 | Hrovat et al. |
| 2004/0063535 A1 | 4/2004 | Ibaraki |
| 2004/0079561 A1 | 4/2004 | Ozawa et al. |
| 2004/0083730 A1 | 5/2004 | Wizgall et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0108159 A1 | 6/2004 | Rondeau et al. |
| 2004/0129489 A1 | 7/2004 | Brasseal et al. |
| 2004/0130224 A1 | 7/2004 | Mogi et al. |
| 2004/0153782 A1 | 8/2004 | Fukui et al. |
| 2004/0168455 A1 | 9/2004 | Nakamura |
| 2004/0169347 A1 | 9/2004 | Seki |
| 2004/0177827 A1 | 9/2004 | Hoyte et al. |
| 2004/0188159 A1 | 9/2004 | Yatagai et al. |
| 2004/0195018 A1 | 10/2004 | Inui et al. |
| 2004/0195019 A1 | 10/2004 | Kato et al. |
| 2004/0195034 A1 | 10/2004 | Kato et al. |
| 2004/0195797 A1 | 10/2004 | Nash et al. |
| 2004/0206567 A1 | 10/2004 | Kato et al. |
| 2004/0206568 A1 | 10/2004 | Davis et al. |
| 2004/0207190 A1 | 10/2004 | Nakagawa et al. |
| 2004/0214668 A1 | 10/2004 | Takano |
| 2004/0221669 A1 | 11/2004 | Shimizu et al. |
| 2004/0224806 A1 | 11/2004 | Chonan |
| 2004/0226384 A1 | 11/2004 | Shimizu et al. |
| 2004/0226761 A1 | 11/2004 | Takenaka et al. |
| 2004/0231630 A1 | 11/2004 | Liebert |
| 2004/0231900 A1 | 11/2004 | Tanaka et al. |
| 2005/0006168 A1 | 1/2005 | Iwasaka et al. |
| 2005/0012421 A1 | 1/2005 | Fukuda et al. |
| 2005/0014582 A1 | 1/2005 | Whiting et al. |
| 2005/0045414 A1 | 3/2005 | Takagi et al. |
| 2005/0052080 A1 | 3/2005 | Maslov et al. |
| 2005/0055140 A1 | 3/2005 | Brigham et al. |
| 2005/0056472 A1 | 3/2005 | Smith et al. |
| 2005/0073187 A1 | 4/2005 | Frank et al. |
| 2005/0077098 A1 | 4/2005 | Takayanagi et al. |
| 2005/0098964 A1 | 5/2005 | Brown |
| 2005/0103558 A1 | 5/2005 | Davis et al. |
| 2005/0131604 A1 | 6/2005 | Lu |
| 2005/0173177 A1 | 8/2005 | Smith et al. |
| 2005/0173180 A1 | 8/2005 | Hypes et al. |
| 2005/0205319 A1 | 9/2005 | Yatagai et al. |
| 2005/0206111 A1 | 9/2005 | Gibson et al. |
| 2005/0231145 A1 | 10/2005 | Mukai et al. |
| 2005/0235767 A1 | 10/2005 | Shimizu et al. |
| 2005/0235768 A1 | 10/2005 | Shimizu et al. |
| 2005/0242677 A1 | 11/2005 | Akutsu et al. |
| 2005/0246052 A1 | 11/2005 | Coleman et al. |
| 2005/0248116 A1 | 11/2005 | Fanson |
| 2005/0248173 A1 | 11/2005 | Bejin et al. |
| 2005/0257989 A1 | 11/2005 | Iwami et al. |
| 2005/0257990 A1 | 11/2005 | Shimizu |
| 2005/0267660 A1 | 12/2005 | Fujiwara et al. |
| 2005/0269141 A1 | 12/2005 | Davis et al. |
| 2005/0279244 A1 | 12/2005 | Bose |
| 2005/0279330 A1 | 12/2005 | Okazaki et al. |
| 2005/0280219 A1 | 12/2005 | Brown |
| 2006/0000458 A1 | 1/2006 | Dees et al. |
| 2006/0006010 A1 | 1/2006 | Nakamura et al. |
| 2006/0006623 A1 | 1/2006 | Leclair |
| 2006/0006696 A1 | 1/2006 | Umemoto et al. |
| 2006/0017240 A1 | 1/2006 | Laurent et al. |
| 2006/0017301 A1 | 1/2006 | Edwards |
| 2006/0022619 A1 | 2/2006 | Koike et al. |
| 2006/0032690 A1 | 2/2006 | Inomoto et al. |
| 2006/0032700 A1 | 2/2006 | Vizanko |
| 2006/0042862 A1 | 3/2006 | Saito et al. |
| 2006/0055139 A1 | 3/2006 | Furumi et al. |
| 2006/0065472 A1 | 3/2006 | Ogawa et al. |
| 2006/0071441 A1 | 4/2006 | Mathis |
| 2006/0075840 A1 | 4/2006 | Saito et al. |
| 2006/0076180 A1 | 4/2006 | Saito et al. |
| 2006/0108174 A1 | 5/2006 | Saito et al. |
| 2006/0112695 A1 | 6/2006 | Neubauer et al. |
| 2006/0130888 A1 | 6/2006 | Yamaguchi et al. |
| 2006/0131088 A1 | 6/2006 | Pawusch et al. |
| 2006/0131102 A1 | 6/2006 | Rauch et al. |
| 2006/0151970 A1 | 7/2006 | Kaminski et al. |
| 2006/0162990 A1 | 7/2006 | Saito et al. |
| 2006/0169525 A1 | 8/2006 | Saito et al. |
| 2006/0175124 A1 | 8/2006 | Saito et al. |
| 2006/0180383 A1 | 8/2006 | Bataille et al. |
| 2006/0180385 A1 | 8/2006 | Yanai et al. |
| 2006/0181104 A1 | 8/2006 | Khan et al. |
| 2006/0185741 A1 | 8/2006 | McKee |
| 2006/0185927 A1 | 8/2006 | Sakamoto et al. |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito et al. |
| 2006/0196722 A1 | 9/2006 | Makabe et al. |
| 2006/0197331 A1 | 9/2006 | Davis et al. |
| 2006/0201270 A1 | 9/2006 | Kobayashi |
| 2006/0207823 A1 | 9/2006 | Okada et al. |
| 2006/0207824 A1 | 9/2006 | Saito et al. |
| 2006/0207825 A1 | 9/2006 | Okada et al. |
| 2006/0208564 A1 | 9/2006 | Yuda et al. |
| 2006/0212200 A1 | 9/2006 | Yanai et al. |
| 2006/0219452 A1 | 10/2006 | Okada et al. |
| 2006/0219463 A1 | 10/2006 | Seki et al. |
| 2006/0219469 A1 | 10/2006 | Okada et al. |
| 2006/0219470 A1 | 10/2006 | Imagawa et al. |
| 2006/0220330 A1 | 10/2006 | Urquidi et al. |
| 2006/0220341 A1 | 10/2006 | Seki et al. |
| 2006/0236980 A1 | 10/2006 | Maruo et al. |
| 2006/0255610 A1 | 11/2006 | Bejin et al. |
| 2006/0270503 A1 | 11/2006 | Suzuki et al. |

(56) References Cited

U.S. PATENT DOCUMENTS

| | | |
|---|---|---|
| 2006/0278197 A1 | 12/2006 | Takamatsu et al. |
| 2006/0278451 A1 | 12/2006 | Takahashi et al. |
| 2006/0288800 A1 | 12/2006 | Mukai et al. |
| 2007/0000715 A1 | 1/2007 | Denney |
| 2007/0013181 A1 | 1/2007 | Heck |
| 2007/0018419 A1 | 1/2007 | Kinouchi et al. |
| 2007/0023221 A1 | 2/2007 | Okuyama et al. |
| 2007/0023566 A1 | 2/2007 | Howard |
| 2007/0068726 A1 | 3/2007 | Shimizu |
| 2007/0073461 A1 | 3/2007 | Fielder |
| 2007/0074588 A1 | 4/2007 | Harata et al. |
| 2007/0074589 A1 | 4/2007 | Harata et al. |
| 2007/0074927 A1 | 4/2007 | Okada et al. |
| 2007/0074928 A1 | 4/2007 | Okada et al. |
| 2007/0080006 A1 | 4/2007 | Yamaguchi |
| 2007/0095601 A1 | 5/2007 | Okada et al. |
| 2007/0096449 A1 | 5/2007 | Okada et al. |
| 2007/0119650 A1 | 5/2007 | Eide |
| 2007/0120332 A1 | 5/2007 | Bushko et al. |
| 2007/0144800 A1 | 6/2007 | Stone |
| 2007/0158920 A1 | 7/2007 | Delaney |
| 2007/0169989 A1 | 7/2007 | Eavenson et al. |
| 2007/0175696 A1 | 8/2007 | Saito et al. |
| 2007/0181358 A1 | 8/2007 | Nakagaki et al. |
| 2007/0209613 A1 | 9/2007 | Pantow |
| 2007/0214818 A1 | 9/2007 | Nakamura |
| 2007/0215404 A1 | 9/2007 | Lan et al. |
| 2007/0221430 A1 | 9/2007 | Allison |
| 2007/0227793 A1 | 10/2007 | Nozaki et al. |
| 2007/0242398 A1 | 10/2007 | Ogawa |
| 2007/0251744 A1 | 11/2007 | Matsuzawa |
| 2007/0255466 A1 | 11/2007 | Chiao |
| 2007/0256882 A1 | 11/2007 | Bedard et al. |
| 2007/0257479 A1 | 11/2007 | Davis et al. |
| 2007/0261904 A1 | 11/2007 | Fecteau et al. |
| 2008/0022981 A1 | 1/2008 | Keyaki et al. |
| 2008/0023240 A1 | 1/2008 | Sunsdahl et al. |
| 2008/0023249 A1 | 1/2008 | Sunsdahl et al. |
| 2008/0028603 A1 | 2/2008 | Takegawa et al. |
| 2008/0041335 A1 | 2/2008 | Buchwitz et al. |
| 2008/0048423 A1 | 2/2008 | Eriksson et al. |
| 2008/0053738 A1 | 3/2008 | Kosuge et al. |
| 2008/0053743 A1 | 3/2008 | Tomita |
| 2008/0059034 A1 | 3/2008 | Lu |
| 2008/0083392 A1 | 4/2008 | Kurihara et al. |
| 2008/0084091 A1 | 4/2008 | Nakamura et al. |
| 2008/0093883 A1 | 4/2008 | Shibata et al. |
| 2008/0106115 A1 | 5/2008 | Hughes |
| 2008/0125256 A1 | 5/2008 | Murayama et al. |
| 2008/0143505 A1 | 6/2008 | Maruyama et al. |
| 2008/0157592 A1 | 7/2008 | Bax et al. |
| 2008/0172155 A1 | 7/2008 | Takamatsu et al. |
| 2008/0178829 A1 | 7/2008 | Ochiai et al. |
| 2008/0178830 A1 | 7/2008 | Sposato |
| 2008/0183353 A1 | 7/2008 | Post et al. |
| 2008/0199253 A1 | 8/2008 | Okada et al. |
| 2008/0202483 A1 | 8/2008 | Procknow |
| 2008/0227578 A1 | 9/2008 | Imura |
| 2008/0240847 A1 | 10/2008 | Crouse |
| 2008/0243336 A1 | 10/2008 | Fitzgibbons |
| 2008/0256738 A1 | 10/2008 | Malone |
| 2008/0257625 A1 | 10/2008 | Stranges |
| 2008/0257630 A1 | 10/2008 | Takeshima et al. |
| 2008/0271937 A1 | 11/2008 | King et al. |
| 2008/0275606 A1 | 11/2008 | Tarasinski et al. |
| 2008/0283326 A1 | 11/2008 | Bennett et al. |
| 2008/0284124 A1 | 11/2008 | Brady et al. |
| 2008/0289796 A1 | 11/2008 | Sasano et al. |
| 2008/0289896 A1 | 11/2008 | Kosuge et al. |
| 2008/0296076 A1 | 12/2008 | Murayama et al. |
| 2008/0296884 A1 | 12/2008 | Rouhana et al. |
| 2008/0299448 A1 | 12/2008 | Buck et al. |
| 2008/0303234 A1 | 12/2008 | Mc Cann |
| 2008/0308334 A1 | 12/2008 | Leonard et al. |
| 2008/0308337 A1 | 12/2008 | Ishida |
| 2009/0000849 A1 | 1/2009 | Leonard et al. |
| 2009/0001748 A1 | 1/2009 | Brown et al. |
| 2009/0014246 A1 | 1/2009 | Lin |
| 2009/0014977 A1 | 1/2009 | Molenaar |
| 2009/0015023 A1 | 1/2009 | Fleckner |
| 2009/0037051 A1 | 2/2009 | Shimizu et al. |
| 2009/0064642 A1 | 3/2009 | Sato et al. |
| 2009/0065285 A1 | 3/2009 | Maeda et al. |
| 2009/0071737 A1 | 3/2009 | Leonard et al. |
| 2009/0071739 A1 | 3/2009 | Leonard et al. |
| 2009/0078082 A1 | 3/2009 | Poskie et al. |
| 2009/0078491 A1 | 3/2009 | Tsutsumikoshi et al. |
| 2009/0090575 A1 | 4/2009 | Nagasaka |
| 2009/0091101 A1 | 4/2009 | Leonard et al. |
| 2009/0091137 A1 | 4/2009 | Nishida et al. |
| 2009/0093928 A1 | 4/2009 | Getman et al. |
| 2009/0108546 A1 | 4/2009 | Ohletz et al. |
| 2009/0108617 A1 | 4/2009 | Songwe, Jr. |
| 2009/0121518 A1 | 5/2009 | Leonard et al. |
| 2009/0146119 A1 | 6/2009 | Bailey et al. |
| 2009/0152035 A1 | 6/2009 | Okada et al. |
| 2009/0152036 A1 | 6/2009 | Okada et al. |
| 2009/0177345 A1 | 7/2009 | Severinsky et al. |
| 2009/0178871 A1 | 7/2009 | Sunsdahl et al. |
| 2009/0179509 A1 | 7/2009 | Gerundt et al. |
| 2009/0183939 A1 | 7/2009 | Smith et al. |
| 2009/0184531 A1 | 7/2009 | Yamamura et al. |
| 2009/0189373 A1 | 7/2009 | Schramm et al. |
| 2009/0205891 A1 | 8/2009 | Parrett et al. |
| 2009/0227404 A1 | 9/2009 | Beyer |
| 2009/0240427 A1 | 9/2009 | Siereveld et al. |
| 2009/0261542 A1 | 10/2009 | McIntyre |
| 2009/0286643 A1 | 11/2009 | Brown |
| 2009/0295113 A1 | 12/2009 | Inoue et al. |
| 2009/0301830 A1 | 12/2009 | Kinsman et al. |
| 2009/0302590 A1 | 12/2009 | Van et al. |
| 2009/0314462 A1 | 12/2009 | Yahia et al. |
| 2010/0012412 A1 | 1/2010 | Deckard et al. |
| 2010/0017059 A1 | 1/2010 | Lu et al. |
| 2010/0019539 A1 | 1/2010 | Nakamura et al. |
| 2010/0019722 A1 | 1/2010 | Sanchez |
| 2010/0019729 A1 | 1/2010 | Kaita et al. |
| 2010/0031902 A1 | 2/2010 | Alyanak et al. |
| 2010/0031935 A1 * | 2/2010 | VanDyne ............... F02B 39/04 475/196 |
| 2010/0057297 A1 | 3/2010 | Itagaki et al. |
| 2010/0078240 A1 | 4/2010 | Miura |
| 2010/0078256 A1 | 4/2010 | Kuwabara et al. |
| 2010/0090797 A1 | 4/2010 | Koenig et al. |
| 2010/0120565 A1 | 5/2010 | Kochidomari et al. |
| 2010/0121512 A1 | 5/2010 | Takahashi et al. |
| 2010/0121529 A1 | 5/2010 | Savaresi et al. |
| 2010/0152969 A1 | 6/2010 | Li et al. |
| 2010/0155013 A1 | 6/2010 | Braun et al. |
| 2010/0155170 A1 | 6/2010 | Melvin et al. |
| 2010/0162989 A1 | 7/2010 | Aamand et al. |
| 2010/0163324 A1 | 7/2010 | Jyoutaki et al. |
| 2010/0181134 A1 | 7/2010 | Sugiura |
| 2010/0187032 A1 | 7/2010 | Yamamura et al. |
| 2010/0187033 A1 | 7/2010 | Hayashi et al. |
| 2010/0194086 A1 | 8/2010 | Yamamura et al. |
| 2010/0194087 A1 | 8/2010 | Yamamura et al. |
| 2010/0211242 A1 | 8/2010 | Kelty et al. |
| 2010/0211261 A1 | 8/2010 | Sasaki et al. |
| 2010/0230876 A1 | 9/2010 | Inoue et al. |
| 2010/0252972 A1 | 10/2010 | Cox et al. |
| 2010/0253018 A1 | 10/2010 | Peterson |
| 2010/0301571 A1 | 12/2010 | Van et al. |
| 2010/0311529 A1 | 12/2010 | Ochab et al. |
| 2010/0314184 A1 | 12/2010 | Stenberg et al. |
| 2010/0314191 A1 | 12/2010 | Deckard et al. |
| 2010/0317484 A1 | 12/2010 | Gillingham et al. |
| 2010/0317485 A1 | 12/2010 | Gillingham et al. |
| 2011/0012334 A1 | 1/2011 | Malmberg |
| 2011/0035089 A1 | 2/2011 | Hirao et al. |
| 2011/0035105 A1 | 2/2011 | Jolly |
| 2011/0062748 A1 | 3/2011 | Kaita et al. |
| 2011/0074123 A1 | 3/2011 | Fought et al. |
| 2011/0092325 A1 | 4/2011 | Vuksa et al. |

(56) References Cited

U.S. PATENT DOCUMENTS

| | | |
|---|---|---|
| 2011/0094225 A1 | 4/2011 | Kistner et al. |
| 2011/0094813 A1 | 4/2011 | Suzuki et al. |
| 2011/0094816 A1 | 4/2011 | Suzuki et al. |
| 2011/0094818 A1 | 4/2011 | Suzuki et al. |
| 2011/0133438 A1 | 6/2011 | Haines et al. |
| 2011/0147106 A1 | 6/2011 | Wenger et al. |
| 2011/0153158 A1 | 6/2011 | Acocella |
| 2011/0155082 A1 | 6/2011 | Takano |
| 2011/0155087 A1 | 6/2011 | Wenger et al. |
| 2011/0155497 A1 | 6/2011 | Kobayashi et al. |
| 2011/0168126 A1 | 7/2011 | Fujikawa |
| 2011/0209937 A1 | 9/2011 | Belzile et al. |
| 2011/0240250 A1 | 10/2011 | Azuma |
| 2011/0240393 A1 | 10/2011 | Hurd et al. |
| 2011/0297462 A1 | 12/2011 | Grajkowski et al. |
| 2011/0298189 A1 | 12/2011 | Schneider et al. |
| 2011/0309118 A1 | 12/2011 | Wada |
| 2012/0029770 A1 | 2/2012 | Hirao et al. |
| 2012/0031688 A1 | 2/2012 | Safranski et al. |
| 2012/0031693 A1 | 2/2012 | Deckard et al. |
| 2012/0031694 A1* | 2/2012 | Deckard ............ F16H 57/0489 29/402.03 |
| 2012/0053790 A1 | 3/2012 | Oikawa |
| 2012/0053791 A1 | 3/2012 | Harada |
| 2012/0055728 A1 | 3/2012 | Bessho et al. |
| 2012/0055729 A1 | 3/2012 | Bessho et al. |
| 2012/0073527 A1 | 3/2012 | Oltmans et al. |
| 2012/0073537 A1 | 3/2012 | Oltmans et al. |
| 2012/0078470 A1 | 3/2012 | Hirao et al. |
| 2012/0085588 A1 | 4/2012 | Kinsman et al. |
| 2012/0119454 A1 | 5/2012 | Di Maria |
| 2012/0125022 A1 | 5/2012 | Maybury et al. |
| 2012/0152632 A1 | 6/2012 | Azuma |
| 2012/0161468 A1 | 6/2012 | Tsumiyama et al. |
| 2012/0168268 A1 | 7/2012 | Bruno et al. |
| 2012/0193163 A1 | 8/2012 | Wimpfheimer et al. |
| 2012/0212013 A1 | 8/2012 | Ripley et al. |
| 2012/0214626 A1 | 8/2012 | Cook |
| 2012/0217078 A1 | 8/2012 | Kinsman et al. |
| 2012/0217116 A1 | 8/2012 | Nishimoto |
| 2012/0223500 A1 | 9/2012 | Kinsman et al. |
| 2012/0247888 A1 | 10/2012 | Chikuma et al. |
| 2012/0265402 A1 | 10/2012 | Post et al. |
| 2012/0277953 A1 | 11/2012 | Savaresi et al. |
| 2012/0283930 A1 | 11/2012 | Venton-Walters et al. |
| 2012/0297765 A1 | 11/2012 | Vigild et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0033070 A1 | 2/2013 | Kinsman et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0062909 A1 | 3/2013 | Harris et al. |
| 2013/0074487 A1 | 3/2013 | Herold et al. |
| 2013/0075183 A1 | 3/2013 | Kochidomari et al. |
| 2013/0079988 A1 | 3/2013 | Hirao et al. |
| 2013/0087396 A1 | 4/2013 | Itoo et al. |
| 2013/0103259 A1 | 4/2013 | Eng et al. |
| 2013/0157794 A1 | 6/2013 | Stegelmann et al. |
| 2013/0158799 A1 | 6/2013 | Kamimura |
| 2013/0161921 A1 | 6/2013 | Cheng et al. |
| 2013/0175779 A1 | 7/2013 | Kvien et al. |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0199097 A1 | 8/2013 | Spindler et al. |
| 2013/0218414 A1 | 8/2013 | Meitinger et al. |
| 2013/0226405 A1 | 8/2013 | Koumura et al. |
| 2013/0261893 A1 | 10/2013 | Yang |
| 2013/0304319 A1 | 11/2013 | Daniels |
| 2013/0307243 A1 | 11/2013 | Ham |
| 2013/0319784 A1 | 12/2013 | Kennedy et al. |
| 2013/0319785 A1 | 12/2013 | Spindler et al. |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0004984 A1 | 1/2014 | Aitcin |
| 2014/0005888 A1 | 1/2014 | Bose et al. |
| 2014/0008136 A1 | 1/2014 | Bennett |
| 2014/0012467 A1 | 1/2014 | Knox et al. |
| 2014/0034409 A1 | 2/2014 | Nakamura et al. |
| 2014/0046539 A1 | 2/2014 | Wijffels et al. |
| 2014/0058606 A1 | 2/2014 | Hilton |
| 2014/0060954 A1 | 3/2014 | Smith et al. |
| 2014/0062048 A1 | 3/2014 | Schlangen et al. |
| 2014/0065936 A1 | 3/2014 | Smith et al. |
| 2014/0067215 A1 | 3/2014 | Wetterlund et al. |
| 2014/0090935 A1 | 4/2014 | Pongo et al. |
| 2014/0095022 A1 | 4/2014 | Cashman et al. |
| 2014/0102819 A1 | 4/2014 | Deckard et al. |
| 2014/0102820 A1 | 4/2014 | Deckard et al. |
| 2014/0103627 A1 | 4/2014 | Deckard et al. |
| 2014/0109627 A1 | 4/2014 | Lee et al. |
| 2014/0113766 A1 | 4/2014 | Yagyu et al. |
| 2014/0124279 A1 | 5/2014 | Schlangen et al. |
| 2014/0125018 A1 | 5/2014 | Brady et al. |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0203533 A1 | 7/2014 | Safranski et al. |
| 2014/0217774 A1 | 8/2014 | Peterson et al. |
| 2014/0224561 A1 | 8/2014 | Shinbori et al. |
| 2014/0230797 A1 | 8/2014 | Meshenky et al. |
| 2014/0235382 A1 | 8/2014 | Tsukamoto et al. |
| 2014/0262584 A1 | 9/2014 | Lovold et al. |
| 2014/0288763 A1 | 9/2014 | Bennett et al. |
| 2014/0294195 A1 | 10/2014 | Perez et al. |
| 2014/0311143 A1 | 10/2014 | Speidel et al. |
| 2014/0349792 A1 | 11/2014 | Aitcin |
| 2014/0353956 A1 | 12/2014 | Bjerketvedt et al. |
| 2014/0358373 A1 | 12/2014 | Kikuchi et al. |
| 2014/0360794 A1 | 12/2014 | Tallman |
| 2015/0002404 A1 | 1/2015 | Hooton |
| 2015/0029018 A1 | 1/2015 | Bowden et al. |
| 2015/0039199 A1 | 2/2015 | Kikuchi |
| 2015/0041237 A1 | 2/2015 | Nadeau et al. |
| 2015/0047917 A1 | 2/2015 | Burt et al. |
| 2015/0057885 A1 | 2/2015 | Brady et al. |
| 2015/0061275 A1 | 3/2015 | Deckard et al. |
| 2015/0071759 A1 | 3/2015 | Bidner et al. |
| 2015/0165886 A1 | 6/2015 | Bennett et al. |
| 2015/0210137 A1 | 7/2015 | Kinsman et al. |
| 2015/0210319 A1 | 7/2015 | Tiramani |
| 2015/0259011 A1 | 9/2015 | Deckard et al. |
| 2015/0260123 A1 | 9/2015 | Knollmayr |
| 2015/0267792 A1 | 9/2015 | Hochmayr et al. |
| 2015/0275742 A1 | 10/2015 | Chekaiban et al. |
| 2015/0375614 A1 | 12/2015 | Osaki |
| 2015/0377341 A1 | 12/2015 | Renner et al. |
| 2016/0059660 A1 | 3/2016 | Brady et al. |
| 2016/0061088 A1 | 3/2016 | Minnichsoffer et al. |
| 2016/0061314 A1 | 3/2016 | Kuhl et al. |
| 2016/0084146 A1 | 3/2016 | Almkvist et al. |
| 2016/0108866 A1 | 4/2016 | Dewit et al. |
| 2016/0160989 A1 | 6/2016 | Millard et al. |
| 2016/0167715 A1 | 6/2016 | Kosuge et al. |
| 2016/0176283 A1 | 6/2016 | Hicke et al. |
| 2016/0176284 A1* | 6/2016 | Nugteren ............ B60K 11/02 180/68.3 |
| 2016/0332533 A1 | 11/2016 | Tistle et al. |
| 2016/0332553 A1 | 11/2016 | Miller et al. |
| 2016/0339960 A1 | 11/2016 | Leonard et al. |
| 2016/0341148 A1 | 11/2016 | Maki et al. |
| 2017/0013336 A1 | 1/2017 | Stys et al. |
| 2017/0029036 A1 | 2/2017 | Proulx et al. |
| 2017/0106747 A1 | 4/2017 | Safranski et al. |
| 2017/0120946 A1 | 5/2017 | Gong et al. |
| 2017/0131095 A1 | 5/2017 | Kim |

(56) References Cited

U.S. PATENT DOCUMENTS

| | | |
|---|---|---|
| 2017/0152810 A1 | 6/2017 | Wicks |
| 2017/0166255 A1 | 6/2017 | Peterson et al. |
| 2017/0175621 A1 | 6/2017 | Schenkel |
| 2017/0199094 A1 | 7/2017 | Duff et al. |
| 2017/0233022 A1 | 8/2017 | Marko |
| 2017/0248087 A1 | 8/2017 | Reisenberger et al. |
| 2017/0268200 A1* | 9/2017 | Todokoro ............... B60K 11/08 |
| 2017/0334500 A1 | 11/2017 | Jarek et al. |
| 2018/0022391 A1 | 1/2018 | Lutz et al. |
| 2018/0065465 A1 | 3/2018 | Ward et al. |
| 2018/0118053 A1 | 5/2018 | Sunsdahl et al. |
| 2018/0142609 A1 | 5/2018 | Seo et al. |
| 2018/0178677 A1 | 6/2018 | Swain et al. |
| 2018/0281764 A1 | 10/2018 | Pongo et al. |
| 2018/0312025 A1 | 11/2018 | Danielson et al. |
| 2018/0326843 A1 | 11/2018 | Danielson et al. |
| 2019/0078679 A1 | 3/2019 | Leclair et al. |
| 2019/0110161 A1 | 4/2019 | Rentz et al. |
| 2019/0118883 A1 | 4/2019 | Spindler et al. |
| 2019/0118884 A1 | 4/2019 | Spindler et al. |
| 2019/0143871 A1 | 5/2019 | Weber et al. |
| 2019/0193501 A1 | 6/2019 | Brady et al. |
| 2019/0210457 A1 | 7/2019 | Galsworthy et al. |
| 2019/0210668 A1 | 7/2019 | Endrizzi et al. |
| 2019/0217909 A1 | 7/2019 | Deckard et al. |
| 2019/0248227 A1 | 8/2019 | Nugteren et al. |
| 2019/0256010 A1 | 8/2019 | Baba et al. |
| 2019/0264635 A1 | 8/2019 | Oltmans et al. |
| 2019/0265064 A1 | 8/2019 | Koenig et al. |
| 2019/0285159 A1 | 9/2019 | Nelson et al. |
| 2019/0285160 A1 | 9/2019 | Nelson et al. |
| 2019/0299737 A1 | 10/2019 | Sellars et al. |
| 2019/0306599 A1 | 10/2019 | Nagai et al. |
| 2019/0367117 A1 | 12/2019 | Fischer et al. |
| 2019/0375463 A1 | 12/2019 | Upah et al. |
| 2020/0001673 A1 | 1/2020 | Schlangen et al. |
| 2020/0010120 A1 | 1/2020 | Kinsman et al. |
| 2020/0010125 A1 | 1/2020 | Peterson et al. |
| 2020/0070709 A1 | 3/2020 | Weber et al. |
| 2020/0122776 A1 | 4/2020 | Schlangen et al. |
| 2020/0217236 A1 | 7/2020 | Hudgens et al. |
| 2020/0262285 A1 | 8/2020 | Sunsdahl et al. |
| 2020/0346542 A1 | 11/2020 | Rasa et al. |
| 2021/0023936 A1 | 1/2021 | Marietta |
| 2021/0024007 A1 | 1/2021 | Fredrickson et al. |
| 2021/0061088 A1 | 3/2021 | Wenger et al. |
| 2021/0088138 A1 | 3/2021 | Yoshino |
| 2021/0094627 A1 | 4/2021 | Clark et al. |
| 2021/0206219 A1 | 7/2021 | Stieglitz et al. |
| 2021/0213822 A1 | 7/2021 | Ripley et al. |
| 2021/0300472 A1 | 9/2021 | Thomas et al. |
| 2021/0331543 A1 | 10/2021 | Zock et al. |
| 2021/0354542 A1* | 11/2021 | Schleif ..................... B60K 5/02 |
| 2021/0354760 A1 | 11/2021 | Schleif et al. |
| 2021/0370737 A1 | 12/2021 | Zock et al. |
| 2022/0024354 A1 | 1/2022 | Fredrickson et al. |
| 2022/0055434 A1 | 2/2022 | Hansen et al. |
| 2022/0105795 A1 | 4/2022 | Nelson et al. |
| 2022/0120340 A1 | 4/2022 | Nichols et al. |
| 2022/0266645 A1 | 8/2022 | Badino et al. |
| 2022/0339984 A1 | 10/2022 | Starik et al. |
| 2022/0355659 A1 | 11/2022 | Purdy et al. |
| 2023/0191904 A1 | 6/2023 | Rasa et al. |
| 2023/0322305 A1 | 10/2023 | Schleif et al. |
| 2023/0331081 A1 | 10/2023 | Weber et al. |
| 2023/0415558 A1 | 12/2023 | Schleif et al. |

FOREIGN PATENT DOCUMENTS

| | | |
|---|---|---|
| CA | 2794236 A1 | 4/2014 |
| CA | 2903511 A1 | 12/2016 |
| CH | 317335 | 11/1956 |
| CN | 2255379 Y | 6/1997 |
| CN | 1268997 | 10/2000 |
| CN | 1284603 A | 2/2001 |
| CN | 2544987 Y | 4/2003 |
| CN | 1654239 A | 8/2005 |
| CN | 1660615 A | 8/2005 |
| CN | 1746803 A | 3/2006 |
| CN | 1749048 A | 3/2006 |
| CN | 1792661 A | 6/2006 |
| CN | 1810530 A | 8/2006 |
| CN | 1982110 A | 6/2007 |
| CN | 200940501 Y | 8/2007 |
| CN | 101424200 A | 5/2009 |
| CN | 101445044 A | 6/2009 |
| CN | 101511664 A | 8/2009 |
| CN | 101549626 A | 10/2009 |
| CN | 101701547 A | 5/2010 |
| CN | 101708694 A | 5/2010 |
| CN | 201723635 U | 1/2011 |
| CN | 102069813 A | 5/2011 |
| CN | 102121415 A | 7/2011 |
| CN | 102168732 A | 8/2011 |
| CN | 201914049 U | 8/2011 |
| CN | 102226464 A | 10/2011 |
| CN | 102256825 A | 11/2011 |
| CN | 202040257 U | 11/2011 |
| CN | 102616104 A | 8/2012 |
| CN | 102627063 A | 8/2012 |
| CN | 102678808 A | 9/2012 |
| CN | 102729760 A | 10/2012 |
| CN | 202468817 U | 10/2012 |
| CN | 102840265 A | 12/2012 |
| CN | 202879243 U | 4/2013 |
| CN | 103075278 A | 5/2013 |
| CN | 202986930 U | 6/2013 |
| CN | 103370221 A | 10/2013 |
| CN | 203702310 U | 7/2014 |
| CN | 104321241 A | 1/2015 |
| CN | 104608825 A | 5/2015 |
| CN | 105555558 A | 5/2016 |
| CN | 106515851 A | 3/2017 |
| CN | 106740079 A | 5/2017 |
| CN | 212690200 U | 3/2021 |
| CN | 215292711 U | 12/2021 |
| DE | 0037435 | 10/1886 |
| DE | 0116605 | 2/1900 |
| DE | 1755101 | 4/1971 |
| DE | 2210070 | 9/1973 |
| DE | 2752798 A1 | 6/1978 |
| DE | 3007726 A1 | 9/1981 |
| DE | 3033707 | 4/1982 |
| DE | 3825349 A1 | 2/1989 |
| DE | 3914124 A1 | 11/1989 |
| DE | 4129643 A1 | 3/1993 |
| DE | 4427322 A1 | 2/1996 |
| DE | 19508302 A1 | 9/1996 |
| DE | 4447138 | 12/1997 |
| DE | 19735021 A1 | 2/1999 |
| DE | 19949787 A1 | 4/2000 |
| DE | 19922745 A1 | 12/2000 |
| DE | 10306392 A1 | 8/2004 |
| DE | 202005017990 U1 | 3/2006 |
| DE | 102005003077 A1 | 8/2006 |
| DE | 202005005999 U1 | 8/2006 |
| DE | 102007024126 | 12/2008 |
| DE | 102010020544 A1 | 1/2011 |
| DE | 102014000450 A1 | 8/2014 |
| DE | 102016012781 A1 | 4/2017 |
| EP | 0047128 | 3/1982 |
| EP | 0237085 | 9/1987 |
| EP | 0238077 A2 | 9/1987 |
| EP | 0398804 A1 | 11/1990 |
| EP | 0403803 A1 | 12/1990 |
| EP | 0471128 A1 | 2/1992 |
| EP | 0511654 A2 | 11/1992 |
| EP | 0544108 A1 | 6/1993 |
| EP | 0546295 A1 | 6/1993 |
| EP | 0405123 | 10/1993 |
| EP | 0568251 A1 | 11/1993 |
| EP | 0575962 A1 | 12/1993 |
| EP | 0473766 | 2/1994 |
| EP | 0691226 A1 | 1/1996 |

(56) References Cited

FOREIGN PATENT DOCUMENTS

| | | |
|---|---|---|
| EP | 0697306 A1 | 2/1996 |
| EP | 0709247 A2 | 5/1996 |
| EP | 0794096 A2 | 9/1997 |
| EP | 0856427 A1 | 8/1998 |
| EP | 0893618 A2 | 1/1999 |
| EP | 0898352 A1 | 2/1999 |
| EP | 1013310 A1 | 6/2000 |
| EP | 1077149 A2 | 2/2001 |
| EP | 1172239 A2 | 1/2002 |
| EP | 1215107 A1 | 6/2002 |
| EP | 1219475 A1 | 7/2002 |
| EP | 0928885 B1 | 4/2003 |
| EP | 1382475 A1 | 1/2004 |
| EP | 1433645 A2 | 6/2004 |
| EP | 1449688 A2 | 8/2004 |
| EP | 1481834 A2 | 12/2004 |
| EP | 1493624 A1 | 1/2005 |
| EP | 1164897 | 2/2005 |
| EP | 1557345 A2 | 7/2005 |
| EP | 1564123 A2 | 8/2005 |
| EP | 1697646 | 9/2006 |
| EP | 2033878 A1 | 3/2009 |
| EP | 2055520 A2 | 5/2009 |
| EP | 2057060 A2 | 5/2009 |
| EP | 2123933 A2 | 11/2009 |
| EP | 2145808 A1 | 1/2010 |
| EP | 1520978 B1 | 4/2010 |
| EP | 2236395 A1 | 10/2010 |
| EP | 1980741 B1 | 9/2011 |
| EP | 2517904 A1 | 10/2012 |
| EP | 2589785 A1 | 5/2013 |
| EP | 2923926 A2 | 9/2015 |
| FR | 2460797 A1 | 1/1981 |
| FR | 2907410 A1 | 4/2008 |
| FR | 2914597 A1 | 10/2008 |
| FR | 2935642 | 3/2010 |
| FR | 2936028 A1 | 3/2010 |
| FR | 2941424 A1 | 7/2010 |
| GB | 2036659 A | 7/1980 |
| GB | 2081191 A | 2/1982 |
| GB | 2192430 A | 1/1988 |
| GB | 2316923 A | 3/1998 |
| GB | 2347398 A | 9/2000 |
| GB | 2349483 A | 11/2000 |
| GB | 2423066 A | 8/2006 |
| GB | 2431704 A | 5/2007 |
| GB | 2454349 A | 5/2009 |
| GB | 2505767 A | 3/2014 |
| JP | 53-101625 U | 8/1978 |
| JP | 58-126434 | 7/1983 |
| JP | 59-039933 | 3/1984 |
| JP | 60-067206 | 4/1985 |
| JP | 60-067268 A | 4/1985 |
| JP | 60-067269 A | 4/1985 |
| JP | 60-209616 A | 10/1985 |
| JP | 61-019612 A | 1/1986 |
| JP | 61-135910 | 6/1986 |
| JP | 62-007925 A | 1/1987 |
| JP | 63-186906 A | 8/1988 |
| JP | 01-110815 A | 4/1989 |
| JP | 01-103706 U | 7/1989 |
| JP | 02-155815 A | 6/1990 |
| JP | 02-184711 A | 7/1990 |
| JP | 04-368211 A | 12/1992 |
| JP | 05-149443 A | 6/1993 |
| JP | 05-178055 A | 7/1993 |
| JP | 06-156036 A | 6/1994 |
| JP | 06-325977 A | 11/1994 |
| JP | 07-040783 | 2/1995 |
| JP | 07-091273 A | 4/1995 |
| JP | 07-117433 | 5/1995 |
| JP | 07-174007 A | 7/1995 |
| JP | 09-242510 A | 9/1997 |
| JP | 10-176601 A | 6/1998 |
| JP | 10-280968 A | 10/1998 |
| JP | 2898949 B2 | 6/1999 |
| JP | 11-334447 A | 12/1999 |
| JP | 2000-161138 A | 6/2000 |
| JP | 2000-177434 A | 6/2000 |
| JP | 2001-018623 A | 1/2001 |
| JP | 3137209 B2 | 2/2001 |
| JP | 2001-097255 A | 4/2001 |
| JP | 2001-121939 A | 5/2001 |
| JP | 2001-130304 A | 5/2001 |
| JP | 2002-168146 A | 6/2002 |
| JP | 2002-219921 A | 8/2002 |
| JP | 2003-237530 A | 8/2003 |
| JP | 2004-243992 A | 9/2004 |
| JP | 2004-308453 A | 11/2004 |
| JP | 2005-130629 A | 5/2005 |
| JP | 2005-186911 A | 7/2005 |
| JP | 2005-193788 A | 7/2005 |
| JP | 2005-299469 A | 10/2005 |
| JP | 2006-232058 A | 9/2006 |
| JP | 2006-232061 A | 9/2006 |
| JP | 2006-256579 A | 9/2006 |
| JP | 2006-256580 A | 9/2006 |
| JP | 2006-281839 A | 10/2006 |
| JP | 2007-064080 A | 3/2007 |
| JP | 2007-078080 A | 3/2007 |
| JP | 2007-083864 A | 4/2007 |
| JP | 2007-106319 A | 4/2007 |
| JP | 2007-278228 A | 10/2007 |
| JP | 2007-532814 | 11/2007 |
| JP | 2008-013149 A | 1/2008 |
| JP | 2008-185007 A | 8/2008 |
| JP | 2009-035220 A | 2/2009 |
| JP | 2009-160964 A | 7/2009 |
| JP | 2009-173147 A | 8/2009 |
| JP | 2009-220765 A | 10/2009 |
| JP | 2009-241872 A | 10/2009 |
| JP | 2009-250216 A | 10/2009 |
| JP | 2009-281330 A | 12/2009 |
| JP | 2010-053698 A | 3/2010 |
| JP | 2010-064744 A | 3/2010 |
| JP | 2010-095106 A | 4/2010 |
| JP | 2010-112278 A | 5/2010 |
| JP | 2011-126405 A | 6/2011 |
| JP | 2017-043130 A | 3/2017 |
| KR | 10-2008-0028174 A | 3/2008 |
| WO | 92/10693 A1 | 6/1992 |
| WO | 98/04431 A1 | 2/1998 |
| WO | 98/30430 A1 | 7/1998 |
| WO | 00/15455 A2 | 3/2000 |
| WO | 00/53057 A1 | 9/2000 |
| WO | 03/70543 A1 | 8/2003 |
| WO | 2004/085194 A1 | 10/2004 |
| WO | 2005/059382 A1 | 6/2005 |
| WO | 2007/103197 A2 | 9/2007 |
| WO | 2008/005131 A2 | 1/2008 |
| WO | 2008/013564 A1 | 1/2008 |
| WO | 2008/016377 A2 | 2/2008 |
| WO | 2008/115459 A1 | 9/2008 |
| WO | 2009/059407 A1 | 5/2009 |
| WO | 2009/096998 A1 | 8/2009 |
| WO | 2010/074990 A2 | 7/2010 |
| WO | 2010/081979 A1 | 7/2010 |
| WO | 2010/148014 A1 | 12/2010 |
| WO | 2012/018896 A2 | 2/2012 |
| WO | 2012/040553 A2 | 3/2012 |
| WO | 2012/109546 A1 | 8/2012 |
| WO | 2012/174793 A1 | 12/2012 |
| WO | 2013/166310 A1 | 11/2013 |
| WO | 2013/174662 A1 | 11/2013 |
| WO | 2014/039432 A2 | 3/2014 |
| WO | 2014/039433 A2 | 3/2014 |
| WO | 2014/047488 A1 | 3/2014 |
| WO | 2014/059258 A1 | 4/2014 |
| WO | 2014/143953 A2 | 9/2014 |
| WO | 2014/193975 A1 | 12/2014 |
| WO | 2015/036984 A1 | 3/2015 |
| WO | 2015/036985 A1 | 3/2015 |
| WO | 2015/159571 A1 | 10/2015 |
| WO | 2016/038591 A1 | 3/2016 |

(56) References Cited

FOREIGN PATENT DOCUMENTS

| | | |
|---|---|---|
| WO | 2016/099770 A2 | 6/2016 |
| WO | 2016/186942 A1 | 11/2016 |
| WO | 2018/118176 A1 | 6/2018 |
| WO | 2018/118508 A2 | 6/2018 |
| WO | 2019/140026 A1 | 7/2019 |
| WO | 2019/183051 A1 | 9/2019 |
| WO | 2020/223379 A1 | 11/2020 |

OTHER PUBLICATIONS

International Preliminary Report on Patentability issued by the International Bureau of WIPO, dated May 12, 2015, for International Application No. PCT/US2013/068937; 7 pages.
International Preliminary Report on Patentability issued by the International Bureau of WIPO, dated Nov. 9, 2010, for International Patent Application No. PCT/US2009/042985; 13 pages.
International Preliminary Report on Patentability issued by the International Searching Authority, dated May 6, 2021, for International Patent Application No. PCT/US2020/030518; 27 pages.
International Preliminary Report on Patentability issued by the International Searching Authority, dated Nov. 15, 2022, for International Patent Application No. PCT/US2021/031782; 9 pages.
International Preliminary Report on Patentability received for PCT Patent Application No. PCT/US10/49167, mailed on Oct. 18, 2012, 30 pages.
International Preliminary Report on Patentability received for PCT Patent Application No. PCT/US2015/061272, mailed on May 12, 2017, 22 pages.
International Preliminary Report on Patentability received for PCT Patent Application No. PCT/US2016/031992, mailed on Nov. 30, 2017, 15 pages.
International Preliminary Report on Patentability received for PCT Patent Application No. PCT/US2017/065724, mailed on Jan. 7, 2019, 16 pages.
International Preliminary Report on Patentability received for PCT Patent Application No. PCT/US2021/031804, mailed on Nov. 24, 2022, 6 pages.
International Preliminary Report on Patentability, dated May 28, 2013, for related International Patent Application No. PCT/US2011/046395, 31 pages.
International Search Report and Written Opinion issued by the European Patent Office, dated Aug. 27, 2008, in related International Patent Application No. PCT/US2008/003485; 15 pages.
International Search Report and Written Opinion issued by the European Patent Office, dated Feb. 18, 2014, for International Application No. PCT/US2013/068937; 11 pages.
International Search Report and Written Opinion issued by the European Patent Office, dated Jan. 14, 2014, for International Patent Application No. PCT/US2013/064516; 24 pages.
International Search Report and Written Opinion issued by the European Patent Office, dated Jul. 31, 2013, for International Patent Application No. PCT/US2013/039304; 11 pages.
International Search Report and Written Opinion issued by the European Patent Office, dated Jun. 28, 2012, for International PCT Application No. PCT/US2012/024664; 19 pages.
International Search Report and Written Opinion issued by the European Patent Office, dated Oct. 2, 2008, in related International Patent Application No. PCT/US2008/003483; 18 pages.
International Search Report and Written Opinion issued by the European Patent Office, dated Oct. 9, 2014, for International Patent Application No. PCT/US2014/028152; 20 pages.
International Search Report and Written Opinion issued by the European Patent Office, mailed Dec. 18, 2009, for International Patent Application No. PCT/US2009/042986; 15 pages.
International Search Report and Written Opinion issued by the European Patent Office, mailed Sep. 4, 2009, for International Patent Application No. PCT/US2009/042985; 18 pages.
International Search Report and Written Opinion issued by the International Searching Authority, dated Oct. 21, 2020, for International Patent Application No. PCT/US2020/42787; 18 pages.
International Search Report and Written Opinion received for PCT Patent Application No. PCT/US10/49167, mailed on Jul. 6, 2011, 9 pages.
International Search Report and Written Opinion received for PCT Patent Application No. PCT/US14/39824, mailed on Sep. 19, 2014, 9 pages.
International Search Report and Written Opinion received for PCT Patent Application No. PCT/US2015/061272, mailed on Aug. 12, 2016, 13 pages.
International Search Report and Written Opinion received for PCT Patent Application No. PCT/US2016/031992, mailed on Sep. 19, 2016, 20 pages.
International Search Report and Written Opinion received for PCT Patent Application No. PCT/US2017/065724, mailed on Jun. 18, 2018, 14 pages.
International Search Report and Written Opinion received for PCT Patent Application No. PCT/US2019/012958, mailed on Jul. 3, 2019, 27 pages.
International Search Report and Written Opinion received for PCT Patent Application No. PCT/US2020/030518, mailed on Sep. 11, 2020, 14 pages.
International Search Report and Written Opinion received for PCT Patent Application No. PCT/US21/31782, mailed on Aug. 5, 2021, 11 pages.
International Search Report and Written Opinion received for PCT Patent Application No. PCT/US21/31804, mailed on Aug. 9, 2021, 6 pages.
International Search Report issued by the European Patent Office, dated Jun. 3, 2008, in related International Patent Application No. PCT/US2008/003480; 5 pages.
International Search Report of the International Searching Authority, dated Sep. 4, 2012, for related International Patent Application No. PCT/US2011/046395; 6 pages.
Invitation to Pay Additional Fees received for PCT Patent Application No. PCT/US2017/065724, mailed on Apr. 10, 2018, 10 pages.
Kawasaki Mule the Off-Road Capable 610 4 .times. 4 XC Brochure 2011, .COPYRGT. 2010, 6 pages.
Kawasaki Mule Utility Vehicle Brochure 2009, .COPYRGT. 2008; 10 pages.
Kawasaki Teryx 750 F1 4×4 Sport Brochure 2011, (Copyrights) 2010; 6 pages.
Kawasaki Teryx Recreation Utility Vehicle Brochure 2009, .COPYRGT. 2008; 8 pages.
Letter Exam Report issued by the State Intellectual Property Office (SIPO), dated Mar. 18, 2015, for related Chinese Application No. 201080046628.5; 20 pages.
Lijun, P., "Differential steering six a review of the current status of wheel vehicle suspension systems.", A Mechanical Engineer, Issue No. 04, Apr. 10, 2016, pp. 1-70.
MTX (IMTX Audio Thunder Sports RZRPod65-owners-manual, 2016); 8 pages.
New Arctic Cat Side by Side, youtube.com, https://www.youtube.com/watch?-gQGAYSz1bME&fs=1&hl=en_US, posted Mar. 9, 2011; 1 page.
Office Action issued by the Canadian Intellectual Property Office, dated Apr. 1, 2021, for Canadian Patent Application to. 2,985,632; 4 pages.
Office Action issued by the Canadian Intellectual Property Office, dated May 2, 2023, for Canadian Patent Application No. 3152773, 5 pages.
Office Action issued by the Canadian Intellectual Property Office, dated Oct. 27, 2020, for Canadian Patent Application No. 3,044,002; 4 pages.
Office Action issued by the U.S. Patent and Trademark Office, dated Oct. 1, 2018, for U.S. Appl. No. 15/751,403; 7 pages.
Outlander X mr 850, available at https://can-am.brp.com/off-road/atv/outlander/outlander-x-mr-850.html; . COPYRGT. 2003-2017; 3 pages.

(56) References Cited

OTHER PUBLICATIONS

Patent Examination Report issued by the Australian Government IP Australia, dated Apr. 7, 2016, for Australian Patent Application No. 2013329090; 3 pages.
Photo, Facebook.com, Jake Brattain, https://www.facebook.com/photo.php?fbid=412473845198&set=pb.512920198.-2207520000.1541691407.&type=3&theater, post dated Mar. 30, 2010;1 page.
Photo, Facebook.com, Jake Brattain, https://www.facebook.com/photo.php?fbid=412473865198&set=pb.512920198.-2207520000.1541691407.&type=3&theater, post dated Mar. 30, 2010;1 page.
Photo, Facebook.com, Jake Brattain, https://www.facebook.com/photo.php?fbid=412474325198&set=pb.512920198.-2207520000.1541691407.&type=3&theater, post dated Mar. 30, 2010; 1 page.
"2012 Arctic Cat Wildcat 1000i H.O. Preview," ATV.Com, https://www.atv.com/manufacturers/arctic-cat/2012-arctic-cat-wildcat-1000i-ho-preview-2014.html, dated Jul. 26, 2011; 10 pages.
"Arctic Cat Unleashes a Wild Cat at Recent Dealer Show", UTVGuide.net, https://www.utvguide.net/arctic-cat-unleashes-a-wild-cat-at-recent-dealer-show/, posted Mar. 29, 2011; 5 pages.
"Arctic Cat Unleashes a Wildcat at Recent Dealer Show", Dirt Toys, https://www.dirttoysmag.com/2011/05/arctic-cat-unleashes-a-wildcat, May 2011 Issue; 4 pages.
"Artie Cat Breaks Silence on New Side-by-Side," Lucas Cooney, https://www.atv.com/blogi2011/03/arctic-cat-breaks-silence-on-new-side-by-side.html, dated Mar. 24, 2011; 5 pages.
"Commander Performance Modifications: Radiator Relocate for Mud", commanderforums.org, https://www.commanderforums.org/forums/commander-performance-modifications/7059-radiator-relocate-mud-3.html, Aug. 28, 2012; 7 pages.
"Custom Weber Intercooler Bed Mount with Dual 5.2" Spal Fans", RZRForums.net, https://www.rzrforums.net/forced-induction/19182-custom-weber-intercooler-bed-mount-w-dual-5-2-spal-fans.html, Oct. 30, 2009; 10 pages.
"Engine firing change '13 850", PolarisATVForums.com internet forum discussion thread dated Nov. 21, 2012.
"Honda develps a powerful, fuel-efficient 700cc engine for midsize motorcycle", Honda news release from www.world.honda.com; dated Sep. 26, 2011.
"Modified RedLine Revolt," RDC Race-deZert.com, https://www.race-dezert.com/forum/threads/modified-redline-revolt.92038/, dated Mar. 10, 2011; 5 pages.
"National Guard/Coastal Racing Polaris RZR XP 900 UTV Race Test," JeffM. Vanasdal, ATVriders.com, http://www.atvriders.com/atvreviews/polaris-2012-coastal-racing-rzr-xp-900-sxs-utv-worcs-race-review-p4.html; Feb. 25, 2012; 8 pages.
"Rad Relocation Kit", RZRFarums.net, https://www.rzrforums.net/engine-drivetrain/93153-rad-relocation-kit.html, Nov. 9, 2012; 8 pages.
"Radiator in the back", RZRForums.net, https://www.rzrforums.net/rzr-xp-900/63047-radiator-back.html, Nov. 14, 2011; 4 pages.
"Radiator Relocate", RZRForums.net, https://www.rzrforums.net/muddin/14716-radiator-relocate.html, Jul. 23, 2009; 7 pages.
"Radiator relocation", RZRForums.net, https://www.rzrforums.net/general-rzr-discussion/8440-radiator-relocation.html, Feb. 4, 2009; 7 pages.
"Relocated Radiator?", RZRForums.net, https://www.rzrforums.net/muddin/75562-relocated-radiator.html, Apr. 6, 2012; 7 pages.
"Rhino Radiator Relocation", HighLifter Forum, http://forum.highlifter.com/Rhino-Radiator-Relocation-m2180231.aspx, Aug. 30, 2007; 5 pages.
"RZR Radiator Relocation?", RZRForums.net, https://www.rzrforums.net/general-rzr-discussion/13963-rzr-radiator-relocation.html, Jul. 3, 2009; 5 pages.
"Sporty New Artie Cat Side-by-Side," Lucas Cooney, https://www.atv.com/blog/2011/03/sporty-new-arctic-cat-side-by-side-video.html, dated Mar. 10, 2011; 4 pages.
"Straight-twin engine", Wikipedia.org internet encyclopedia entry.
"Who makes the best turbo kit for the Polarsis RZR??", RZRforums.net internet forum discussion thread dated Jun. 25, 2010.

1989 Honda Pilot f1400, Powersports Log, http://powersportslog.com/asp/Item.asp?soldid=29871&makeHonda&theday=4%2F16%2F2011, posted Apr. 16, 2011; 2 page.
2009 Honda Big Red, ATV Illustrated at http://www.atvillustrated.com/?q=node/6615/20/2008, 6 pgs.
2012 Arctic Cat Wildcat with 95-hp & 16-in. Travel, ArcticInsider.com, http://www.arcticinsider.com/Article/2012-Arctic-Cat-Wildcat-with-95-hp--16-in-Travel; 4 pages.
2012 Coastal Racing Polaris XP 900 UTV, photograph, http://www.atvriders.com/images/polaris/2012-coastal-racing-polaris-xp-900-utv-race-review/2012-polaris-rzr-xp-900-utv-sxs-jeff-vanasdal.jpg; 1 page.
2015 Polaris Owner's Manual for Maintenance and Safety, RZR (Registered) XP 1000 EPS High Lifter Edition, (Copyright) 2015; 151 pages.
2016 MUDPRO 700 Limited, Artic Cat, http://www.articcat.com/dirt/atvs/model/2016-en-mudpro-700-limited/, copyright 2015, 23 pages.
2nd Written Opinion of the International Searching Authority in PCT/US2011/046395, Mar. 1, 2013, 9 pages.
53 Series Aerocharger RZR XP 900 Turbocharger kit, retrieved from www.sidebysidesports.com/53seaerzxp9.html on Jan. 10, 2019, Internet Wayback Machine capture dated Apr. 26, 2011 (Year: 2011).
Arctic Cat, company website, Prowler XT 650 H1, undated, 9 pgs.
Boss Plow System for Ranger, at http:www.purepolaris.com/Detail.aspx?ItemID=2876870(PolarisPGACatalog), May 14, 2008, 2 pgs.
Boss Smarthitch 2 at http:www.bossplow.com/smarthitch.html, May 14, 2008, 13 pgs.
BRP Can-Am Commander photo, undated; 1 page.
Buyer's Guide Supplement, 2006 Kart Guide, Powersports Business Magazine; 6 pages.
Can-Am Maverick Sport 60" (front deflector panel for hot radiator air, 2019.
Club Car, Company Website, product pages for XRT 1500 SE, undated; 2 pages.
Diver Down Snorkel for Polaris Scrambler 850/1000, High Lifter, last accessed Nov. 4, 2015, http://www.highlifter.com/p-4687-diver-down-snorkel-for-polaris-scrambler--8501000-see-apps.aspx; 1 page.
DuneGuide.com, "Product Review 2009 Honda Big Red MUV," retrieved from http:www.duneguide.com/ProductReview.sub.--Honda.sub.--BigRed.htm, May 20, 2008, 3 pgs.
Eulenbach, Dr.Ing. Dieter, Nivomat: The Automatic Level Control System with Spring Function and Damping Function, Lecture given as part of the course "Springing and damping systems for road and rail vehicles" at the Technical Academy of Esslingen, Oct. 11, 2000, 18 pgs.
Excerpts from Honda Service Manual 89 FL400R Pilot, Honda Motor Co., Ltd., copyright 1988; 24 pages.
Fang et al., Research on Generator Set Control of Ranger Extender Pure Electric Vehicles, Power and Energy Conference (APPEEC), 2010 Asia-Pacific, Mar. 31, 2010.
Heitner, Range extender hybrid vehicle, Intersociety Energy Conversion Engineering Conference Proceedings, vol. 4, pp. 323-338, 1991.
High-Performance "Truck Steering" Automotive Engineering, Society of Automotive Engineers. Warrendale, Us, vol. 98. No. 4, Apr. 1, 1990, pp. 56-60.
Honda Hippo 1800 New Competition for Yamaha's Rhino, Dirt Wheels Magazine, Apr. 2006, pp. 91-92.
http://revistamoto.com/inicio/rm/prueba-xrbull-xr500-spider.html.
Images for rear radiator, https://www.google.com/search?q=rear+radiator+site%3Arzrforums.net&lr=&hl=en&as_qdr=all&source_Int&tbs=cdr%3A1%2Ccd_min%3A%2Ccd_max%3A2012&tmb; available before Dec. 31, 2012; 2 page.
Improved Fox Shox, Motocross Action, Mar. 1977 issue, 1 pg.
International Preliminary Report on Patentability issued by the European Patent Office, dated Aug. 31, 2010, for International Patent Application No. PCT/US2009/042986; 14 pages.
International Preliminary Report on Patentability issued by the European Patent Office, dated Mar. 8, 2013, for International PCT Application No. PCT/US2012/024664; 24 pages.

(56) References Cited

OTHER PUBLICATIONS

International Preliminary Report on Patentability issued by the European Patent Office, dated May 11, 2009, in related International Patent Application No. PCT/US2008/003483; 21 pages.
International Preliminary Report on Patentability issued by the International Bureau of WIPO, dated Apr. 14, 2015, for International Patent Application No. PCT/US2013/064516; 18 pages.
Photo, Facebook.com, Jake Brattain, https://www.facebook.com/photo.php?fbid=412474575198&set=pb.512920198.-2207520000.1541691407.&type=3&theater, post dated Mar. 30, 2010; 1 page.
Photo, Facebook.com, Jake Brattain, https://www.facebook.com/photo.php?fbid=412474695198&set=pb.512920198.-2207520000.1541691407.&type=3&theater, post dated Mar. 30, 2010; 1 page.
Photo, Facebook.com, Jake Brattain, https://www.facebook.com/photo.php?fbid=412474765198&set=pb.512920198.-2207520000.1541691407.&type=3&theater, post dated Mar. 30, 2010; 1 page.
Photo, Facebook.com, Jake Brattain, https://www.facebook.com/photo.php?fbid=412475960198&set=pb.512920198.-2207520000.1541691407.&tye=3&theater, post dated Mar. 30, 2010; 1 page.
Photobucket "https://photobucket.com/p/error?type=404&path=/gallery/er/ben8225/media/cGF0aDovRFNDRjE0ODkuanBn/", Retrived on Apr. 1, 2024, 2 pages.
Polaris Ranger Brochure 2009, copyright 2008; 32 pages.
Polaris Ranger Brochure ATVs and Side .times. Sides Brochure 2010, COPYRGT. 2009, 26 pages.
Polaris Ranger Off-Road Utility Vehicles Brochure 2004, .COPYRGT. 2003; 20 pages.
Polaris Ranger RZR Brochure 2011, .COPYRGT. 2010; 16 pages.
Polaris Ranger Welcome to Ranger Country Brochure 2006, .COPYRGT. 2005, 24 pages.
Polaris Ranger Work/Play Only Brochure 2008, .COPYRGT. 2007, 28 pages.
Polaris RZR XP 1000 Radiator Relocation Kit, https://abffabrication.com/shop/polaris-rzr-xp-1000-radiator-relocation-kit/.
Polaris RZR XP 900 Review, retrieved from www.world-of-atvs.com/polaris-rzr-xp-900.html on Jan. 10, 2019, Internet Wayback Machine capture dated Mar. 12, 2012 (Year: 2012).
Radiator Relocation Kit for Polaris Scrambler, High Lifter, http://www.highlifter.com/p-4598-radiator-relocation-kit-for-polaris-scra-mbler-8501000-see-apps.aspx, last accessed Nov. 4, 2015, 1 page.
Radiator Relocation Kit-Polaris Sportsman 550/850, High Lifter, http://www.highlifter.com/p-2686-radiator-relocation-kit-polaris-sportsma-n-550850-see-apps.aspx, last accessed Nov. 4, 2015, 2 pages.
Ranger XP 900 High Lifter Ground Clearance Demo-Polaris Ranger, Youtube.com, https://www.youtube.com/watch?v=jfGho4ESvyY, published Jul. 27, 2015; 1 page.
Ray Sedorchuk, New for 2004, Yamaha Rhino 660 4×4, ATV Connection Magazine, (Copyrights) 2006; 3 pages.
Redline Specs, copyright 2008, available at www.RedlinePerforms.com., 2 pages.
Renegade X MR 1000R, Can-Am, http://can-am.brp.com/off-road/atv/renegade/renegade-x-mr-1000R.html, copyright 2003-2015, 12 pages.
Response to Office Action filed with the U.S. Patent and Trademark Office, filed Dec. 19, 2018, for U.S. Appl. No. 15/751,403; 9 pages.
RideNow Powersports, "2017 Can-Am Maverick X3 Walk Around", Sep. 14, 2016, YouTube.com. https://www.youtube.com/watch?v=510slScF-y4 (Year: 2016).
RZR Pro XP Sport, Published date unavailable [online], [retrieved on Jul. 25, 2021], Retrieved from the Internet: https://rzr.polaris.com/en-us/rzr-pro-xp-sport-rockford-fosgate-le/build-color/ (Year: 2021), 1 page.
RZR XP (Registered) 1000 High Lifter Edition Stealth Black, https://rzr.polaris.com/en-us/2015/high-performance/rzr-xp-1000-eps-high-lifter-edition-stealth-black-2015-rzr/; 4 pages.
RZR XP 100 EPS, High Lifter Velocity Blue, http://www.polaris.com/en-us/rzr-side-by-side/rzr-xp-1000-eps-high-lifter-edition.

RZR XP 1000 High Lifter Edition-Polaris RZR Sport Side by Side ATV, Youtube.com, https://www.youtube.com/watch?-RKRVulGlzuo, published Jul. 27, 2014; 1 page.
Sal & Barbara at S&B's, Particle Separator for 2014-16 Polaris RZR 100, http://www.sbfilters.com/particle-separator-2014-17-polaris-rzr-1000.
Second Office Action issued by the China National Intellectual Property Administration, dated Jul. 3, 2020, for Chinese Patent Application No. 201680028024.5; 7 pages.
Select Increments 2007-2018 Compatible With Jeep Wrangler JK and Unlimited With Infinity or Alpine Premium Factory Systems Pillar Pods with Kicker speakers PP0718-IA-K (Select), Dec. 14, 2018; 6 pages.
Shock Owner's Manual: Float ATV Front Applications—Fox Racing Shox, 2004, 21 pgs.
Shock Owner's Manual: Float ATV+Snowmobile—Fox Racing Shox, 2006, 18 pgs.
Shock Owner's Manual: Float MXR—Fox Racing Shox, 2006, 16 pgs.
Shock Owner's Manual: Float X Evol—Snowmobile Applications, 2006, 32 pgs.
Suzuki; 1991 Suzuki GSX1100G Cylinder OEM Parts Diagram; retrieved Mar. 17, 2022; https://www.revzilla.com/oem/suzuki/1991-suzuki-gsx1100g/cylinder?submodel=gsx1100gp (Year: 2017).
Troy Merrifield & Damon Flippo, Rise of the Machine: Let the "Revolution" Begin. One Seat at a Time., CartWheelin' Magazine, published at least as early as Jan. 2008, available at http://www.1redline.com/news.sub.-events/PDF/cart.sub.-wheelin.sub.-ar-ticle.pdf, last accessed on Feb. 15, 2012, pp. 14-19.
Troy Merrifield, Redline's Rockin' Riot, UTV Off-Road Magazine, published in vol. 4, Issue 1, Feb./Mar. 2009, available at http://www.1redline.com/news.sub.-events/PDF/Redline.sub.-Riot.sub.-Ar-ticle.sub.-01.sub.-2009.pdf., last accessed on Feb. 15, 2012, pp. 16-19.
Welcome to Ranger Country brochure, .COPYRGT. 2005, Polaris Industries Inc., 24 pgs.
Welcome to Ranger Country brochure, .COPYRGT. 2006, Polaris Industries Inc., 20 pgs.
Wild Boar ATV Parts, Airaid Intake XP 900 Polaris, Snorkel Kit, https://www.wildboaratvparts.com/airaid-intake-xp-900-polaris-snorkel-kit-free-shipping-529-00/.
Work/Play Only Ranger brochure, .COPYRGT. 2007, Polaris Industries Inc., 28 pgs.
Written Opinion of the International Searching Authority, dated Feb. 3, 2013, for related International Patent Application No. PCT/US2011/046395; 7 pages.
XR Bull Spaider 500 MOD 2011, anuncios ya, https://mexicali.anunciosya.com.mx/xr-bull-spaider-500-mod-2011-en-mexicali-SWqi, May 24, 2011; 4 pages.
XR Bull Spider 500CC 4×4 360° .AVI, youtube.com, https://www.youtube.com/watch?v=-jSzDvute8Q, posted Feb. 8, 2010; 1 page.
Yamaha, Company Website, 2006 Rhino 450 Auto 4 .times. 4, .COPYRGT. 2005, 3 pages.
Yamaha, Company Website, 2006 Rhino 660 Auto 4×4, (Copyrights) 2006; 4 pages.
Yamaha, company website, 2006 Rhino 660 Auto 4.times.4 Special Edition, Copyright 2006, 4 pgs.
Yamaha, Company Website, Rhino 660 Auto 4×4 Exploring Edition Specifications, (Copyrights) 2006; 3 pages.
English Translation of Office Action issued by the Japanese Patent Office, dated Mar. 13, 2018, for related Japanese Patent Application No. 2016-502927; 7 pages.
Examination Report No. 1 issued by the Australian Government IP Australia, dated Jan. 3, 2019, for Australian Patent Application No. 2018214090; 5 pages.
Examination report No. 1 issued by the Australian Government IP Australia, dated Oct. 11, 2017, for related Australian patent application No. 2016204751; 3 pages.
Examination Report No. 2 issued by the Australian Government IP Australia, dated Jan. 29, 2018, for related Australian Patent Application No. 2016204751; 4 pages.

(56) References Cited

OTHER PUBLICATIONS

International Preliminary Report on Patentability issued by the European Patent Office, dated Jan. 26, 2016, for corresponding International Patent Application No. PCT/US2014/028857; 12 pages.
International Search Report and Written Opinion received for PCT Patent Application No. PCT/US2014/028857, mailed on Jan. 5, 2016, 19 pages.
Office Action issued by the Japanese Patent Office, dated Mar. 13, 2018, for related Japanese Patent Application No. 2016-502927; 5 pages.
Office Action issued by the State Intellectual Property Office of China, dated Jun. 26, 2017, for Chinese Patent Application No. 201480011350.6; 8 pages.

* cited by examiner

POWERTRAIN FOR A UTILITY VEHICLE

CROSS-REFERENCE TO RELATED APPLICATION

The present application claims priority to U.S. Patent Application Ser. No. 63/351,574, filed Jun. 13, 2022, the complete disclosure of which is incorporated herein by reference.

FIELD OF THE DISCLOSURE

The present invention relates generally to a vehicle and, in particular, to a vehicle with a turbocharged powertrain assembly.

BACKGROUND THE DISCLOSURE

Generally, all-terrain vehicles ("ATVs") and utility vehicles ("UVs") are used to carry one or more passengers and a small amount of cargo over a variety of terrains.

Power output and the powertrain system is important for providing such vehicles with the ability to move across various terrain. What are needed are improvements to the powertrain system for assuring increased and reliable power.

SUMMARY OF THE DISCLOSURE

A utility vehicle is provided with an engine and turbocharger positioned on the hot side of the engine.

According to one example, a utility vehicle includes a plurality of ground-engaging members, a frame supported by the ground-engaging members, and a powertrain assembly supported by the frame and including an engine supported by the frame, the engine including an exhaust side and a turbocharger operably coupled to the engine, the turbocharger having a turbine housing supporting a turbine and a compressor housing supporting a compressor, the turbocharger being positioned on the exhaust side of the engine and rearward of the engine, a space between the turbocharger and the engine being less than 9 inches.

According to another example, the utility vehicle further includes an operator area and a cargo area supported by the frame, wherein the turbocharger is positioned vertically below at least a portion of the cargo area.

According to another example, the powertrain assembly of the utility vehicle further includes a transmission operably coupled to the engine, wherein the turbocharger is positioned vertically higher than the transmission.

According to another example, the muffler of the utility vehicle is coupled to the engine via an exhaust conduit, the exhaust conduit being less than two feet.

According to another example, the powertrain assembly of the utility vehicle further includes an exhaust conduit positioned fluidically between the engine and the muffler, and wherein the frame defines a frame envelope, the turbocharger being positioned within the frame envelope and the exhaust conduit extending at least partially outside of the frame envelope.

According to another example, the powertrain assembly of the utility vehicle further includes a continuously variable transmission (CVT) operably coupled to the engine, the turbocharger being positioned laterally adjacent to the CVT.

According to another example, the turbocharger of the utility vehicle is outside an envelope defined by the CVT.

According to another example, the powertrain assembly of the utility vehicle further includes an intercooler, the intercooler being positioned laterally adjacent to the turbocharger.

According to another example, the powertrain assembly of the utility vehicle further includes an air intake and an air filter fluidically coupled to the engine via the turbocharger, the air filter being positioned on a non-exhaust side of the engine.

According to another example, a portion of the intercooler of the utility vehicle includes an air intake and an air exhaust, the air exhaust being positioned longitudinally forward of the turbocharger.

According to another example, the powertrain assembly of the utility vehicle further includes an engine intake manifold operably coupled to the engine, and wherein the air exhaust of the intercooler is laterally adjacent at least a portion of the engine intake manifold.

A utility vehicle is provided with an engine and an oil management system.

According to one example, a utility vehicle includes a plurality of ground-engaging members, a frame supported by the ground-engaging members, and a powertrain assembly supported by the frame and including an engine supported by the frame a turbocharger operably coupled to the engine, and an oil management system fluidically coupled to the engine and the turbocharger, the oil management system including an oil pan defining a staging reservoir, a staging oil pick up member including an opening positioned proximate the staging reservoir, an engine oil pump fluidically coupled to the staging oil pick up member and operable to pump oil from the staging reservoir to the engine, and a turbo drain through which oil from the turbocharger is operable to drain from the turbocharger, the turbo drain operable to deliver the oil to be picked up by the staging oil pick up member.

According to another example, the oil management system of the utility vehicle is a wet sump.

According to another example, the staging oil pickup member of the utility vehicle includes an auxiliary opening, the auxiliary opening being fluidically coupled to the turbo drain.

According to another example, the oil management system of the utility vehicle includes a channel in fluid communication with the turbo drain and the staging oil pick up member at the second opening, such that oil is drained from the turbocharger directly to the auxiliary opening of the staging oil pickup member.

According to another example, the oil management system of the utility vehicle includes a delivery reservoir adjacent the staging reservoir and a delivery oil pickup member with an opening proximate the delivery reservoir, wherein the oil pump is operable to deliver oil from the staging reservoir to the delivery reservoir.

According to another example, the oil management system of the utility vehicle includes a de-aerating member fluidically between the staging reservoir and the delivery reservoir.

According to another example, the oil management system of the utility vehicle includes a delivery reservoir cover, wherein the delivery reservoir is a pressurized chamber when the delivery reservoir cover is installed and the oil pump is active.

According to another example, the staging oil pickup member of the utility vehicle is positioned vertically above a portion of the staging reservoir.

According to another example, the portion of the staging reservoir above which the staging oil pickup member of the utility vehicle is positioned defines a low pressure zone during operation.

According to another example, the turbocharger of the utility vehicle drains into the low pressure zone of the staging reservoir.

An off-road recreational vehicle is provided with an engine and a water cooling system.

According to one example, an off-road recreational vehicle includes a plurality of ground-engaging members, a frame supported by the ground-engaging members, and a powertrain assembly supported by the frame and including an engine supported by the frame an air intake system fluidically coupled to the engine to provide air to the engine and including a throttle blade positioned fluidically upstream from the engine, and a water cooling system including a nozzle interfacing with the air intake system upstream from the throttle blade.

According to another example, the nozzle of the off-road recreational vehicle interfaces with the air intake system within 8 inches from the throttle blade upstream from the throttle blade.

According to another example, the nozzle of the off-road recreational vehicle is operable to atomize water.

According to another example, the nozzle of the off-road recreational vehicle is positioned perpendicular to flow of air through the air intake system.

According to another example, the water cooling system of the off-road recreational vehicle further includes a controller operable to activate the nozzle in predetermined conditions.

According to another example, the predetermined conditions of the off-road recreational vehicle include one of high temperatures, wide open throttle, and increased power demands.

According to another example, the water cooling system of the off-road recreational vehicle further includes a water reservoir supported by the frame.

According to another example, the off-road recreational vehicle further includes a continuously variable transmission (CVT), wherein the CVT is fluidically coupled to the water reservoir.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Figure 1:
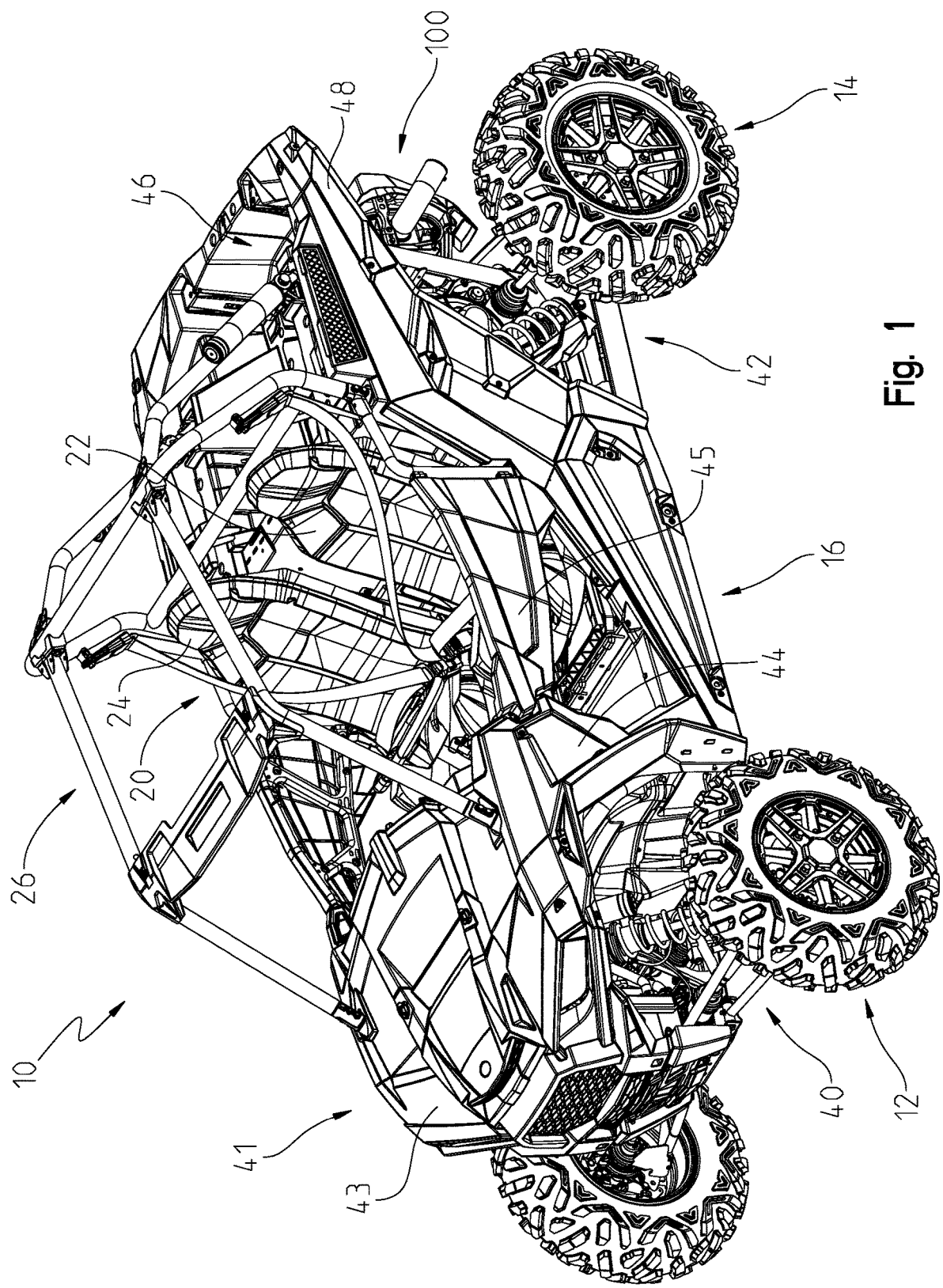
FIG. 1 is a front perspective view of a utility vehicle of the present disclosure.
Figure 2:
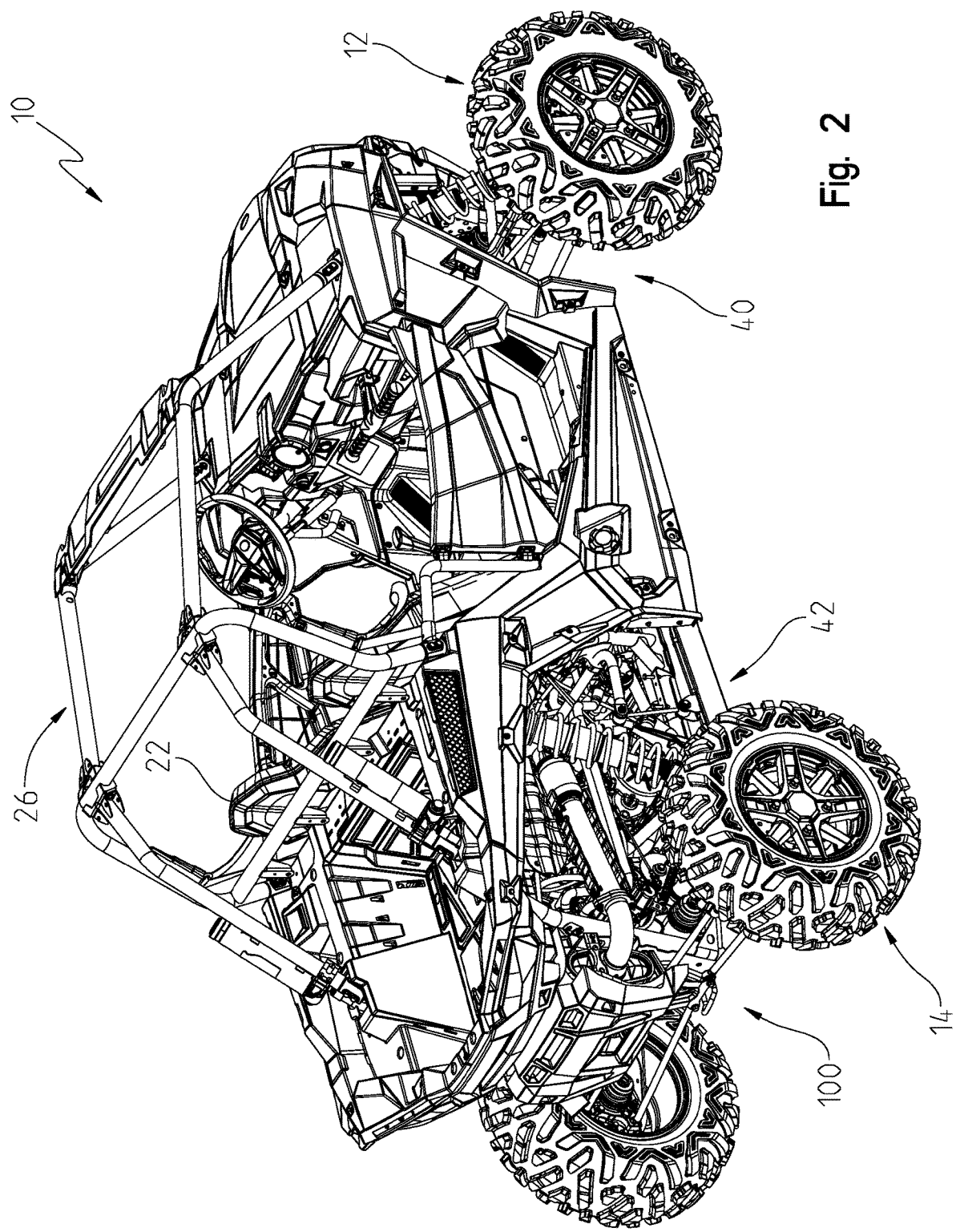
FIG. 2 is a rear perspective view of the utility vehicle of FIG. 1.
Figure 3:
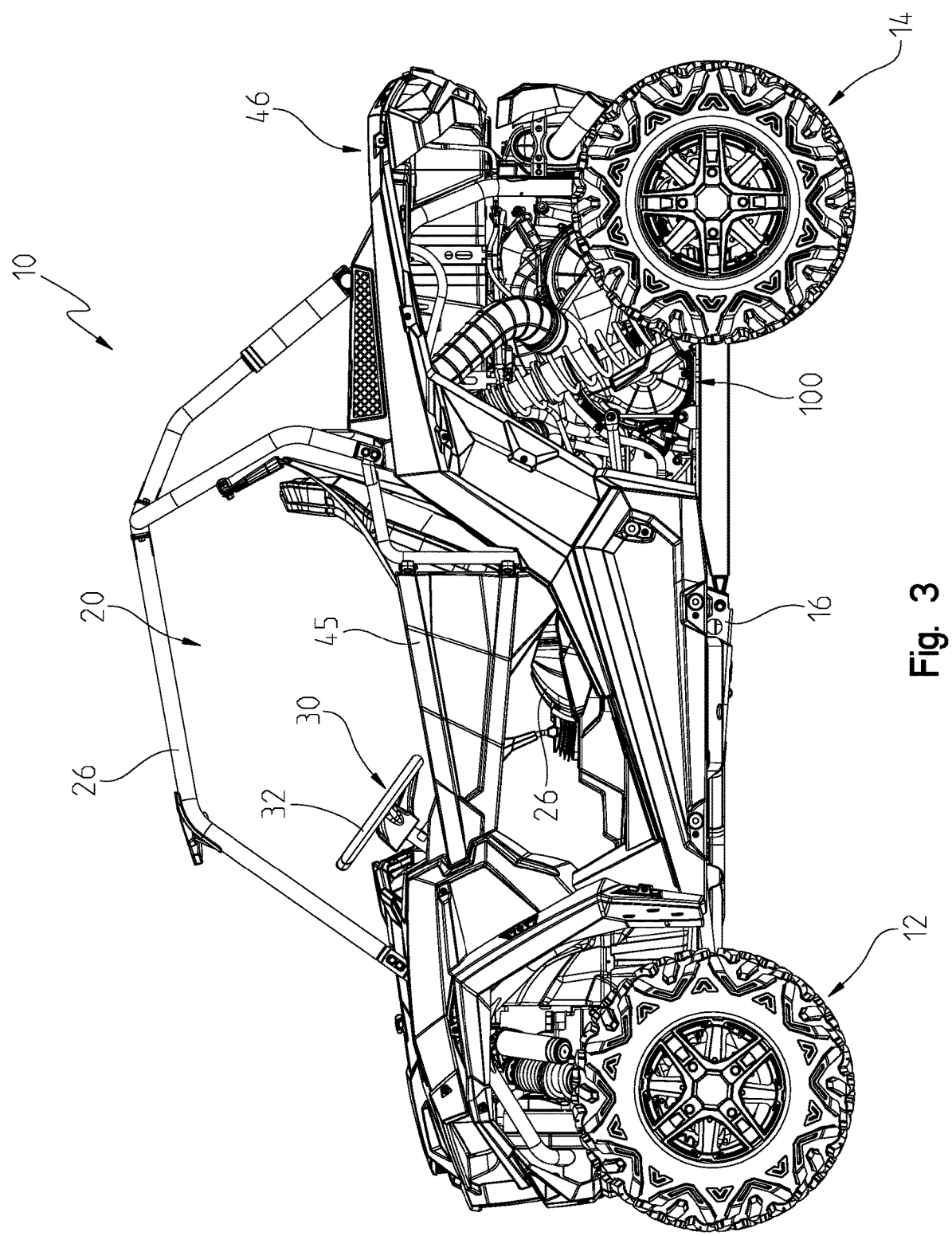
FIG. 3 is a left side view of the utility vehicle of FIG. 1.
Figure 4:
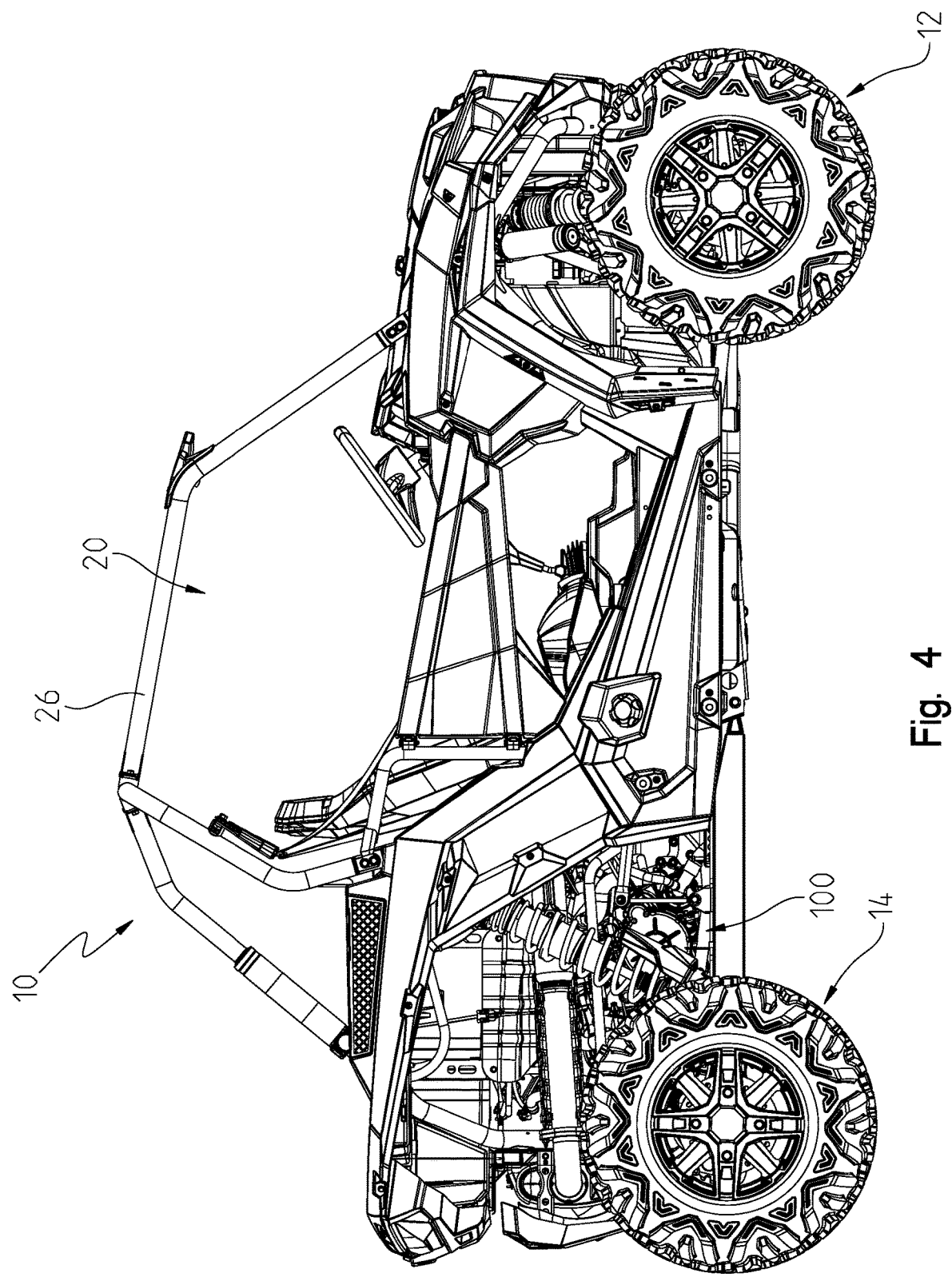
FIG. 4 is a right side view of the utility vehicle of FIG. 1.
Figure 5:
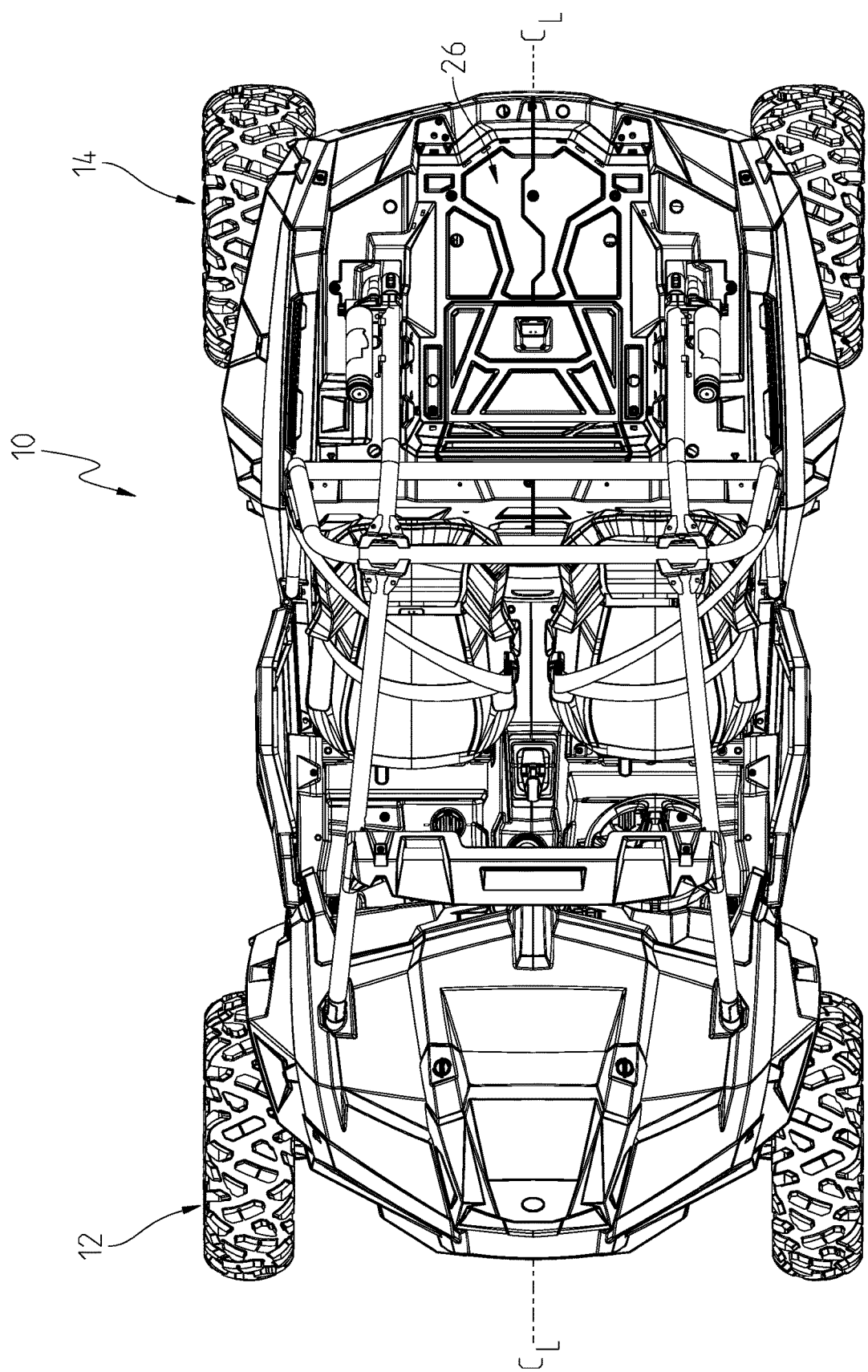
FIG. 5 is a top view of the utility vehicle of FIG. 1.
Figure 6:
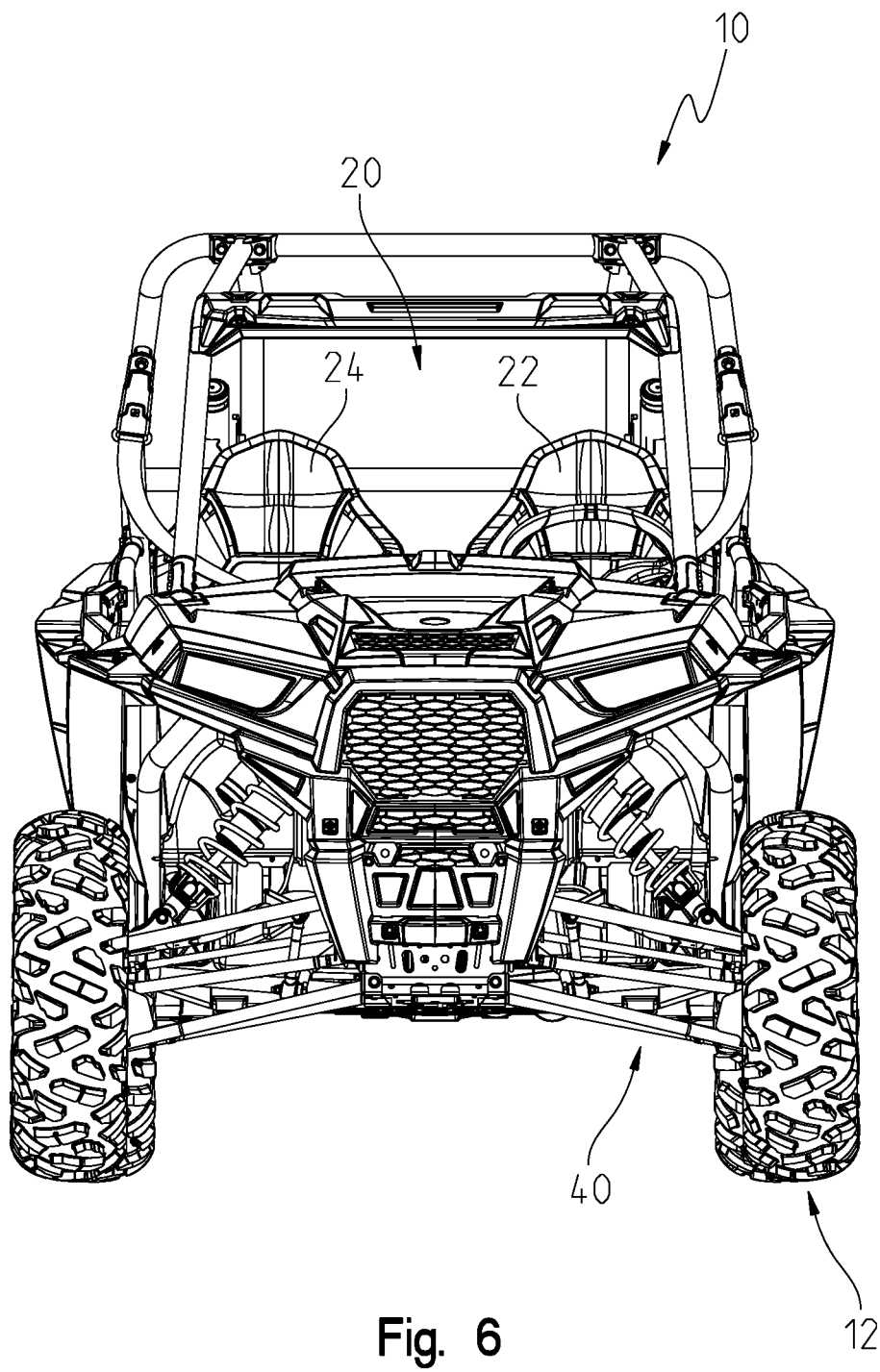
FIG. 6 is a front side view of the utility vehicle of FIG. 1.
Figure 7:
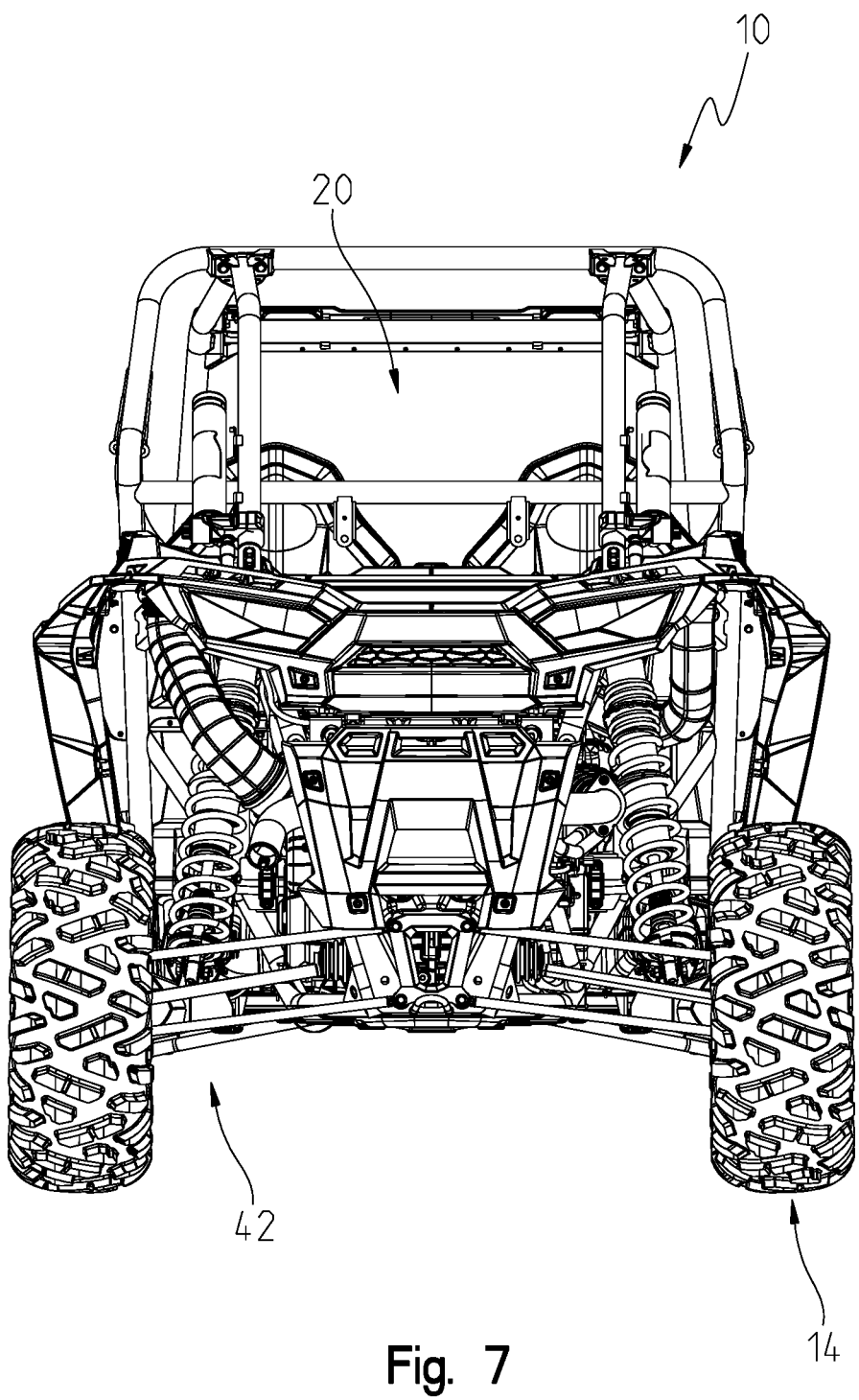
FIG. 7 is a rear side view of the utility vehicle of FIG. 1.

With reference first to FIGS. 1-7, the vehicle of the present invention will be described. As shown, a vehicle 10 is generally depicted which includes front ground-engaging members 12 and rear ground-engaging members 14. The ground-engaging members 12, 14 support a vehicle frame 16 (FIG. 3), which supports an operator or seating area 20 comprised of a driver's seat 22 and a passenger seat 24. A cab frame 26 generally extends over the seating area 20. As best shown in FIG. 3, the vehicle 10 further includes a steering assembly 30 for steering the front ground-engaging members 12 whereby the steering assembly 30 includes a steering wheel 32 which could be both tiltable and longitudinally movable.

In some embodiments, the vehicle 10 is a four-wheel drive vehicle. As shown, the vehicle 10 may also include an outer body 41 including a hood 43, side panels 44, doors 45, a cargo area 46 (e.g., a utility bed), and rear panels 48, which are illustrated throughout FIGS. 1-7. The vehicle 10 further includes a front suspension 40 and a rear suspension 42.

As seen in FIGS. 2-4 and 8-13, the vehicle 10 include a powertrain assembly 100. The component parts of the powertrain assembly 100 are discussed hereafter in greater detail with respect to FIGS. 8-10. Illustratively, the powertrain assembly 100 is comprised of an engine 102, a transmission 124 (e.g., a continuously variable transmission (CVT) 104, and/or a shiftable transmission 106), an exhaust assembly 108, and a turbocharger 110. The powertrain assembly 100 is supported by the vehicle frame 16. The powertrain assembly 100 described herein may be further configured as shown in U.S. patent application Ser. No. 16/875,448 with a filing date of May 15, 2020 and/or U.S. patent application Ser. No. 16/875,494 with a filing date of May 15, 2020, the subject matter of which are incorporated herein by reference in their entireties.

Figure 8:
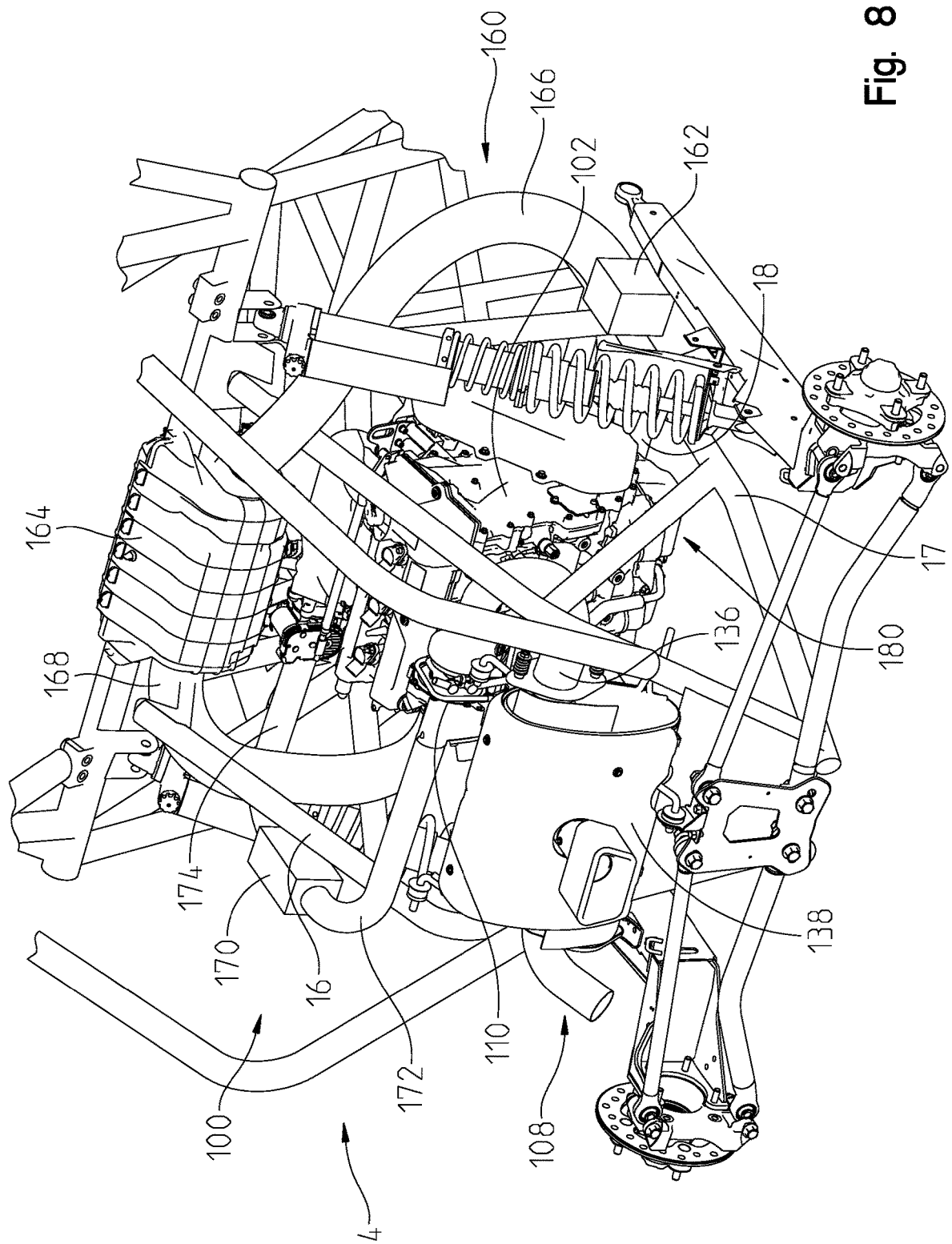
FIG. 8 is a perspective view of a powertrain assembly of the vehicle of FIG. 1.
Figure 9:
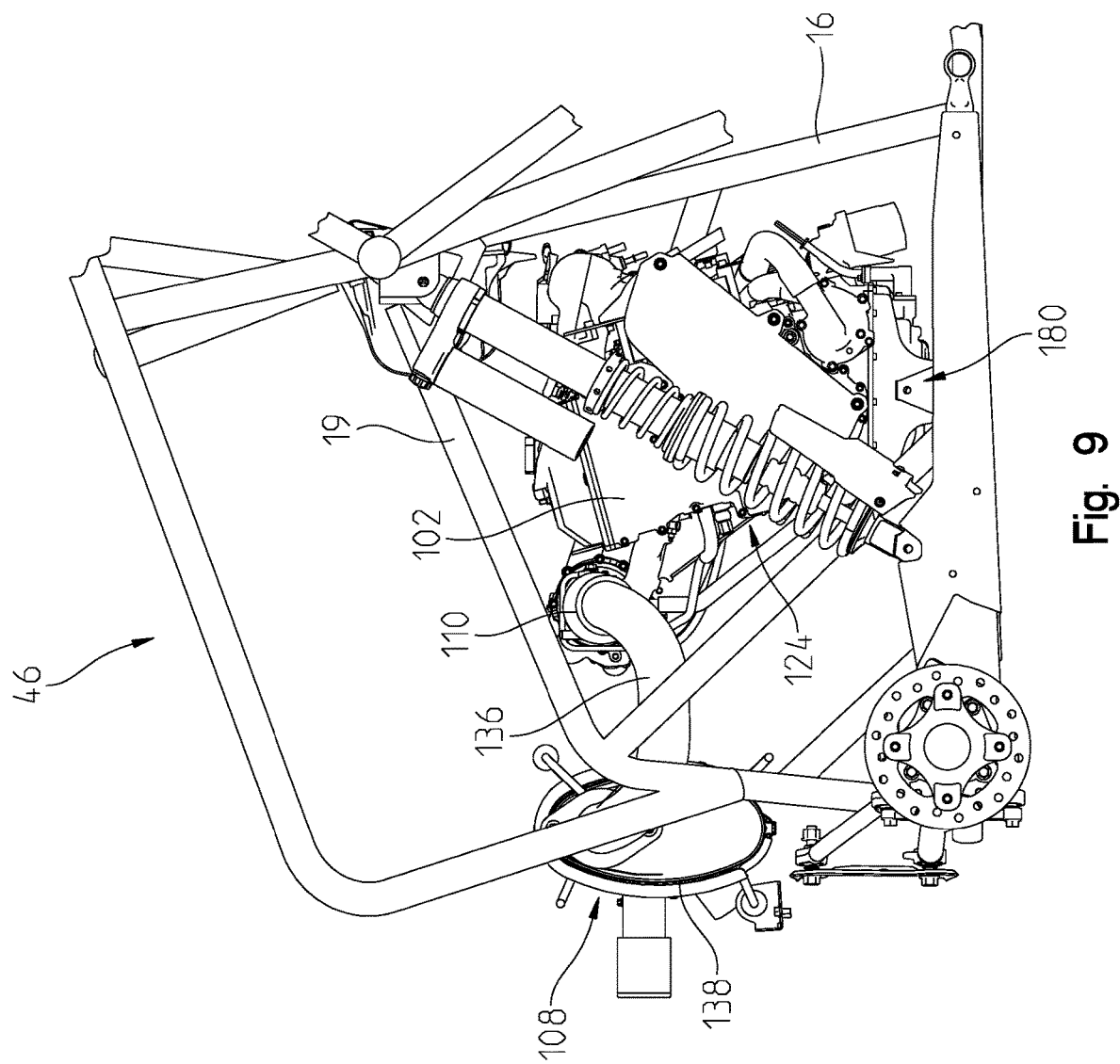
FIG. 9 is a side view of the powertrain assembly of FIG. 8.
Figure 10:
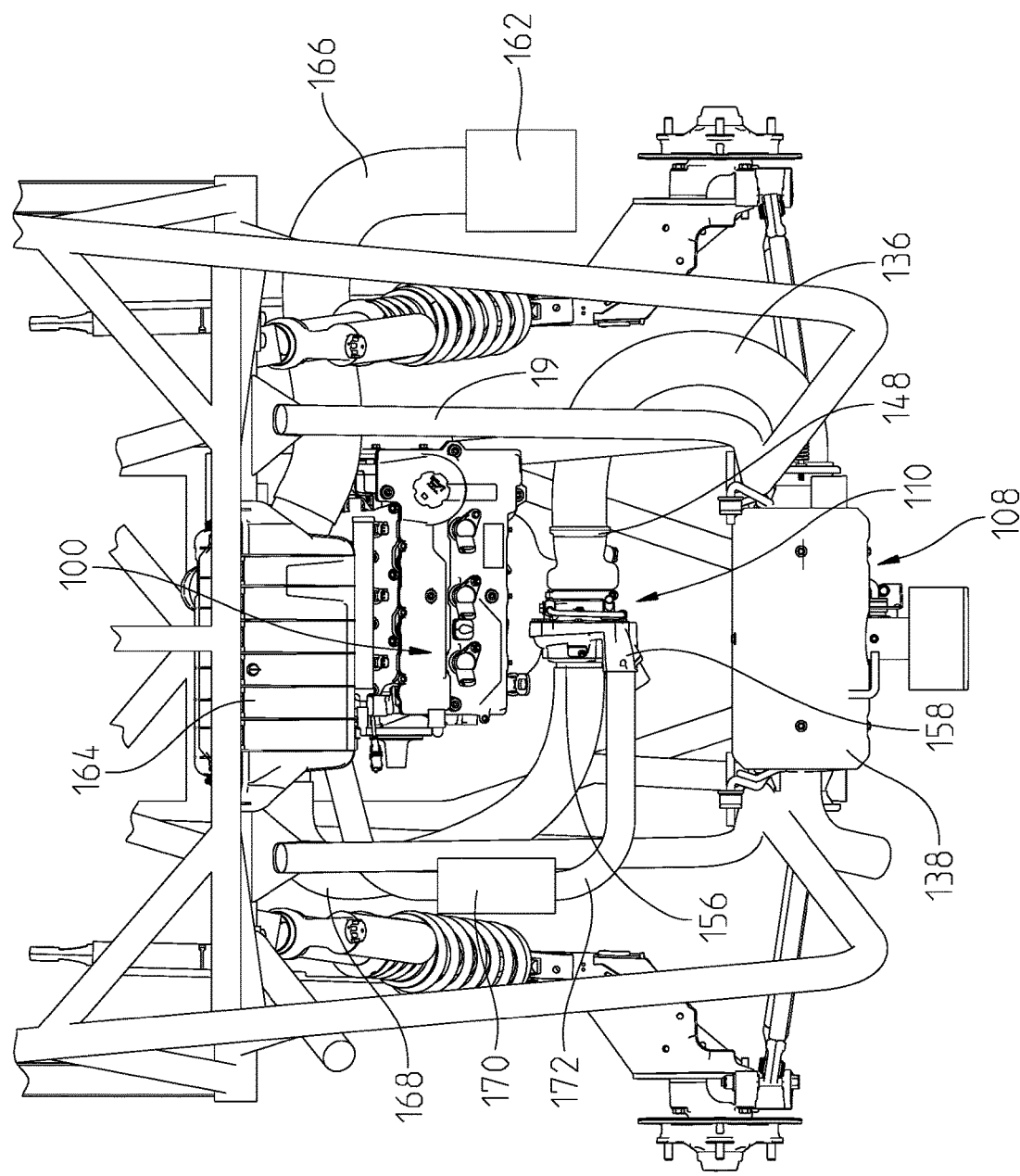
FIG. 10 is a top view of the powertrain assembly of FIG. 8.

With reference now to FIGS. 8-10, the powertrain assembly 100 will be described in greater detail. The powertrain assembly 100 provides power to the ground-engaging members 12, 14 of the vehicle 10 (FIGS. 1-7). The powertrain assembly 100 is supported on at least longitudinal frame members 17 and an engine mount 18 of the vehicle frame 16. In one embodiment, the longitudinal frame members 17 are generally parallel to a centerline $C_L$ of the vehicle 10 (FIG. 5) and the engine mount 18 extends transversely to the centerline $C_L$ and the longitudinal frame members 17.

Figure 11:
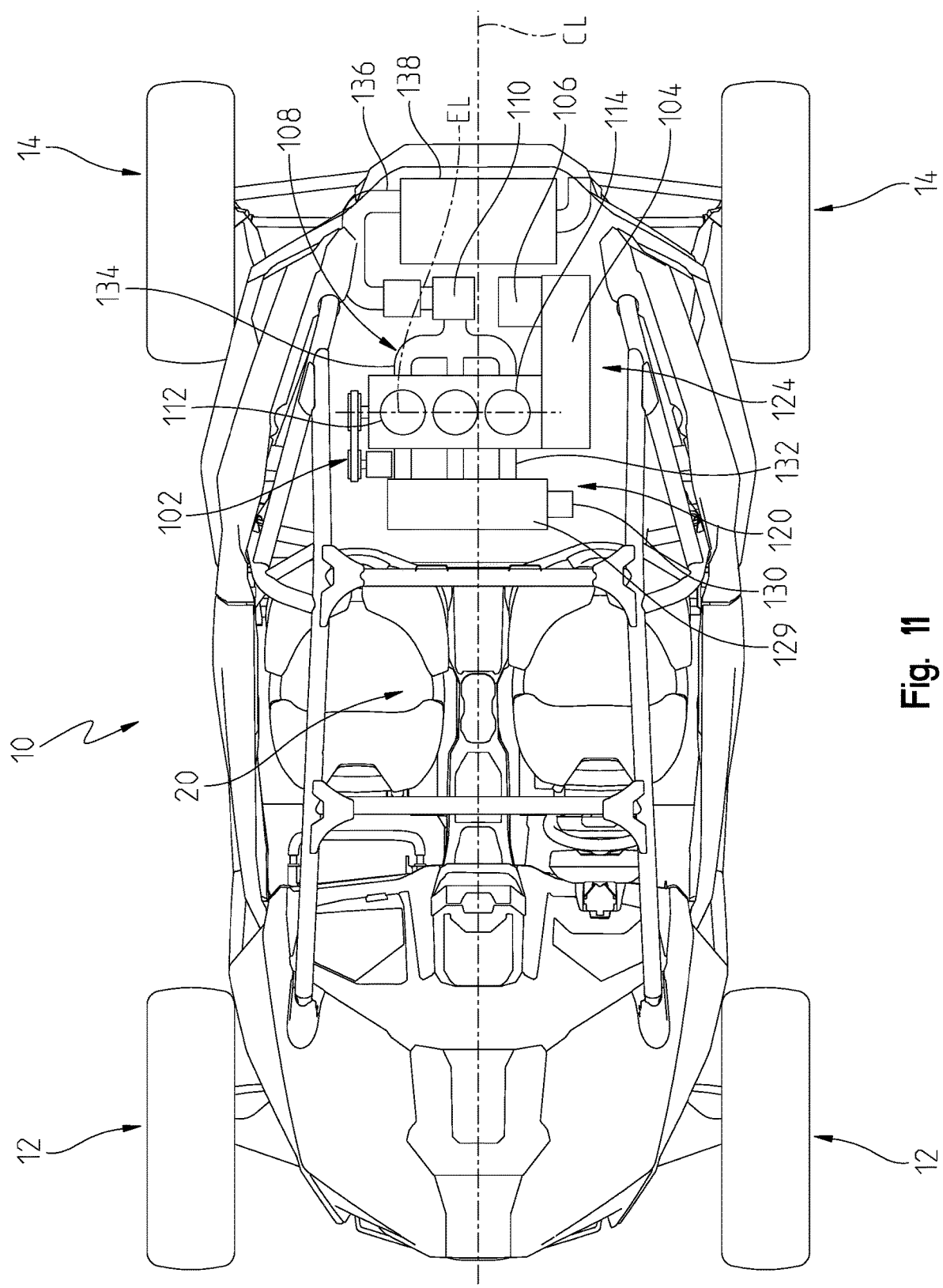
FIG. 11 is a view of a powertrain assembly having an engine in an lateral or east-west configuration.
Figure 12:
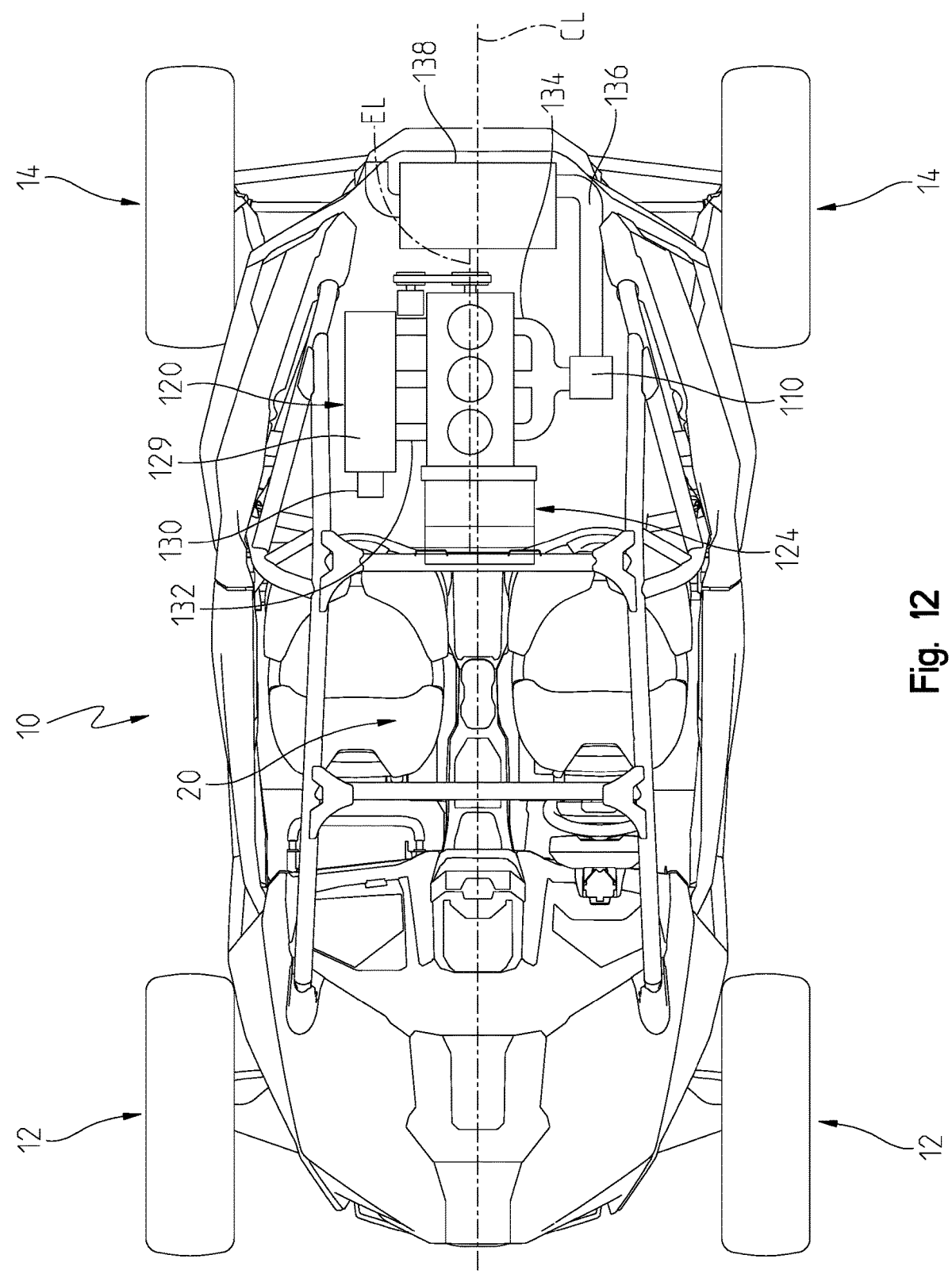
FIG. 12 is a view of a powertrain assembly having an engine in a longitudinal or north-south configuration.
Figure 13:
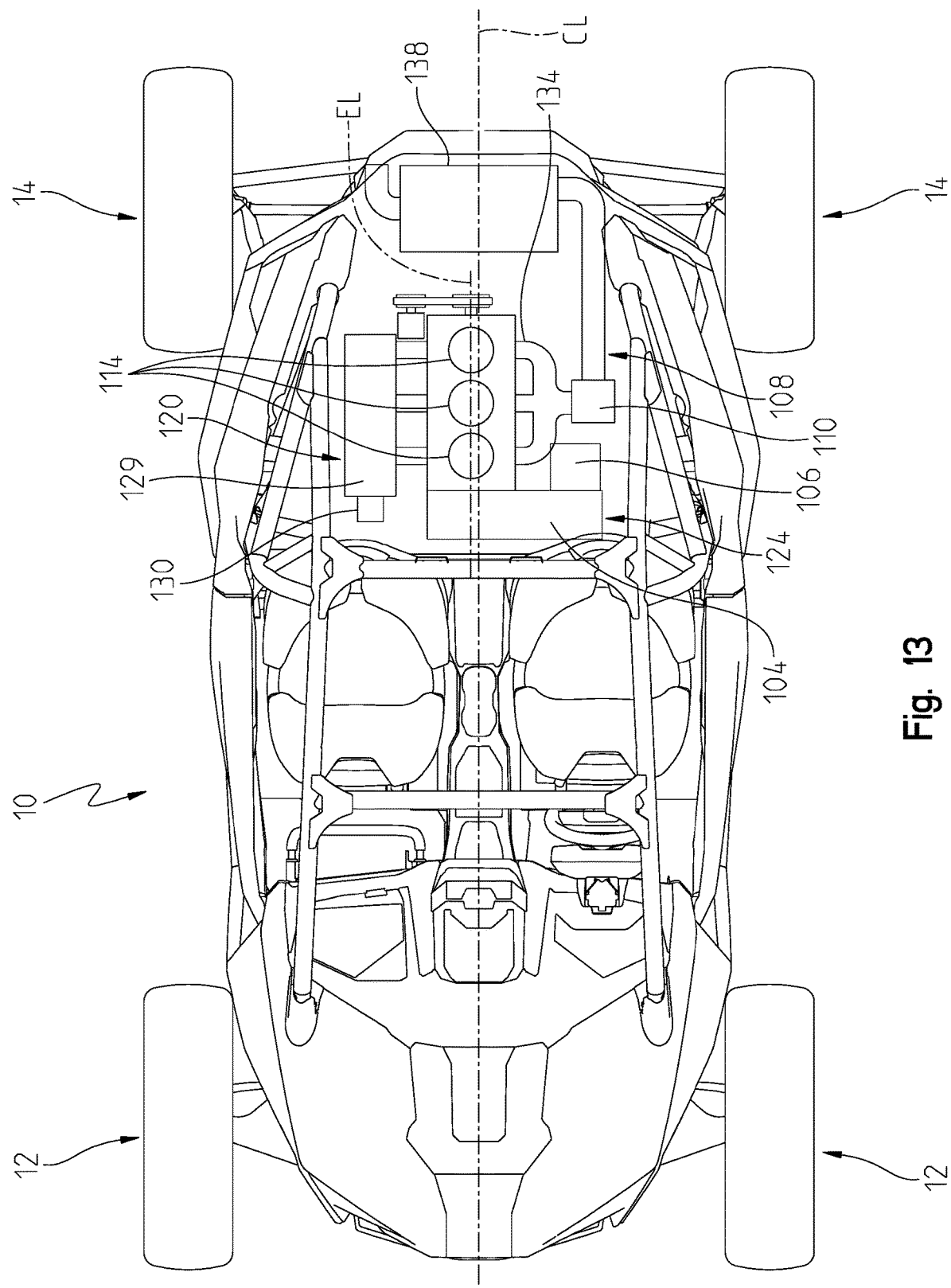
FIG. 13 is a view of an alternative powertrain assembly having an engine in a longitudinal or north-south configuration.
Figure 14:
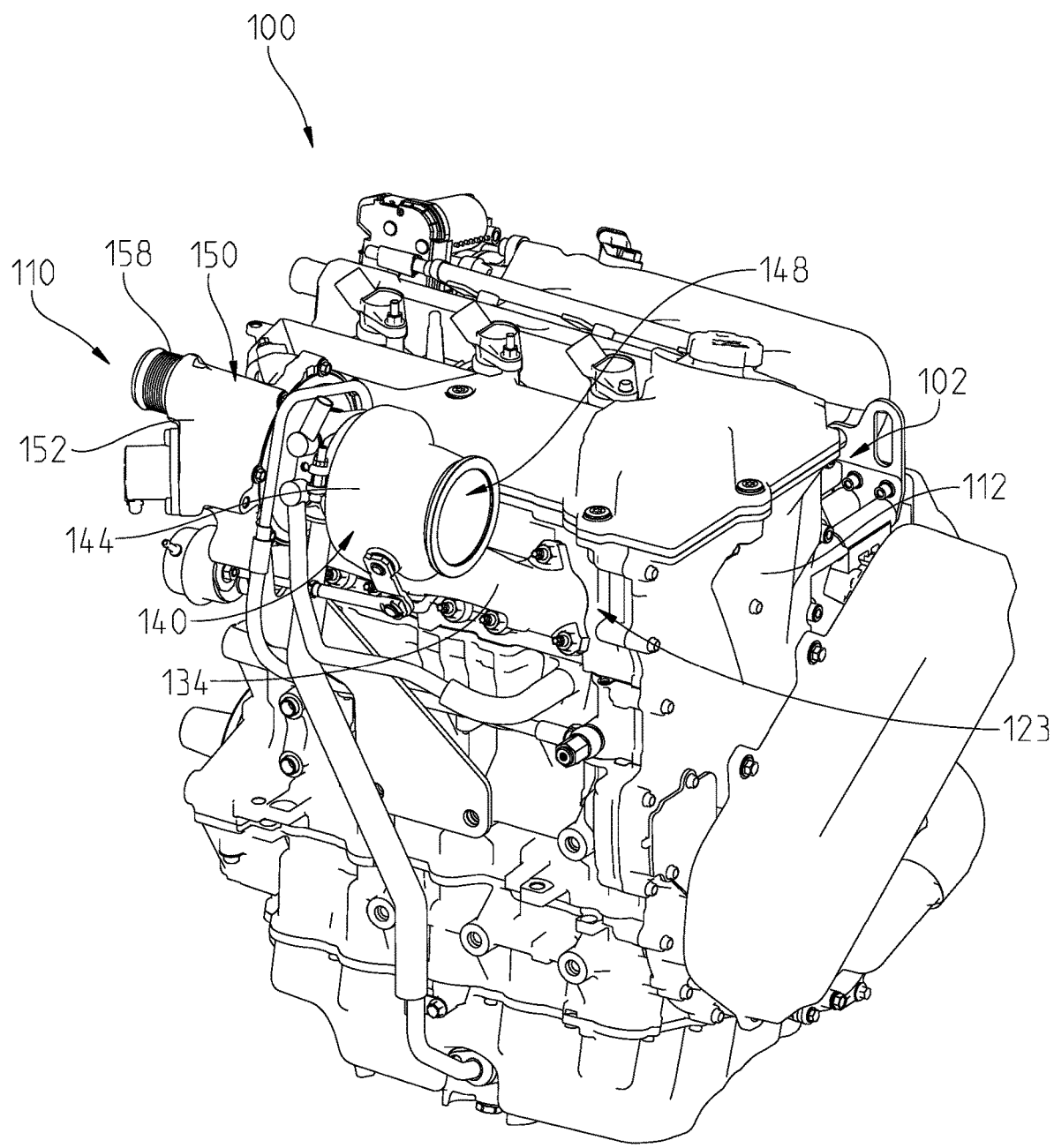
FIG. 14 is a top perspective view of a powertrain assembly with an engine and a turbocharger.
Figure 15:
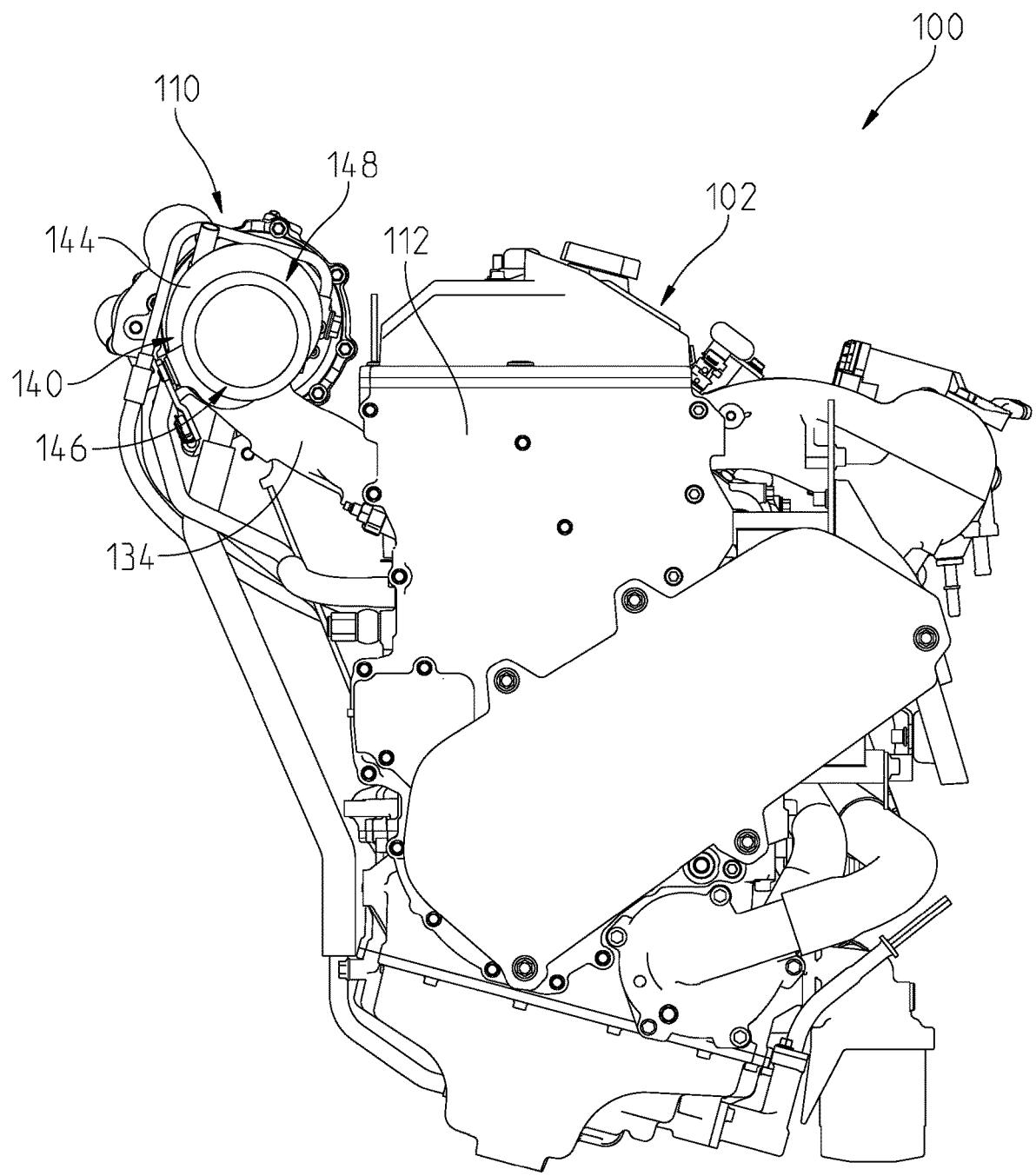
FIG. 15 is a side view of the engine and turbocharger of FIG. 14.

Referring to FIGS. 11-13, the engine 102 is positioned at the rear of the vehicle 10 behind the seating area 20. The engine 102 includes an engine or cylinder block 112 with at least one cylinder 114 (e.g., including a twin cylinder configuration, three cylinder configuration, other cylinder configurations). Illustratively, the engine 102 is an in-line, three-cylinder engine having a first, second, and a third cylinder 114. In addition to the engine 102, the powertrain assembly 100 includes an engine intake manifold assembly 120 providing air to the engine 102, the exhaust assembly 108 routing exhaust from the engine 102 out of vehicle 10, the transmission 124 operably coupled to the engine 102, and a drivetrain having a drive shaft coupled to the transmission 124. The engine 102 may be oriented either in lateral orientation (FIG. 11) or in a longitudinal orientation (FIG. 12). In the lateral orientation of FIG. 11, a crankshaft (not shown) extends laterally or generally transverse to the centerline $C_L$, whereas, in the longitudinal orientation of FIG. 12, the crankshaft (not shown) extends parallel to or colinear with centerline $C_L$.

The engine 102 of powertrain assembly 100 may be placed in the vehicle 10 in a plurality of different configurations, with the present application illustrating at least two of these different configurations. In the first illustrative configuration, shown in FIG. 11, the engine 102 is positioned in the vehicle 10 in a lateral orientation, where the cylinders 114 of the engine 102 are aligned from a right side 2 of the vehicle 10 to a left side of the vehicle 10 and the crankshaft (not shown) extends laterally between the right side and left side of the vehicle 10 such that the engine 102 is perpendicular to a centerline $C_L$ of the vehicle 10. When the engine 102 is in the lateral orientation, the engine intake manifold assembly 120, which includes an intake manifold 129, at least one throttle body 130, and/or intake manifold runners 132, is positioned generally forward of the engine 102 and rearward of the seating area 20 such that a majority of engine intake manifold assembly 120 is between seating area 20 and a forwardmost point of the engine 102 and all of engine intake manifold assembly 120 is longitudinally between the seating area 20 and a centerline $E_L$ of the engine 102. The centerline $E_L$ of the engine 102 is defined, in the first illustrative embodiment, as the laterally-extending centerline of the cylinders 114 such that the centerline $E_L$ intersects the midpoint or the vertically-extending reciprocation axis (e.g., reciprocation of a piston (not shown) therein) of each cylinder 114.

The exhaust assembly 108 of the first illustrative configuration (FIG. 11), which includes an exhaust manifold 134, at least one exhaust conduit 136, and/or a muffler or silencer 138, is positioned generally rearward of the engine 102 and forward of a rear of the vehicle 10 such that at least the exhaust manifold 134 and muffler 138 of the exhaust assembly 108 are longitudinally between the engine 102 and the rearward most point of the vehicle 10. It may be appreciated that a portion of a tail pipe of the exhaust assembly 108 may extend rearwardly from the rear of the vehicle 10 without departing from the description and understanding of the exhaust assembly 108 disclosed herein.

The transmission 124 of the first illustrative configuration (FIG. 11) is laterally positioned between the engine 102 and the right side or left side of the vehicle 10 such that the transmission 124 extends along a right side or a left side of the engine 102. The transmission 124 also may be positioned rearward of at least a portion of the engine intake manifold assembly 120 and forward of at least a portion of the exhaust assembly 122. Illustratively, the transmission 124 is positioned laterally between the engine 102 and the left side 4 of the vehicle 10.

The configuration of the powertrain assembly 100 of the first illustrative configuration (FIG. 11) allows for the powertrain assembly 100 to have a hot side and a cold side. More particularly, a hot side of the engine 102, or the side of the engine 102 which contains more heat producing components, is generally defined as the rearward portion of the engine 102 (e.g., may be defined as the portion of at least the engine 102 positioned rearward of the engine centerline $E_L$). The hot side of the engine 102 includes heat-producing components such as the exhaust manifold 134 which contains hot air exhaust from the engine 102 and other such components that may experience elevated temperatures during operation of the engine 102 compared to other components. Additionally, a cool/cold side of the engine 102, or the side of the engine 102 which generates less heat, is generally defined as the forward portion of the engine 102 adjacent the seating area 20 (e.g., may be defined as the portion of at least the engine 102 positioned forward of engine centerline $E_L$). The cool side of the engine 102 includes components that generate no or less heat such as the engine intake manifold assembly 120 which receives ambient air and other such components that do not experience elevated temperatures during operation of the engine 102. Because the cool side of the engine 102 does not generate heat or generate as much heat as the hot side of the engine 102, various heat sensitive components of the powertrain assembly 100 and/or the vehicle 10 may be positioned within or adjacent to the cool side of the engine 102, such as electronics like sensors, controllers, etc. In addition to the strategic positioning of a hot and cold side of the engine 102, this first illustrative configuration allows for throttle body 130 to be closer to the intake manifold 129 resulting in a shorter engine intake manifold assembly 120.

In the second illustrative configuration, shown in FIGS. 12 and 13, the engine 102 is positioned in the vehicle 10 in a longitudinal configuration, where the cylinders 114 of the engine 102 are aligned in the fore/aft direction of the vehicle 10 and the crankshaft 116 extends longitudinally such that engine centerline EL of the engine 102 may be at least parallel to centerline $C_L$ of the vehicle 10. In other embodiments, the engine centerline $E_L$ may be colinear with the centerline $C_L$. As shown in FIGS. 12 and 13, when the engine 102 is in the longitudinal/second illustrative configuration, longitudinal centerline $E_L$ of the engine 102 may be offset to the right of the centerline $C_L$ of the vehicle 10 in order to allow an output shaft (not shown) of shiftable transmission 106 and the drive shaft (not shown) of the drivetrain to be properly aligned. When the engine 102 is in the second or longitudinal configuration, the engine intake manifold assembly 120 is positioned laterally between the right side of the vehicle 10 and the engine 102, portions of the exhaust assembly 122 extend along the left side of the vehicle 10 to a position rearward of the engine 102, and the transmission 124 may be positioned longitudinally forward of the engine 102. In various embodiments, at least a portion of the transmission 124 may be positioned below the seating area 20 and/or rearward of the seating area 20. As such, the transmission 124 may be longitudinally intermediate a portion of the seating area 20 and a portion of the engine 102.

In either the first or second illustrative configurations, the powertrain assembly 100 may further include the turbocharger 110, which may be positioned behind the engine 102 in the transverse configuration of FIG. 11 or behind or to the side of the engine 102 in the longitudinal configuration of FIGS. 12 and 13. However, in various embodiments, the turbocharger 110 may be positioned at any location along exhaust conduit 136 between the exhaust manifold 134 and muffler 138. In some embodiments, the turbocharger 110 may be integrated within a portion of the exhaust manifold 134 and/or positioned immediately adjacent the exhaust manifold 134. The exhaust manifold 134 may include a run that is less than 12 inches, for example, less than 9 inches, less than 6 inches, less than 4 inches, less or than 2 inches. This places the turbocharger 102 in close proximity to the engine 102, for example the space between the turbocharger 110 and the engine 102 may be less than 9 inches, less than 6 inches, less than 5 inches, less than 4 inches, less than 3 inches, less than 2 inches, or less than 1 inch. Be having the run between the engine 102 and the turbocharger 110 being shortened, the responsiveness of the turbocharger 110 is increased. The configuration of the inlets and outlets of the turbocharger 110 discussed below also facilitates the placement of the turbocharger 110 in such close proximity with the engine 102.

Referring to FIGS. 14-17, the turbocharger 110 is positioned on the hot or exhaust side of the engine 102 and is in parallel with the engine 102. When the engine 102 is provided in the East/West configuration, the turbocharger 110 is positioned rearward of the engine 102. The turbocharger 110 is coupled to the engine block 112. It is understood that the turbocharger 110 may be provided as a single integral unit with the exhaust manifold 134 or may be provided as a separate component that can be coupled to the exhaust manifold 134. Accordingly, in some embodiments, the turbocharger 110 is coupled to the engine block 112 via the exhaust manifold 134 which is separate from the turbocharger 110 or in some embodiments is coupled to the engine block 112 via the exhaust manifold 134 that is integral with the turbocharger 110. The turbocharger 110 is in fluid communication with the exhaust ports 123 of the engine 102. Various turbochargers may be implemented, including but not limited to those shown in U.S. Pat. No. 10,300,786 issued May 28, 2019 and entitled "Utility Vehicle", the subject matter of which is incorporated herein by reference in its entirety. In some embodiments, the exhaust manifold 134 includes a short run from the engine 102 to the turbocharger 110 (e.g., less than one foot, such as less than 8 inches or less than 6 inches). By having a shorter run from between the turbocharger 110 and the engine 102, other air delivery components such as the second and third conduits 168, 172 (which are discussed hereafter) have shorter segments exposed to the hot side of the engine 102 and therefore heat transfer is limited to those components which deliver air to the engine for combustion.

The turbocharger 110 includes a turbine portion 140 and a compressor portion 150. The turbine portion 140 includes a turbine housing 142, a turbine (not shown), a turbine inlet 146, and a turbine outlet 148. In some embodiments, the turbine inlet 146 receives exhaust from the exhaust manifold 134 (e.g., the turbine inlet 146 is coupled to the exhaust manifold 134 or is integral with the exhaust manifold 134). The compressor portion 150 includes a compressor housing 152, a compressor (not shown), a compressor inlet 156, and a compressor outlet 158. A shaft (not shown) extends between turbine and the compressor.

Figure 16:
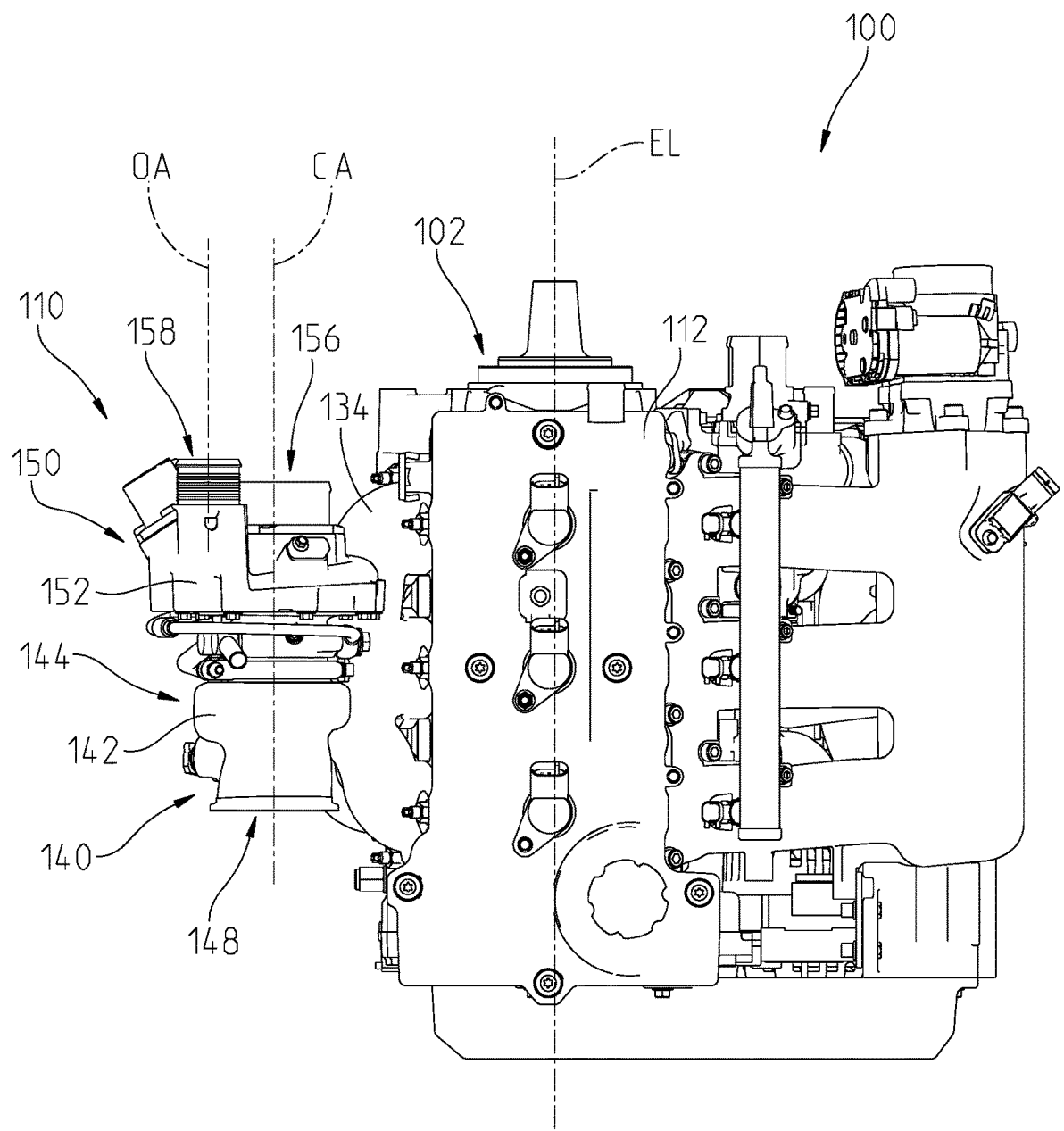
FIG. 16 is a top view of the engine and turbocharger of FIG. 14.
Figure 17:
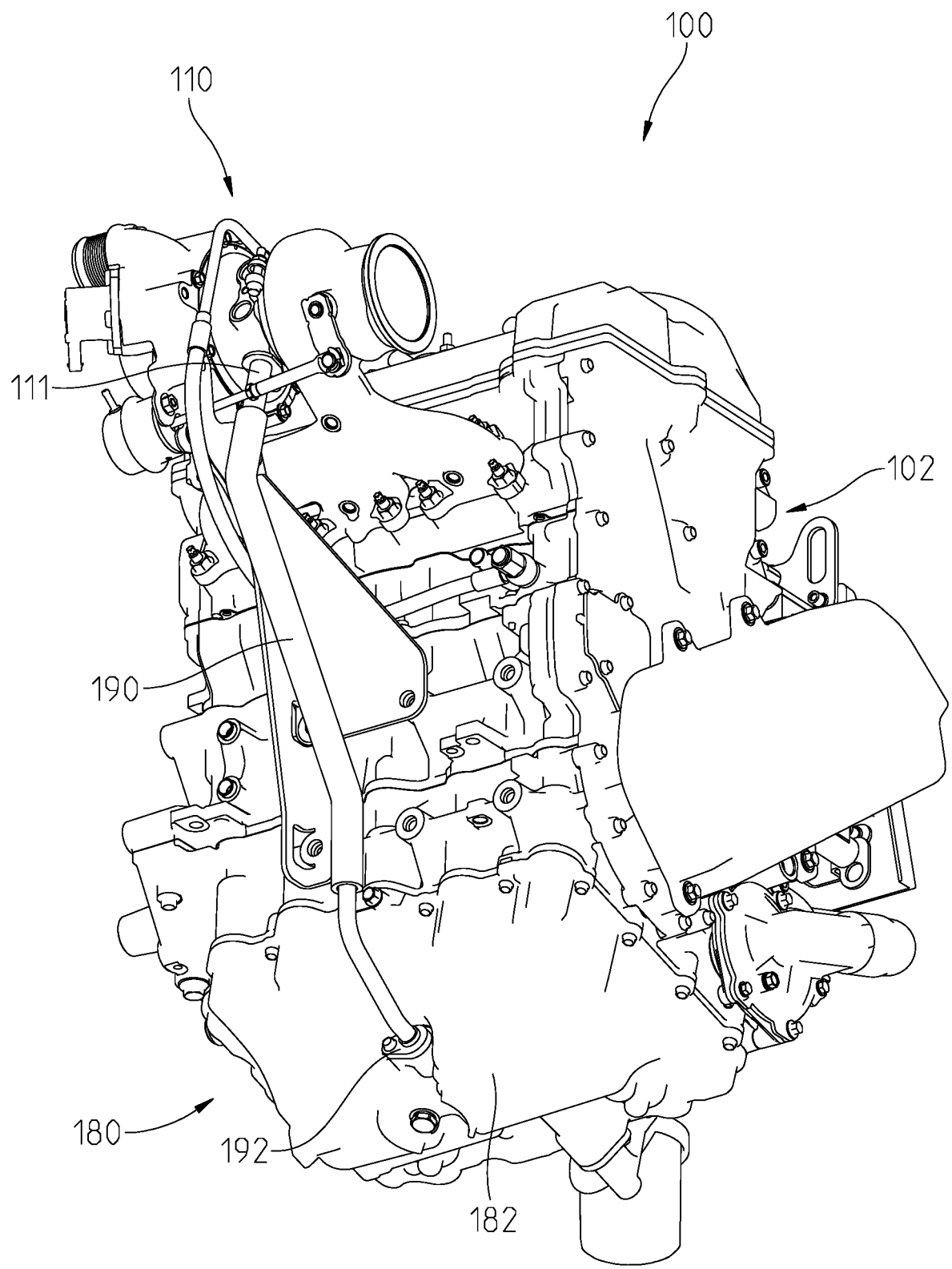
FIG. 17 is a bottom perspective view of the engine and turbocharger of FIG. 14.
Figure 18:
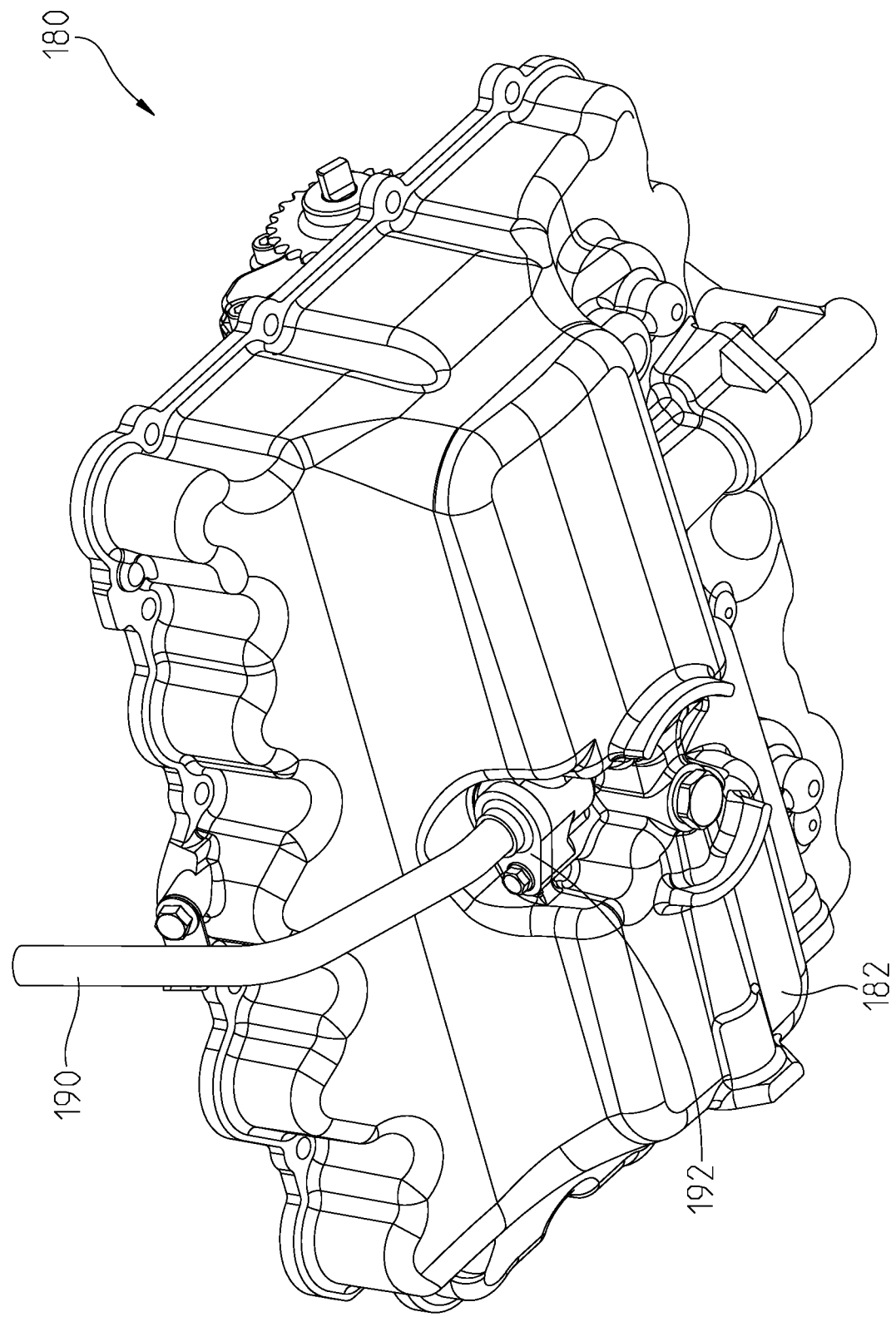
FIG. 18 is a bottom perspective view of an oil management system of an engine with a drain line from a turbocharger.
Figure 19:
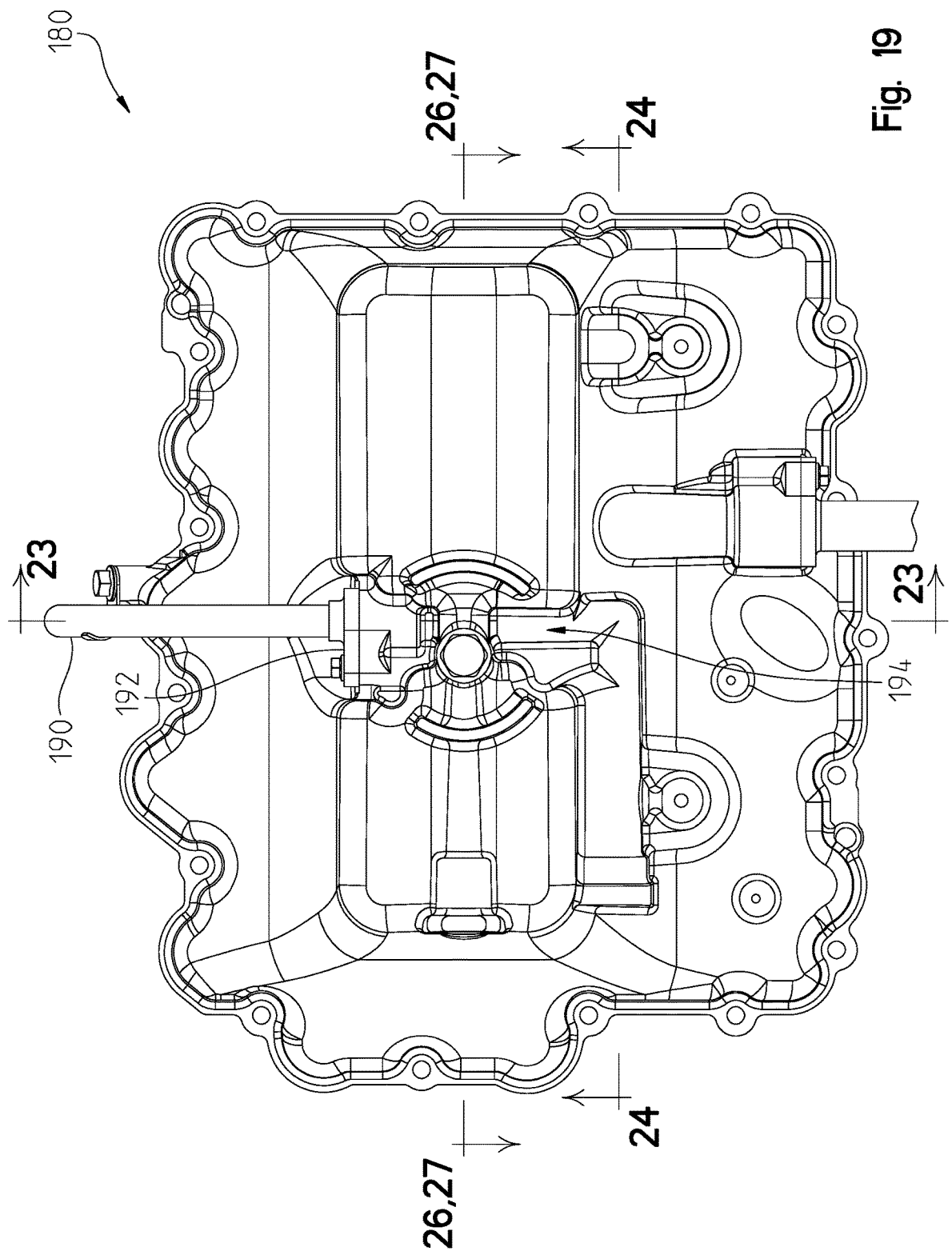
FIG. 19 is a bottom view of the oil management system of FIG. 18.

As shown in FIG. 16, the compressor outlet 158 is aligned parallel to the engine centerline $E_L$. The compressor inlet 156 is also aligned parallel to the engine centerline $E_L$. By aligning the compressor inlet and outlet 156, 158, the turbocharger 110 includes a narrower profile extending away from the engine 102. For example, when the engine 102 has an East/West configuration, the turbocharger 110 includes the compressor inlet and outlet 156, 158 each facing towards the left side of the vehicle 10 (FIG. 8). This reduces the profile of the turbocharger 110 in the longitudinal direction of the vehicle 10 when installed. The compressor inlet and outlet 156, 158 are positioned on the same side of the compressor housing 152. For example, the compressor inlet 156 may be positioned along or near a center of a side of the compressor housing 152 (e.g., along a compressor axis $C_A$ of the compressor 154, see FIG. 16) and the compressor outlet 158 is positioned at the periphery of the side of the compressor housing 152 (e.g., at an outer edge of the compressor 154 having an outlet axis $O_A$ that is substantially parallel to the compressor axis $C_A$). Furthermore, by placing the compressor inlet and outlet 156, 158 as described, thermal transfer of the turbocharger 110 and its corresponding components (e.g., conduits) is reduced. By having the compressor inlet 156 and the compressor outlet 158 parallel to each other, both the compressor inlet and outlet 156, 158 extend laterally away from the engine 102 and therefore are oriented to limit heat transfer to the conduits which couple to each of the compressor inlet and outlet 156, 158. This also facilitates the close placement of the turbocharger 110 with the engine 102 as described above.

More specifically, by placing the compressor inlet and outlet 154, 156 as shown and described (e.g., FIGS. 10 and 16), the conduits through which the air is travelling have a shortened length and their exposure to the hot side of the engine 102 is reduced. Referring to FIGS. 8-10, for example, the vehicle 10 may include an air intake system 160 that includes an air intake inlet 162, an air filter 164, a first conduit 166 extending between the air intake inlet 162 and the air filter 164, a second conduit 168 extending between the air filter 164 and the compressor inlet 156, an intercooler 170, a third conduit 172 extending between the compressor outlet 158, and a fourth conduit 174 extending between the intercooler 170 and the engine intake manifold assembly 120. The second and third conduits 168, 172 are short segments on the hot side of the engine 102 in order to reduce thermal transfer to the air that moves through those conduits. For example, the portions of the second and third conduits 168, 172 that are positioned on the hot side of the engine 102 are less than two to three feet, including less than one foot. Because the turbocharger 110 includes shorter conduits (e.g., first, second, third, and fourth conduits 166, 168, 172, 174), and because the turbocharger 110 is arranged to include a compact profile (e.g., the alignment of the compressor inlet and outlet 156, 158), the turbocharger 110 is able to limit thermal transfer and therefore increase the thermal efficiency of the turbocharger 110 and the powertrain assembly 100, generally.

Referring again to FIGS. 8-10, the turbocharger 110 is packaged within the vehicle 10 in order to optimize the ability of the powertrain assembly 100 to deliver power to the ground-engaging members 12, 14. As illustrated in FIG. 9, the turbocharger 110 is positioned longitudinally rearward of the engine 102, vertically below the cargo area 46, longitudinally forward of the muffler 138, vertically above at least a portion of the transmission 124, laterally adjacent to the CVT 106 (see FIG. 11), and laterally between rear frame members 19. The turbocharger 110 is positioned below and spaced from the cargo area 46 such that it is not contacting or directly adjacent to the cargo area 46 to limit heat transfer to the cargo area 46 (e.g., when a utility bed includes a plastic body) and outside of an envelope formed by the CVT 106. The turbocharger 110 is protected between the rear frame members 19 and is also positioned spaced from the rear ground-engaging members 14 and an envelope defined by the rear ground-engaging members 14. As illustrated, the exhaust conduit 136 is coupled to the turbine outlet 148 and extends to the muffler 138. In some embodiments, the exhaust conduit 136 is routed to the muffler 138 such that at least a portion of the exhaust conduit 136 extends beyond (e.g., outboard of) one of the rear frame members 19. Thus, the turbocharger 110 is positioned within a frame envelope defined by the rear frame members 19 envelope and the exhaust conduit 136 extends at least partially outside of the frame envelope. In some embodiments, the turbocharger 110 is within 4 feet (e.g., within 2 feet) of the rear suspension 42. The turbocharger 110 may be packaged inboard of the rear suspension 42, the positioning being operable to mitigate heat transfer to the components of the rear frame members 19 and the rear suspension 42.

Figure 20:
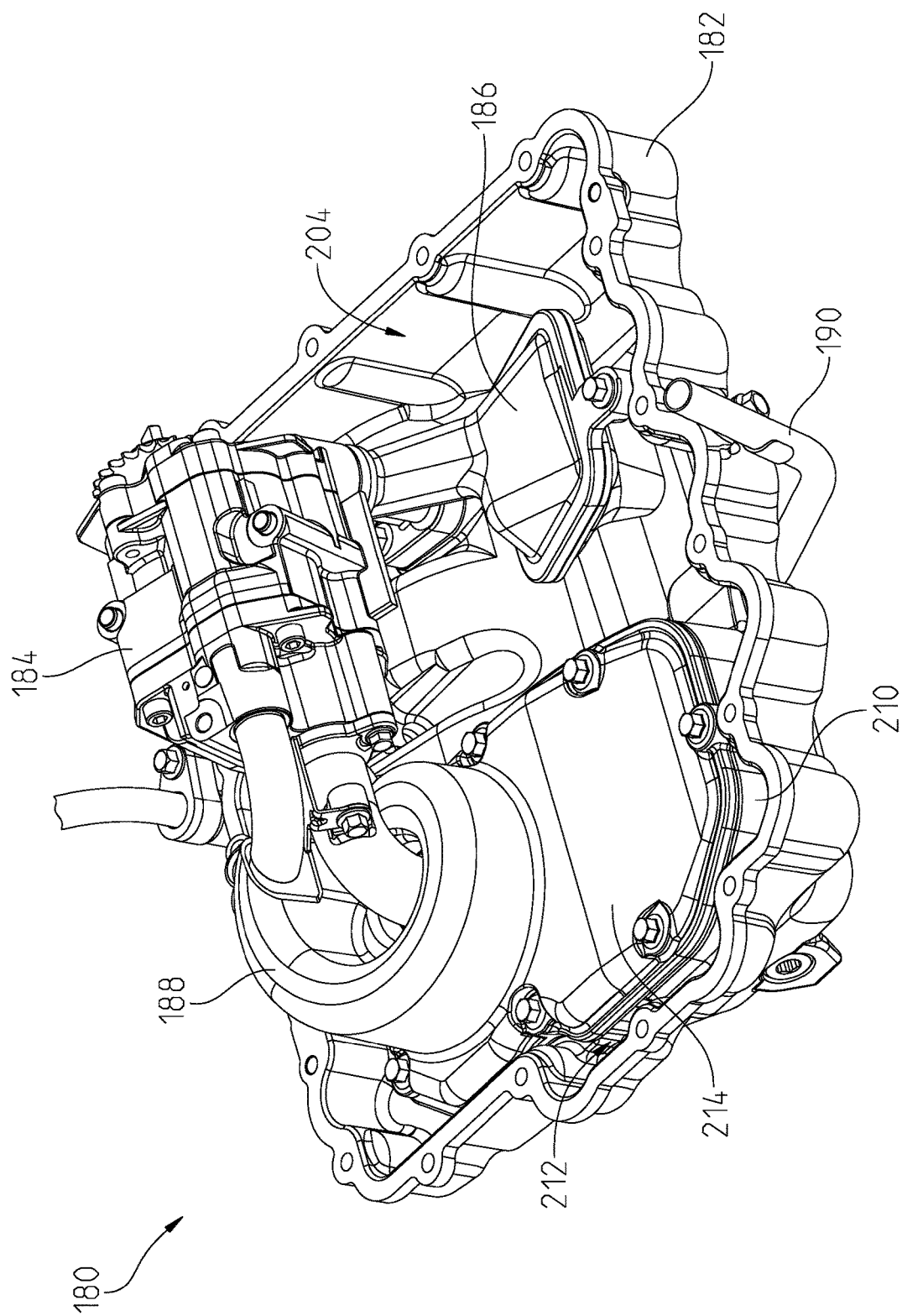
FIG. 20 is a top perspective view of the oil management system of FIG. 18.

Referring now to FIGS. 17-29, the powertrain assembly 100 also includes an oil management system 180. The oil management system 180 includes an oil pan 182 coupled to the engine 102 (FIGS. 17-20), an oil pump 184 (FIG. 20), at least one oil pickup member 186 (FIG. 20), and a deaerator 188 (FIG. 20). The oil pan 182 defines at least one reservoir into which oil is drained. Oil that is in the reservoir is pumped from the reservoir, through the oil pickup member 186 via the oil pump 184, and into the engine 102 (e.g., a wet sump). The reservoir is also operable to receive oil drained from the turbocharger 110. For example, the turbocharger 110 may include a drain 111 that is coupled to an oil drain line 190 that coupled to an oil drain line connector 192 on the oil pan 182 (FIG. 20). The drain line connector 192 includes a channel 194 through which oil drains from the turbocharger 110 into the reservoir of the oil management system 180.

The oil pan 182 with the turbo drain line connector 192 allows the turbocharger 110 to continue to operate in conditions of high vehicle angularity. For example, the turbocharger 110 will continue to drain in conditions of 50 degree and greater angularity of the vehicle 10, which can be caused in certain operating conditions of the vehicle 10 including climbing, rock crawling, accelerations, and so forth. The turbocharger 110 will continue to drain into the oil pan 182 in the high angularity conditions because a low pressure zone is formed where the oil from the turbocharger 110 is drained in the oil management system 180. In some embodiments, the oil pan 182 includes a deep profile that is facilitated, in part, by the raising of the engine 102 from the frame 16, which is discussed more fully in U.S. patent application Ser. No. 16/875,494, which is incorporated by reference herein. By having a deeper profile, the oil pan 182 and reservoir are able to hold oil even when the vehicle 10 is in high angularity and/or high acceleration situations (e.g., longitudinal, lateral, and compound angularity). The angle of the drain lines (i.e., the drain line connector 192 and channel for the turbocharger 110) may be angled relative to a vertical axis such that even at high angularity or acceleration, oil does not travel backward through the oil management system 180.

Figure 21:
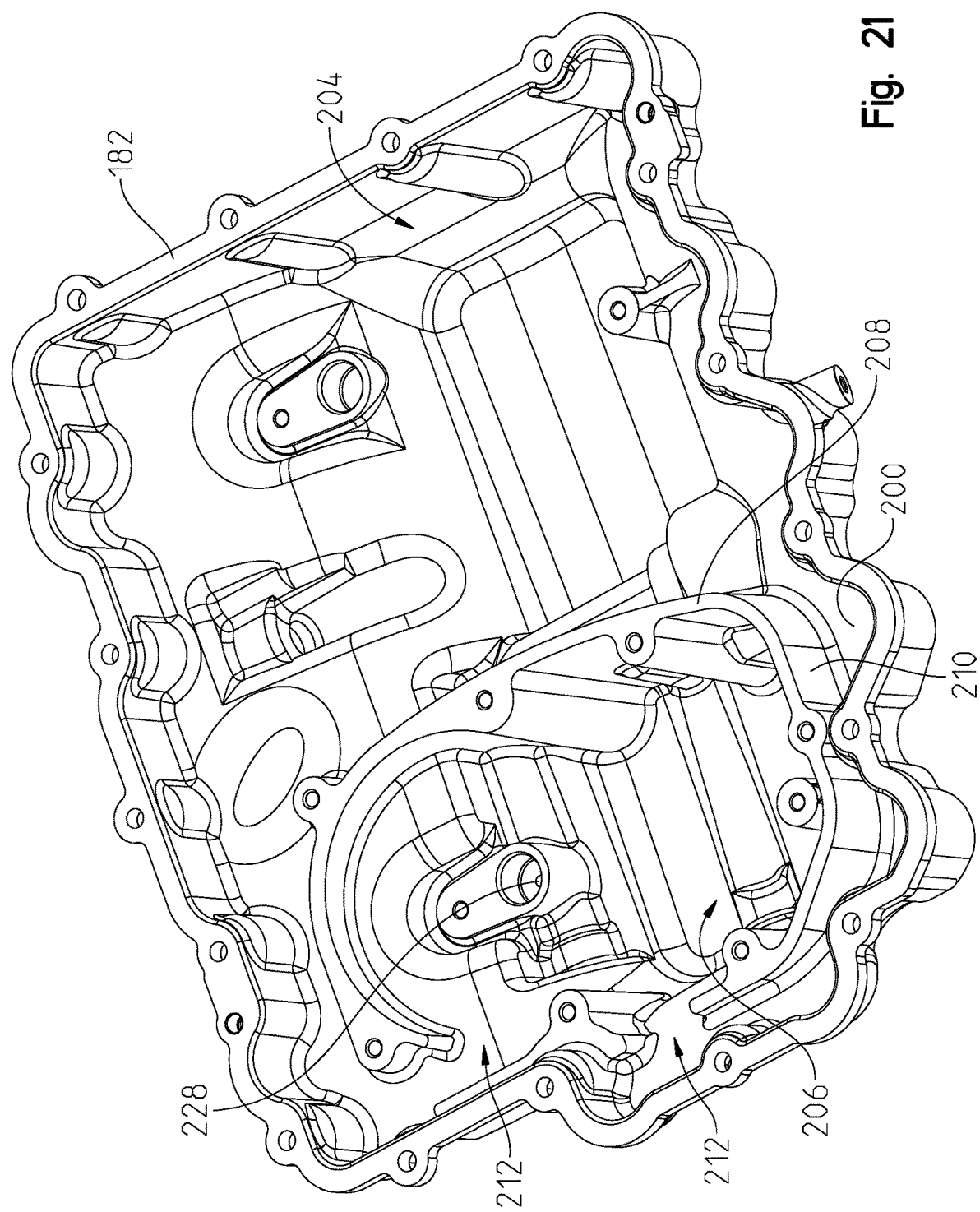
FIG. 21 is a top perspective view of an interior of an oil pan of the oil management system of FIG. 18.
Figure 22:
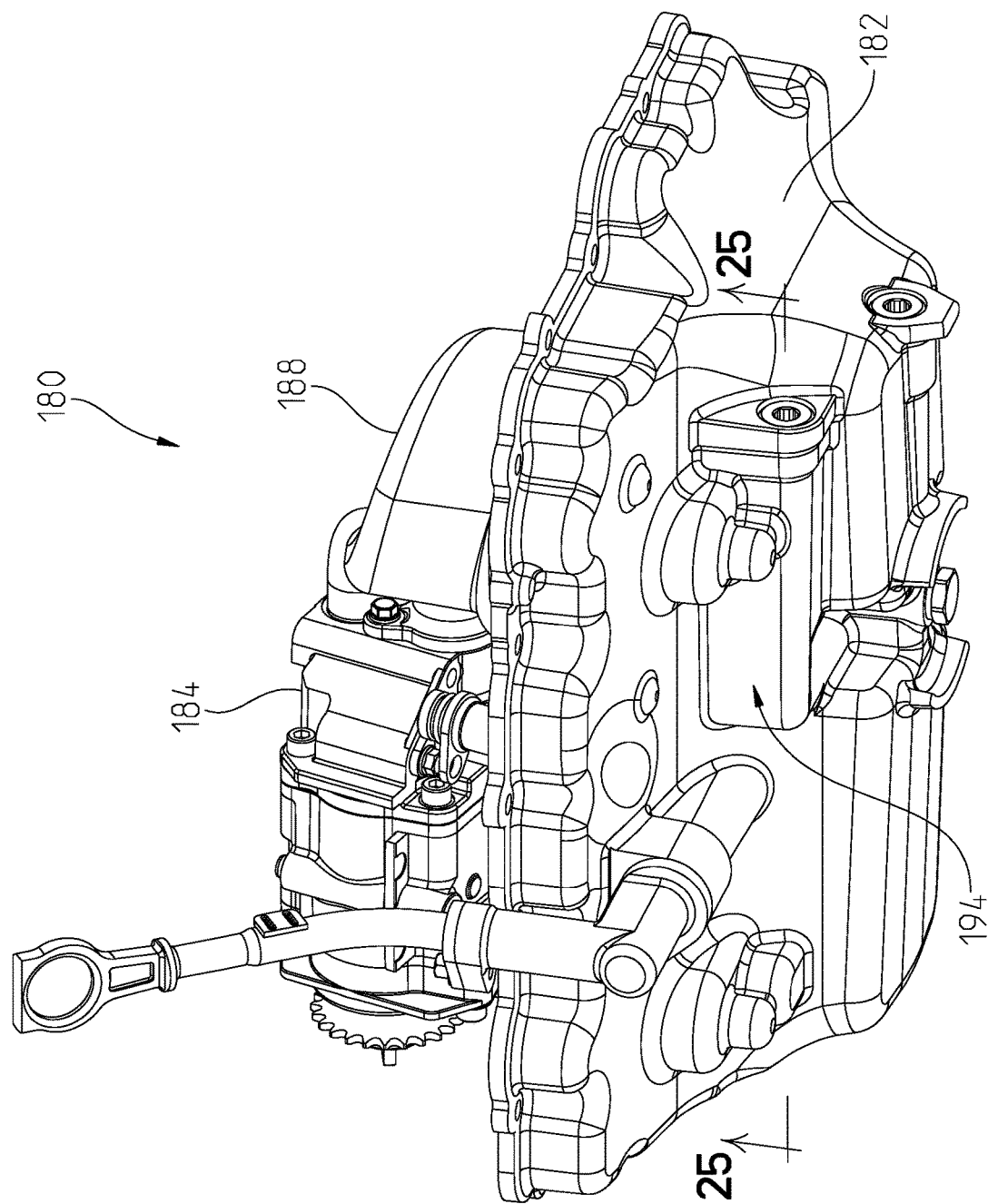
FIG. 22 is a side perspective view of the oil management system of FIG. 18.

Referring to FIG. 21, the oil management system 180 including the oil pan 182 includes a pan bottom 200 and outer side walls 202. The oil pan 182 defines a staging reservoir 204 and a delivery reservoir 206 and are separated from each other by a wall 208. The oil pan 182 is formed such that oil from the engine 102 drains into and pools in the staging and delivery reservoirs 204, 206. In some embodiments, the oil pan 182 is formed to direct oil substantially to the staging reservoir 204 by including an interior side wall 210 that extends substantially around the delivery reservoir 206. The pan bottom 200 and the interior side wall 210 are formed to facilitate oil draining and pooling to the staging reservoir 204. The interior side walls 210 may include gaps 212 that allow the oil to drain or enter into the delivery reservoir 206, however, the majority of the oil draining into the oil pan 182 from the engine 102 will be directed to the staging reservoir 204 when the engine 102 is in a neutral orientation (i.e., not on an incline, etc.). Referring to FIG. 20, the delivery reservoir 206 is covered with a covering member 214 which allows the delivery reservoir 206 to retain oil supply to the engine 102 during certain angularity operations. The covering member 214 couples to the interior side wall 210 to form the partially pressurized chamber. It is noted that the gaps 212 in the interior side walls 210 are not sealed by the covering member 214, thus allowing oil to enter or exit the delivery reservoir 206 through the gaps 212. In some embodiments, the gaps 212 are positioned on one side of the interior side walls 210 which facilitates the delivery reservoir 206 to retain oil supply to the engine 102 during certain angularity operations (e.g., when the vehicle 10 is angled in such a way that the gaps 212 are vertically higher than other portions of the interior side walls 210).

Figure 25:
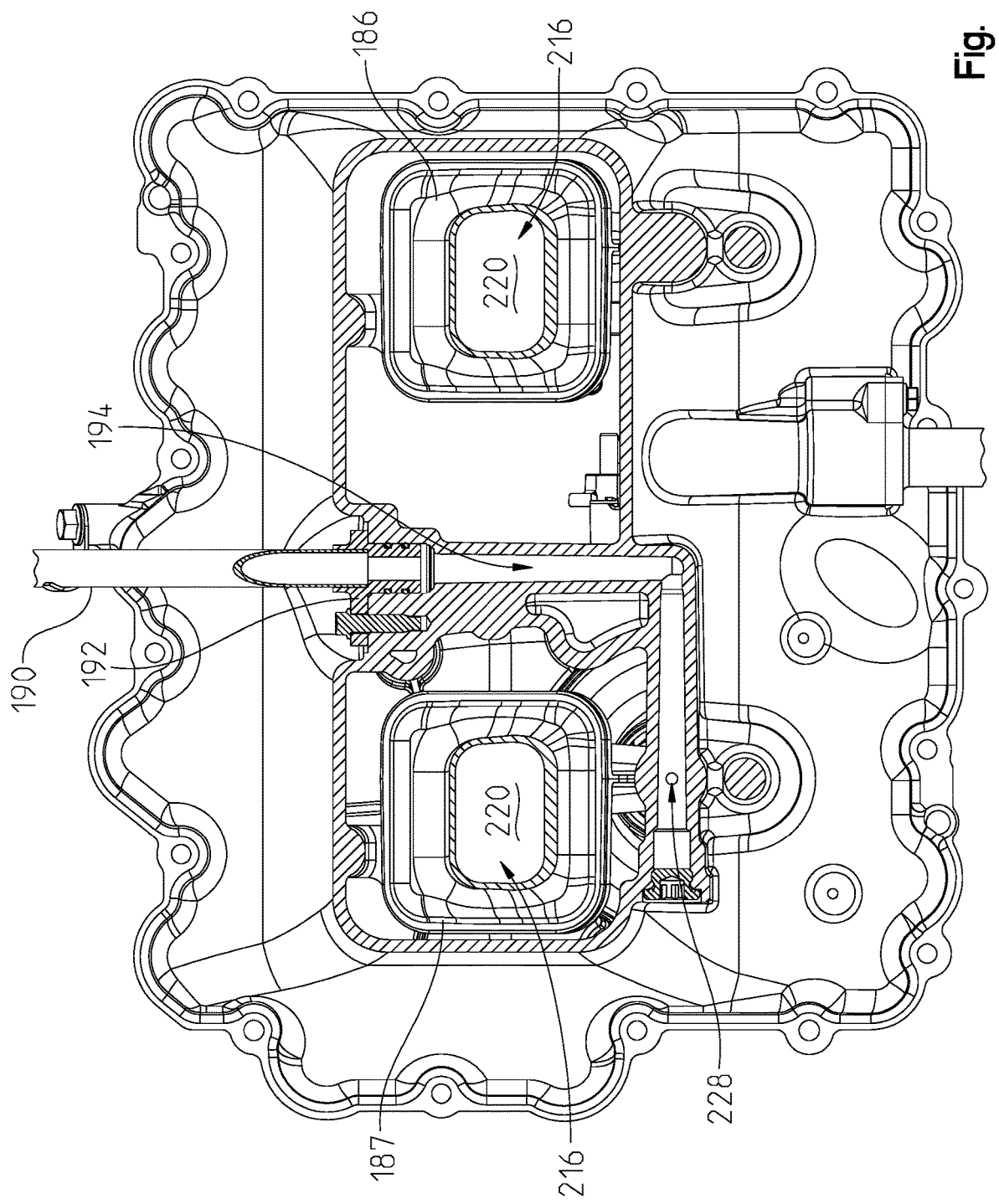
FIG. 25 is a top view of the oil management system of FIG. 18.

Referring to FIG. 20, the oil management system 180 includes a first pickup member 186 that is positioned with the staging reservoir 204 and a second pickup member 187 positioned with the delivery reservoir 206 (see FIG. 25). The first and second pickup members 186, 187 are operable to uptake oil that is positioned in the respective reservoirs 204, 206. Each of the oil pickup members 186, 187 may include a first opening 216 and a second opening 218 and a main lumen 220 defined within the oil pickup members 186, 187 (see FIG. 26). Oil is picked up by the oil pickup members 186, 187 at the first opening 216 by creating a lower pressure zone in the lumen of the oil pickup members 186, 187 (e.g., via the oil pump 184 which is in fluid communication with the oil pickup members 186, 187 by way of the second opening 218). The oil picked up by the first pickup member 186 is ejected from the oil pump 184 into the deaerator 188 which includes a spiral profile. The deaerator 188 removes air that may have been introduced into the oil collected in the staging reservoir 204 when taken up by the first oil pickup member 186. This may also occur when the first opening 216 of the oil pickup member 186 is not submerged in oil (e.g., when the vehicle 10 is in configurations of high angularity such as when climbing, etc.) (see FIG. 27). The deaerator 188 receives oil from the oil pump 184 and the oil travels through the deaerator 188 around a spiral portion 189 which forces air from the oil, and the deaerated oil is dumped into the delivery reservoir 206. Oil can then be picked up by the second pickup member 187 and cycled back through the appropriate mechanical systems of the powertrain assembly 100 (e.g., the engine 102 and turbocharger 110).

Figure 27:
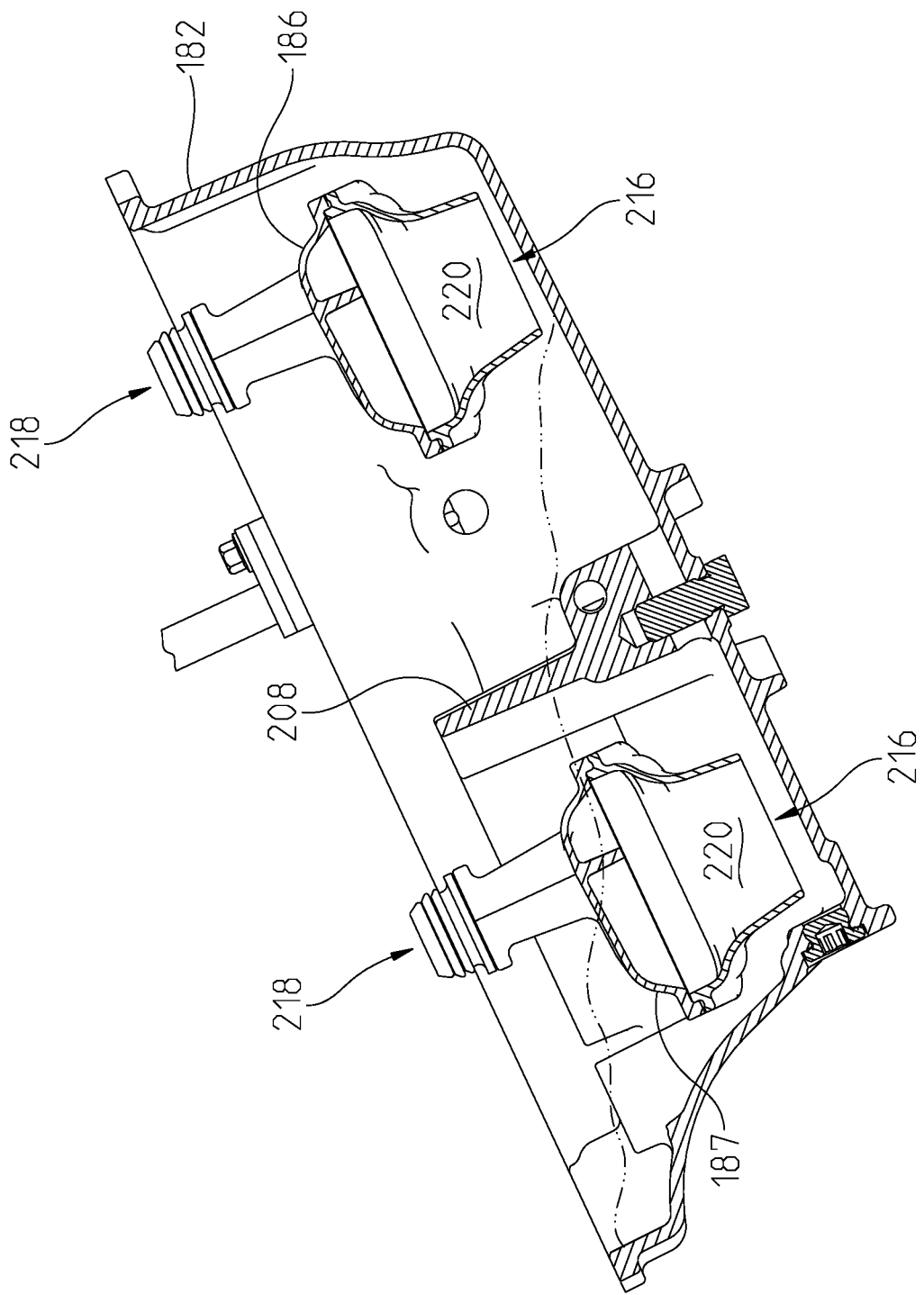
FIG. 27 is a section view of the oil management system of FIG. 18 positioned in a condition of high angularity.
Figure 28:
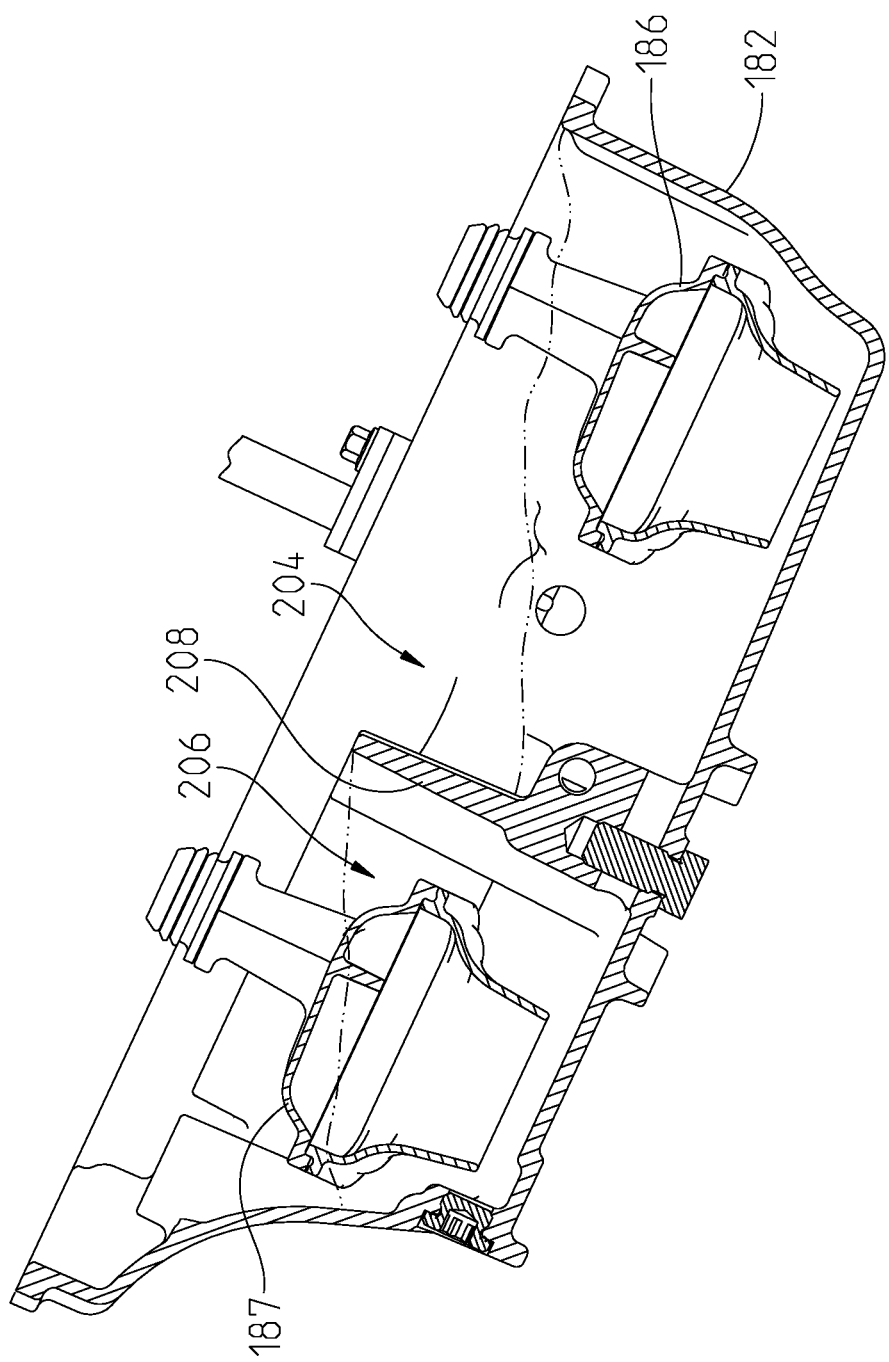
FIG. 28 is a section view of the oil management system of FIG. 18 positioned in another condition of high angularity.
Figure 29:
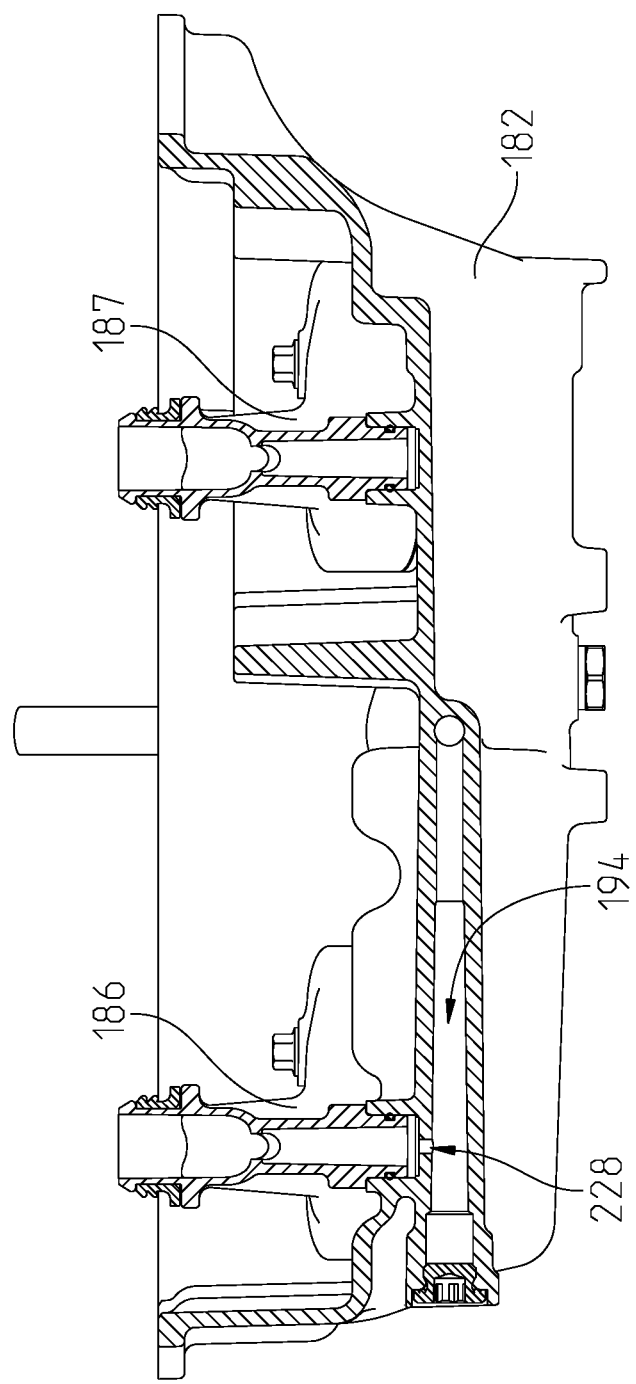
FIG. 29 is a view of an alternative embodiment of an oil management system.

Referring to FIGS. 27 and 28, the oil management system 180 is shown in positions of high angularity. FIG. 27 depicts the oil management system 180 in a position such that the delivery reservoir 206 is in a vertically lower position than the staging reservoir 204. When this occurs, the first opening 216 of the first oil pickup member 186 may not be submerged in oil and thus may pick up both oil and air from the staging reservoir 204. Oil from the staging reservoir 204 is transferred to the delivery reservoir 206 via the deaerator 188. Oil is picked up from the delivery reservoir 206 via the second pickup member 187 and delivered to the engine 102. When the vehicle 10 is in a position that places the oil management system 180 in the configuration shown in FIG. 28, the first opening 216 of the first oil pickup member 186 is submerged in oil and picks up oil from the staging reservoir 204 and transfers it to the delivery reservoir 206. The first opening 216 of the second pickup member 187 remains submerged in oil because the oil being transferred from the staging reservoir 204 to the delivery reservoir 206.

Referring again to FIGS. 23 and 24, the oil pickup members 186, 187 may include an auxiliary arm 222. The auxiliary arm 222 includes an auxiliary lumen 224 and an auxiliary opening 226. The auxiliary lumen 224 is in fluid communication with the main lumen 220. Oil drained from the turbocharger 110 is operable to be drained to a position proximate the auxiliary opening 226 of the oil pickup members 186, 187 such that the oil is picked up at the auxiliary opening 226 and travels through the auxiliary lumen 224 into the main lumen 220. This allows oil to be drained directly from the turbocharger 110 and picked up without pooling in the reservoirs 204, 206. The low pressure zone formed at the auxiliary opening 226 of the oil pickup members 186, 187 pulls the oil through and reduces clogging or backup of oil in the oil drain line 190 and channel 194 of the drain line connector 192. For example, in one embodiment, the channel 194 of the drain line connector 192 can extend through the oil pan 182 (or in other embodiments through another conduit separate from the oil pan 182) to a position proximate the auxiliary opening 226 of the oil pickup members 186, 187. In another embodiment, the channel 194 of the drain line connector 192 may drain into one of the reservoirs 204, 206. These embodiments are discussed in more detail herein.

Figure 23:
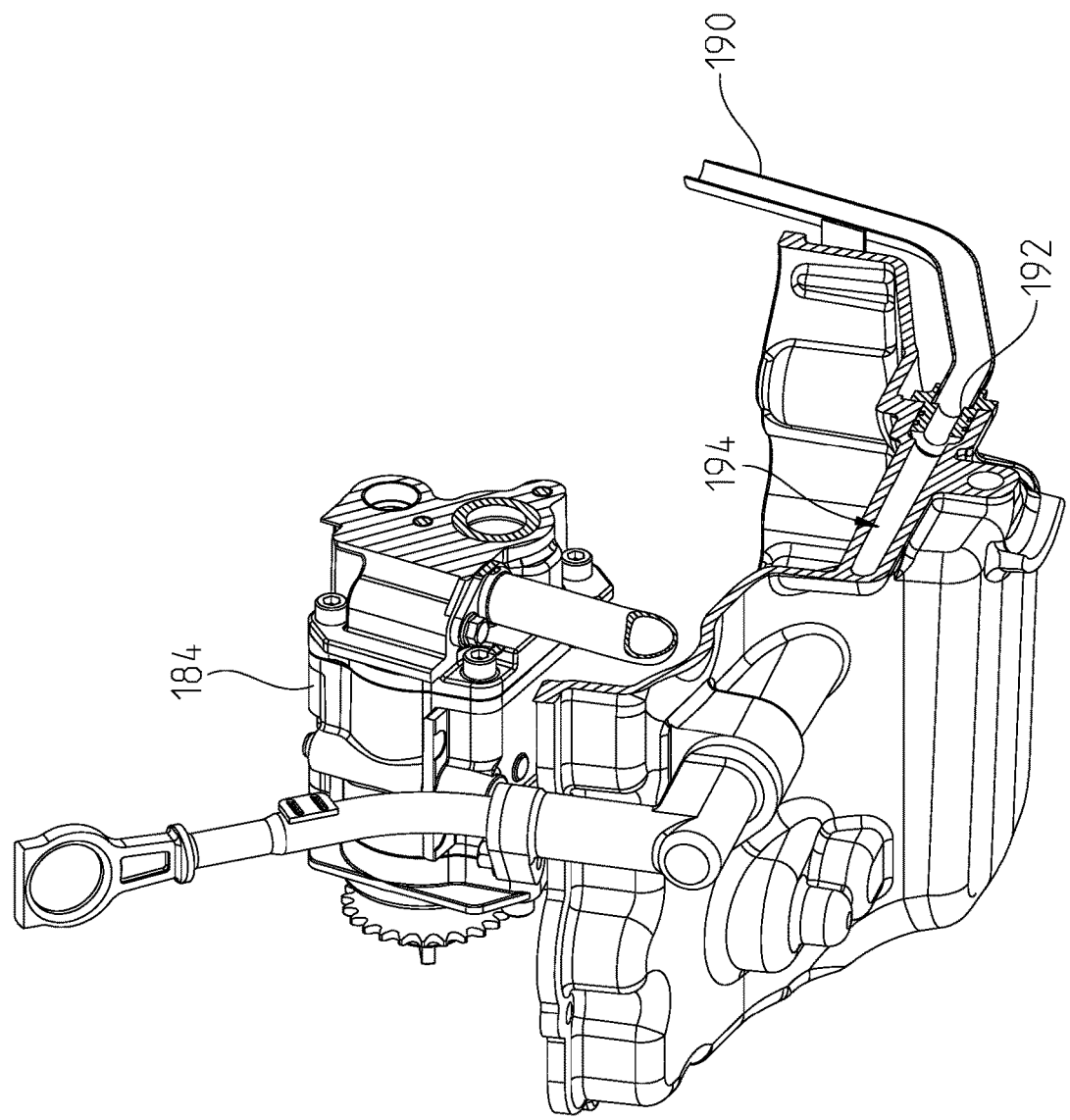
FIG. 23 is a side section view of the oil management system of FIG. 18.
Figure 24:
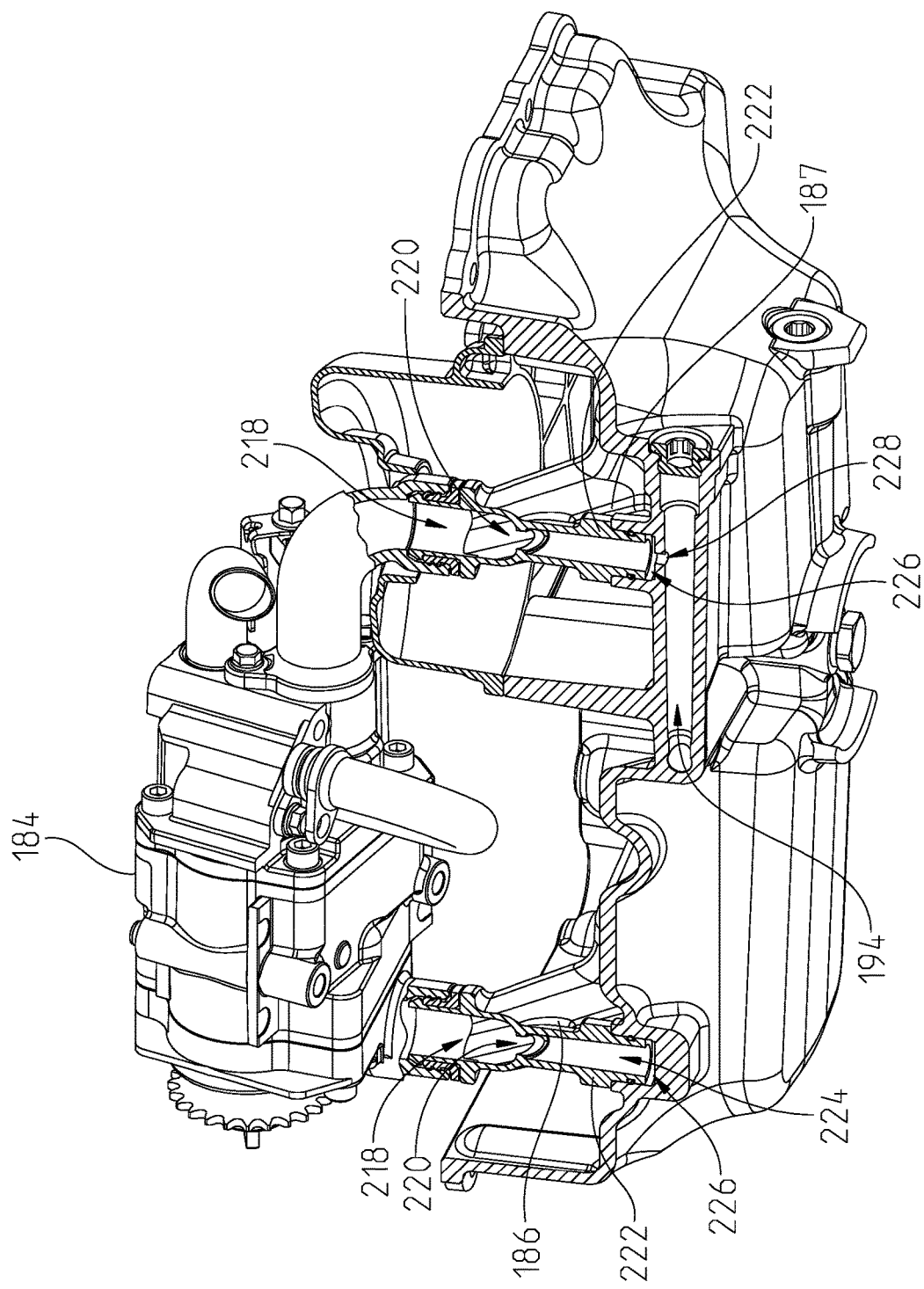
FIG. 24 is a front section view of the oil management system of FIG. 18.

Referring to the embodiment in which the channel 194 of the drain line connector 192 extend through the oil pan 182, the channel 194 is integrally formed in the oil pan 182. For example, FIGS. 23-25 depict the channel 194 extending through the pan bottom 200. An orifice 228 is provided proximate the channel 194. Oil in the channel 194 can exit the channel 194 at the orifice 228. The auxiliary opening 226 of one of the oil pickup members 186, 187 is positioned at or proximate the orifice 228 such that oil is taken up directly into the oil pickup member. The orifice 228 may be sized to include various diameters, which can result in various velocity of oil being pulled through the orifice 228 and various volumes per unit time being pulled through the orifice 228. In the embodiment depicted, the channel 194 is a pressurized system which allows oil to be pulled through the channel 194 and limits oil from backing up in the oil drain line 190. This is important when the vehicle 10 is in positions of high angularity where a gravity turbo drain system would be backed up and oil would not be able to drain from the turbocharger 110. It is understood that the channel 194 may be formed to fluidly connect with the auxiliary opening 226 of either the first oil pickup member 186 (see FIG. 29) or the second oil pickup member 187 (see FIG. 24).

Figure 26:
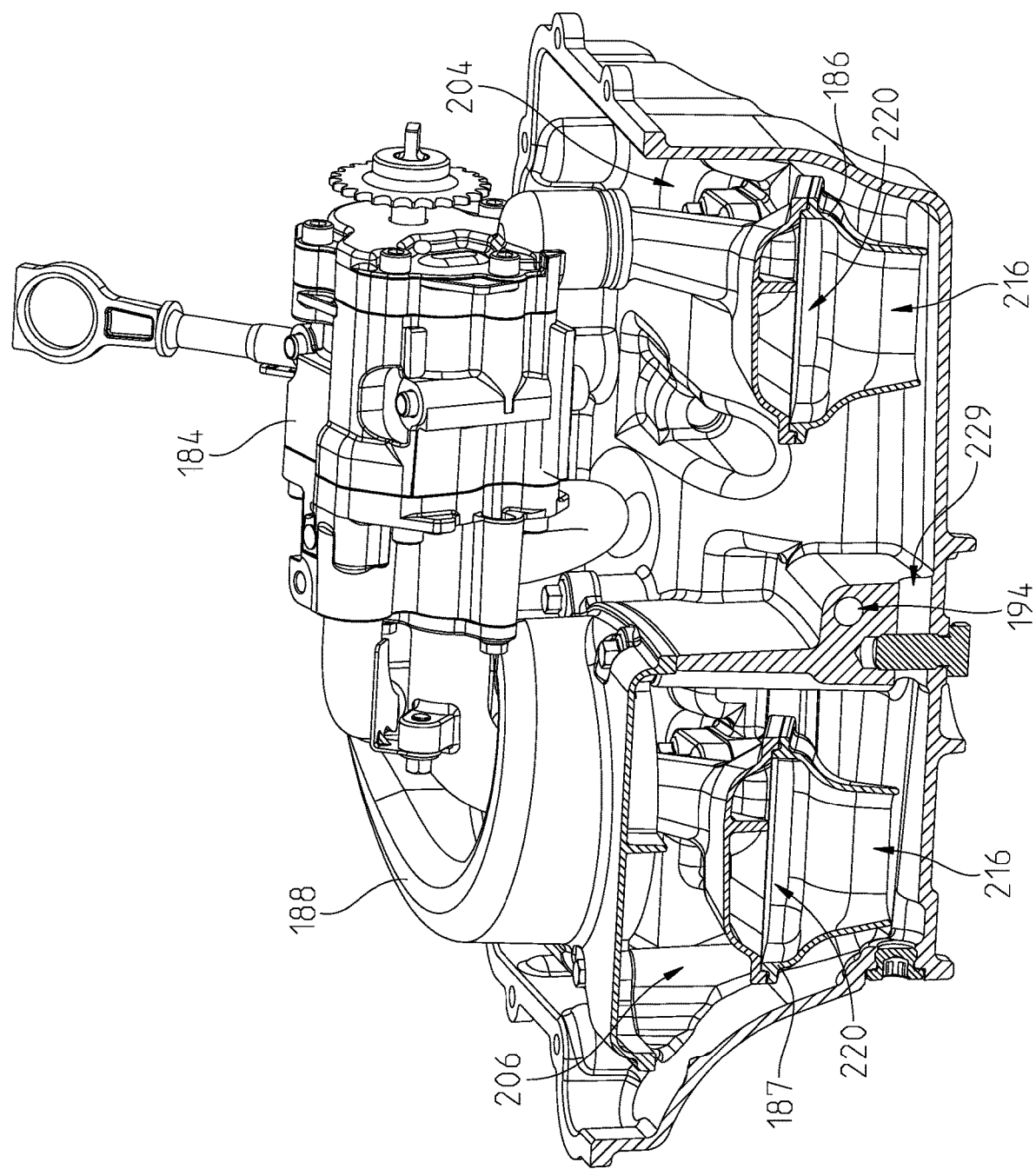
FIG. 26 is a front section view of reservoirs and pickup members of the oil management system of FIG. 18.

Referring to FIG. 26, a drain channel 229 may be formed through the wall 208 which connects the staging reservoir 204 and the delivery reservoir 206, the drain channel 229 also extending down through the pan bottom 200. This allows for a single access point when changing the oil of the powertrain assembly 100. As is further depicted in FIG. 26, the channel 194 for the turbo drain line connector 192 extends through the wall 208.

Figure 30:
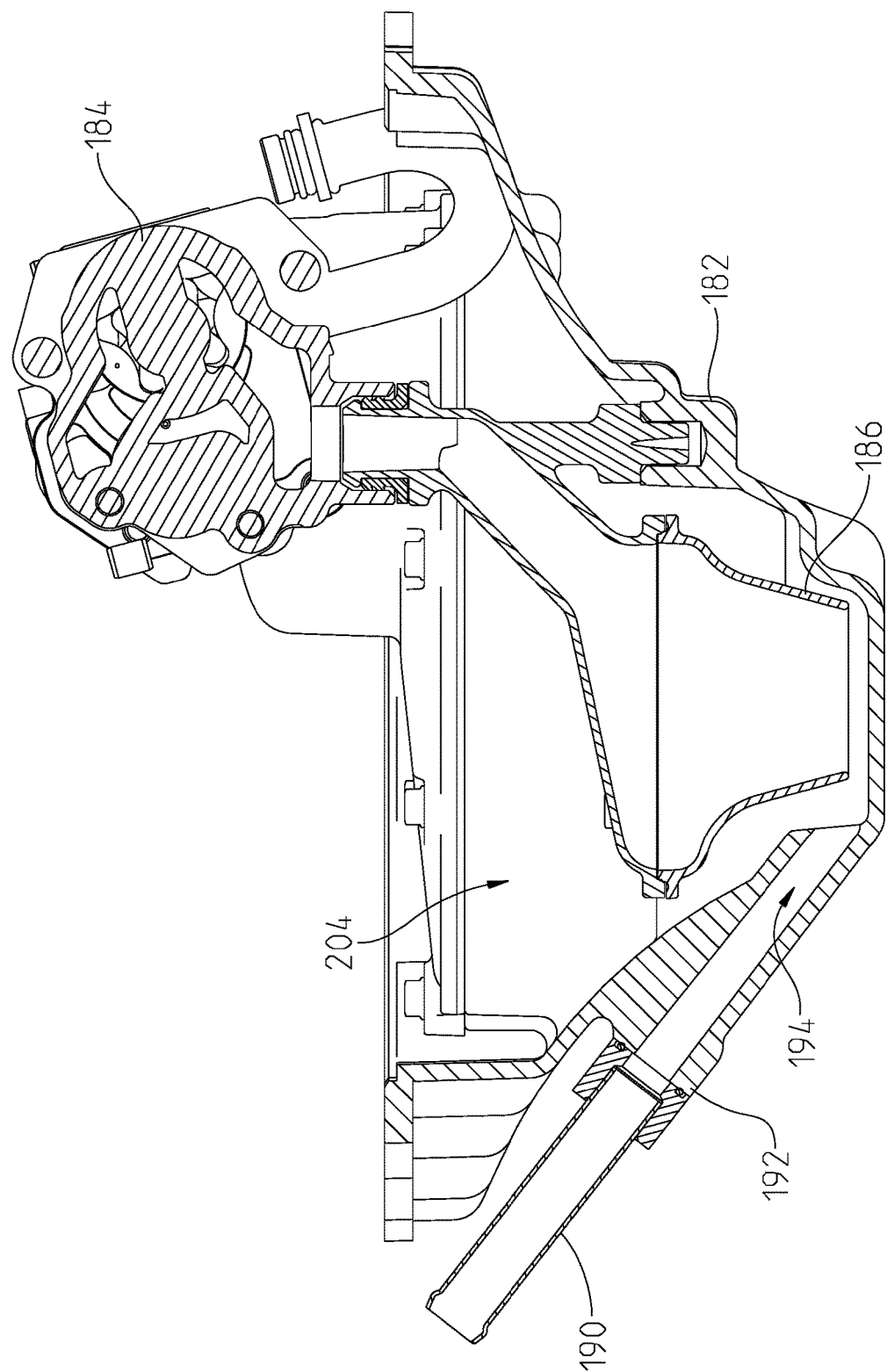
FIG. 30 is a section view of another alternative embodiment of an oil management system.
Figure 31:
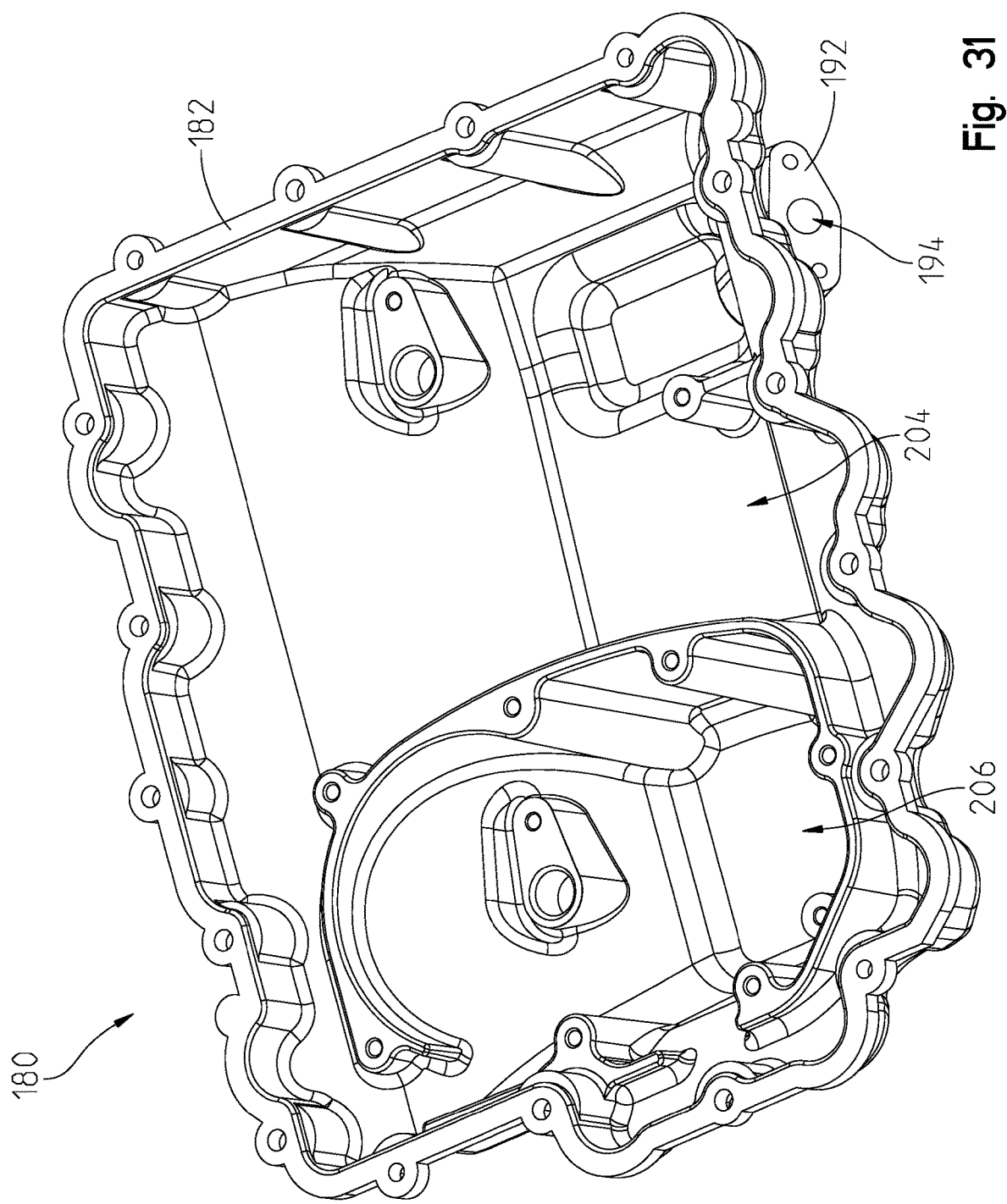
FIG. 31 is a top view of an oil pan of the oil management system of FIG. 30.

Referring to embodiments in which the channel 194 drains directly into one of the reservoirs 204, 206, in order to reduce clogging or backup of oil in the oil drain line 190 and channel 194 of the drain line connector 192, the oil pickup member 186 is positioned proximate the opening to the channel 194 at the staging reservoir 204 of the oil pan 182 (see FIGS. 30-31). The oil pickup member 186 is in fluid communication with the oil pump 184. Because the opening of the pickup member 186 which receives oil from the staging reservoir 204 is positioned proximate the opening to the channel 194 of the drain line connector 192, a low pressure zone is created in the reservoir 204 which causes oil to be pulled from the channel 194 and into the reservoir 204, from the staging reservoir 204 into the oil pickup member 186, and up into the oil pump 184. This keeps the opening of the channel 194 clear (or maintains movement of oil through the channel 194) and reduces the occurrence of oil backups or clogs from oil draining from the turbocharger 110.

Once the oil from the staging reservoir 204 is picked up, the oil can be recirculated into the engine 102 (e.g., via the deaerator 188). The oil pickup member 186 can be integral with the oil pan 182 or can be a separate member that is coupled to the oil pan 182. For example, is some embodiments, the oil pickup members 186, 187 are formed from a stable polymer that is coupled to the oil pan 182 (e.g., via bolts).

Figure 32:
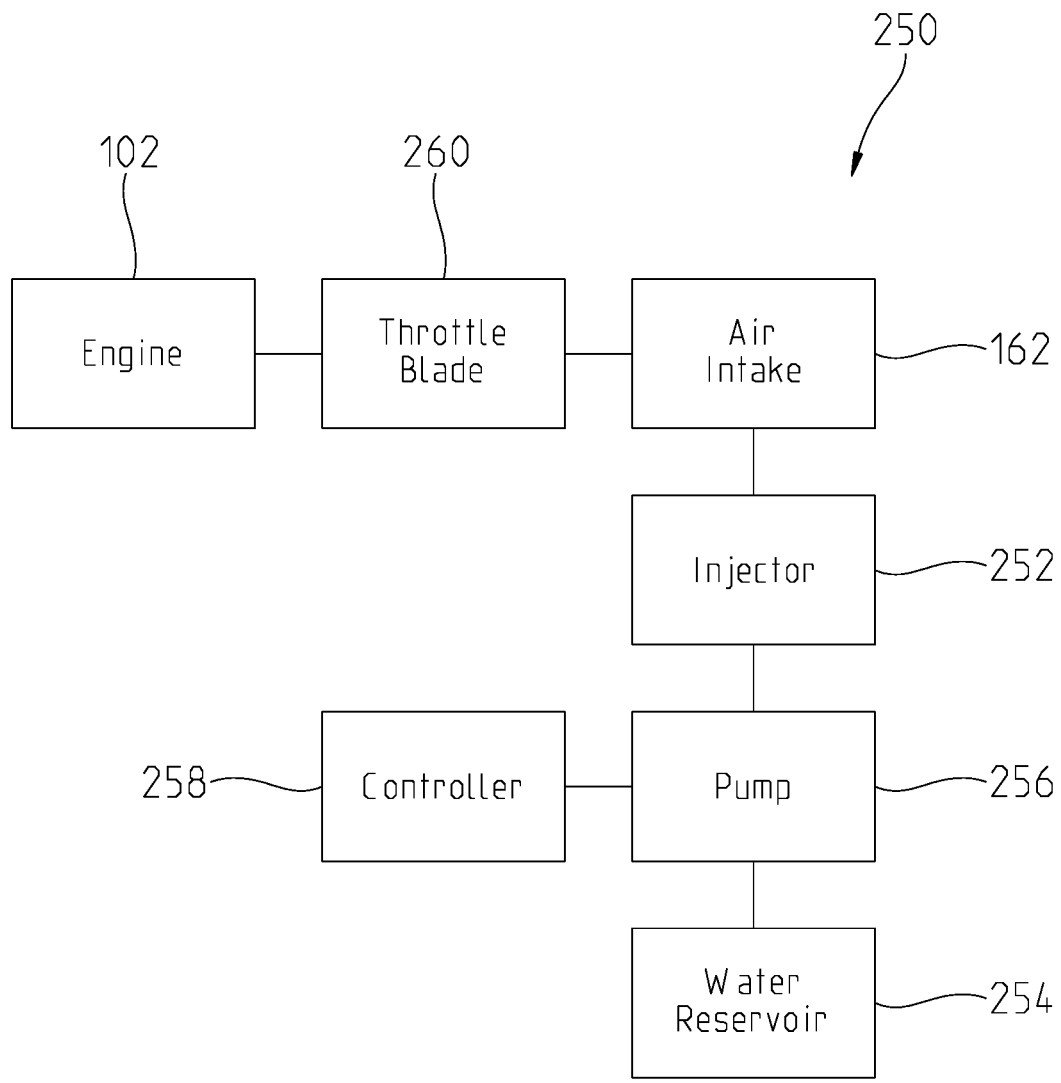
FIG. 32 is a schematic of a water injection system.
Figure 33:
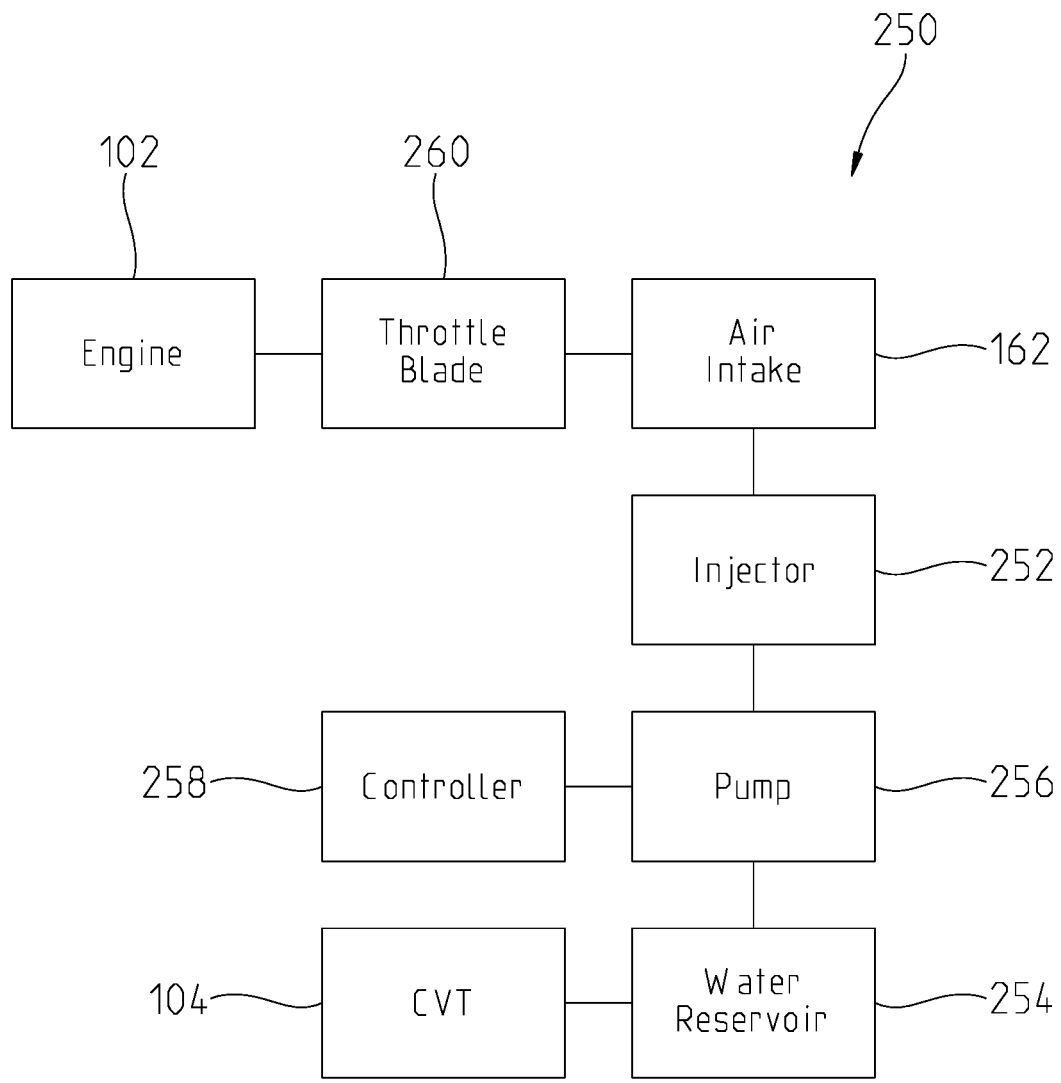
FIG. 33 is an alternative schematic of a water injection system.

Referring now to FIGS. 32-33, a water injection system 250 is provided with the powertrain assembly 100. More specifically, the water injection system 250 is operable to cool the air intake tract, e.g., the air intake inlet 162. The water injection system 250 includes an injector 252, a water reservoir 254, a pump 256, and a controller 258. The water injection system 250 cools the air intake 162 fluidically prior to a throttle blade 260 of the throttle body 130 (see FIG. 11). In some embodiments, the water injection system 250 interfaces with the air intake 162 (e.g., the injection 252 is positioned with the air intake 162) at a distance of about 5 inches or less from the throttle blade 252 (e.g., 3-4 inches pre-throttle blade). The injector 252 is mounted to the air intake 162 at about a 90 degree angle such that that injector 252 is substantially perpendicular to the flow of air through the air intake 162. The injector 252 is optimized to atomize the water to provide increased surface area for cooling the air intake 162.

By cooling the air prior to the throttle blade 260, only one interface with the air intake inlet 162 is required as the cooled air is distributed to each of the cylinders while allowing the throttle blade 260 to remain close to the cylinders to provide a responsive engagement. The lower intake air temperatures increase the octane rating of the fuel and help sustain the target horsepower. The water injection system 250 is operable to remove heat from the air to provide about a 10-15 degree Celsius temperature drop. The water injection system 250 may be mounted on the frame 16 of the vehicle 10 (e.g., an off road vehicle). The water injection system 250 is positioned on the CVT-side of the powertrain assembly 100.

The water cooling system 250 may be activated in various conditions. For example, the controller 258 may activate based on sensed conditions such as certain operating temperature, increased power demands, and so forth. For example, when the vehicle 10 is being operated in wide open throttle, a predetermined boost threshold is met, the water cooling system 250 is activated and water is pumped through to the injector 252 intake and the water contacting the air intake 162 is operable to remove heat from the air (10-15° C. of temperature drop) flowing into the engine 102. The water is operable to add a high octane level and changes the knock propensity. That decreases the occurrence of the engine 102 de-rating and allows the engine 102 to continue to make power. In some embodiment, the water injection system 250 is operable to initialize in de-rate conditions. This allows the powertrain assembly 100 to maintain higher levels of performance in high temperature internal engine conditions.

In some embodiments, the water injection system 250 and the CVT 104 may be at least partially integrated. For example, controller 258 may be operable to control the operation of the water injection system 250 and operation of the CVT 104. Furthermore, the CVT and the water injection system 250 may be fluidically coupled to the water reservoir 254 (e.g., a common reservoir).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
   a forward portion of the vehicle, a rearward portion of the vehicle, and a longitudinal direction of the vehicle extending between the forward portion and the rearward portion;
   a plurality of ground-engaging members;
   a frame supported by the ground-engaging members, the frame including a cab frame;
   an operator area and a cargo area supported by the frame, wherein the cargo area is rearward of the operator area in the longitudinal direction of the vehicle and vertically lower than an upper portion of the cab frame, the cargo area including at least a first upstanding wall and a second upstanding wall positioned laterally opposite each other forming a partially enclosed compartment with a floor extending between the first and the second upstanding walls; and
   a powertrain assembly supported by the frame and including:
   an engine supported by the frame, the engine including an exhaust side, the engine being positioned rearward of the operator area in the longitudinal direction of the vehicle;
   a turbocharger operably coupled to the engine, the turbocharger having a turbine housing supporting a turbine and a compressor housing supporting a compressor, the turbocharger being positioned on the exhaust side of the engine and rearward of the engine in the longitudinal direction of the vehicle, a space between the turbocharger and the engine being less than 9 inches;
   wherein the powertrain assembly includes a muffler coupled to the engine via an exhaust conduit, the exhaust conduit being less than two feet; and
   wherein the exhaust conduit is positioned fluidically between the engine and the muffler, and wherein the frame defines a frame envelope, the turbocharger being positioned within the frame envelope and the exhaust conduit extending at least partially outside of the frame envelope.

2. The utility vehicle of claim 1, wherein the powertrain assembly further comprises a transmission operably coupled to the engine, wherein the turbocharger is positioned vertically higher than the transmission.

3. The utility vehicle of claim 1, wherein the powertrain assembly further includes a continuously variable transmission (CVT) operably coupled to the engine, the turbocharger being positioned laterally adjacent in a lateral direction to the CVT.

4. The utility vehicle of claim 3, wherein the turbocharger is outside an envelope defined by the CVT.

5. The utility vehicle of claim 1, wherein the powertrain assembly further includes an intercooler, the intercooler being positioned laterally adjacent in a lateral direction to the turbocharger.

6. The utility vehicle of claim 5, wherein the powertrain assembly further includes an air intake and an air filter fluidically coupled to the engine via the turbocharger, the air filter being positioned on a non-exhaust side of the engine.

7. The utility vehicle of claim 6, wherein a portion of the intercooler includes an intercooler air intake and an air exhaust, the air exhaust being positioned longitudinally forward of the turbocharger.

8. The utility vehicle of claim 7, wherein the powertrain assembly further includes an engine intake manifold operably coupled to the engine, and wherein the air exhaust of the intercooler is laterally adjacent in a lateral direction to at least a portion of the engine intake manifold.

9. The utility vehicle of claim 1, further comprising a steering assembly including a steering wheel, wherein the plurality of ground engaging members includes a plurality of front wheels, and wherein the steering assembly is configured to steer the plurality of front wheels.

10. The utility vehicle of claim 1, wherein the space between the turbocharger and the engine is greater than one inch.

11. The utility vehicle of claim 1, wherein an exhaust conduit is greater than one inch.

12. The utility vehicle of claim 1, further comprising a suspension system including a trailing arm hingedly coupled to the frame.

13. The utility vehicle of claim 12, wherein rear ground engaging members of the plurality of ground engaging members are coupled to the trailing arm.

* * * * *